United States Patent
Nagarajan et al.

(10) Patent No.: US 12,477,443 B2
(45) Date of Patent: Nov. 18, 2025

(54) METHOD AND APPARATUS FOR CELL SELECTION BASED ON SERVICE

(71) Applicant: SAMSUNG ELECTRONICS CO., LTD., Suwon-si (KR)

(72) Inventors: Shanthossh Nagarajan, Karnataka (IN); Shreyas Sreenivas, Karnataka (IN); Sumit Verma, Karnataka (IN); Shouvik Guha, Karnataka (IN); Krishnamurthy Doddaballapur Ramu, Karnataka (IN); Anurag Mandilwar, Jharkhand (IN); Danish Ehsan Hashmi, Karnataka (IN); Mutya Subbarayudu, Andhra Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 17/989,299

(22) Filed: Nov. 17, 2022

(65) Prior Publication Data
US 2023/0083339 A1    Mar. 16, 2023

Related U.S. Application Data

(63) Continuation of application No. PCT/KR2021/006701, filed on May 28, 2021.

(30) Foreign Application Priority Data

May 29, 2020   (IN) .............................. 202041022651
Jan. 5, 2021   (IN) .............................. 202141000359
May 27, 2021   (IN) .............................. 202041022651

(51) Int. Cl.
*H04W 48/16*   (2009.01)
*H04W 24/08*   (2009.01)
(Continued)

(52) U.S. Cl.
CPC ........... *H04W 48/16* (2013.01); *H04W 24/08* (2013.01); *H04W 36/0064* (2023.05); *H04W 48/18* (2013.01)

(58) Field of Classification Search
CPC ........... H04W 72/541; H04W 72/0453; H04W 48/20; H04W 16/14; H04W 76/15;
(Continued)

(56) References Cited

U.S. PATENT DOCUMENTS 5,287,544 A * 2/1994 Menich ............... H04W 72/541
                                                    455/450
9,467,865 B2 * 10/2016 Joshi ........................ H04L 1/00
(Continued)

FOREIGN PATENT DOCUMENTS

CN     109451523      3/2019
EP     3 454 602      3/2019
(Continued)

OTHER PUBLICATIONS

M. Tayyab, X. Gelabert and R. Jäntti, "A Survey on Handover Management: From LTE to NR," in IEEE Access, vol. 7, pp. 118907-118930, 2019, doi: 10.1109/ACCESS.2019.2937405 (Year: 2019).*

(Continued)

*Primary Examiner* — William D Cumming
(74) *Attorney, Agent, or Firm* — NIXON & VANDERHYE P.C.

(57) ABSTRACT

A method for an optimal cell selection for a UE in a wireless network, may include receiving a plurality of KPIs associated with the UE, determining whether at least one KPI from the plurality of KPIs meets at least one KPI criteria; and performing, one of: prioritizing a sub6 cell over a mmWave cell and selecting the sub6cell cell or prioritizing a LTE cell over a sub6 cell and selecting the LTE cell or, prioritizing the (Continued)

LTE cell over the mmWave cell and selecting the LTE cell, and prioritizing the mmWave cell over the sub6 cell and selecting the mmWave cell in response to determining that the at least one KPI from the plurality of KPIs does not meets the at least one KPI criteria.

19 Claims, 48 Drawing Sheets

(51) Int. Cl.
    *H04W 36/00*     (2009.01)
    *H04W 48/18*     (2009.01)
(58) Field of Classification Search
    CPC ... H04W 4/02; H04W 24/08; H04W 36/0064; H04W 74/002
    USPC ......... 455/423, 430, 434, 515, 450; 370/329
    See application file for complete search history.

(56) References Cited

U.S. PATENT DOCUMENTS

| | | | | |
|---|---|---|---|---|
| 9,532,376 | B2* | 12/2016 | Jha | H04W 76/15 |
| 9,801,225 | B2* | 10/2017 | Jha | H04W 76/15 |
| 10,200,993 | B2* | 2/2019 | Green | H04W 24/08 |
| 12,052,626 | B2* | 7/2024 | Polaganga | H04W 36/304 |
| 2008/0132263 | A1* | 6/2008 | Yu | H04W 48/20 |
| | | | | 455/515 |
| 2014/0328311 | A1* | 11/2014 | Qiang | H04W 16/14 |
| | | | | 370/329 |
| 2015/0271822 | A1* | 9/2015 | Batchu | H04B 1/3816 |
| | | | | 455/423 |
| 2015/0334575 | A1* | 11/2015 | Joshi | H04L 1/00 |
| | | | | 370/329 |
| 2016/0135220 | A1* | 5/2016 | Jha | H04W 72/0453 |
| | | | | 455/434 |
| 2017/0055309 | A1* | 2/2017 | Jha | H04W 74/002 |
| 2017/0318583 | A1* | 11/2017 | Green | H04W 4/02 |
| 2019/0053115 | A1 | 2/2019 | Ngai et al. | |
| 2019/0238256 | A1 | 8/2019 | Xing et al. | |
| 2020/0067793 | A1 | 2/2020 | Dribinski et al. | |
| 2023/0083339 | A1* | 3/2023 | Nagarajan | H04W 36/0064 |
| | | | | 455/434 |
| 2023/0342528 | A1* | 10/2023 | Akselrod | G06F 30/3323 |

FOREIGN PATENT DOCUMENTS

| | | | |
|---|---|---|---|
| WO | 2020/021504 | 1/2020 | |
| WO | WO-2021242055 A1 * | 12/2021 | ........ H04W 36/0064 |

OTHER PUBLICATIONS

International Search Report for PCT/KR2021/006701, mailed Aug. 30, 2021, 3 pages.
Written Opinion of the ISA for PCT/KR2021/006701, mailed Aug. 30, 2021, 7 pages.

* cited by examiner

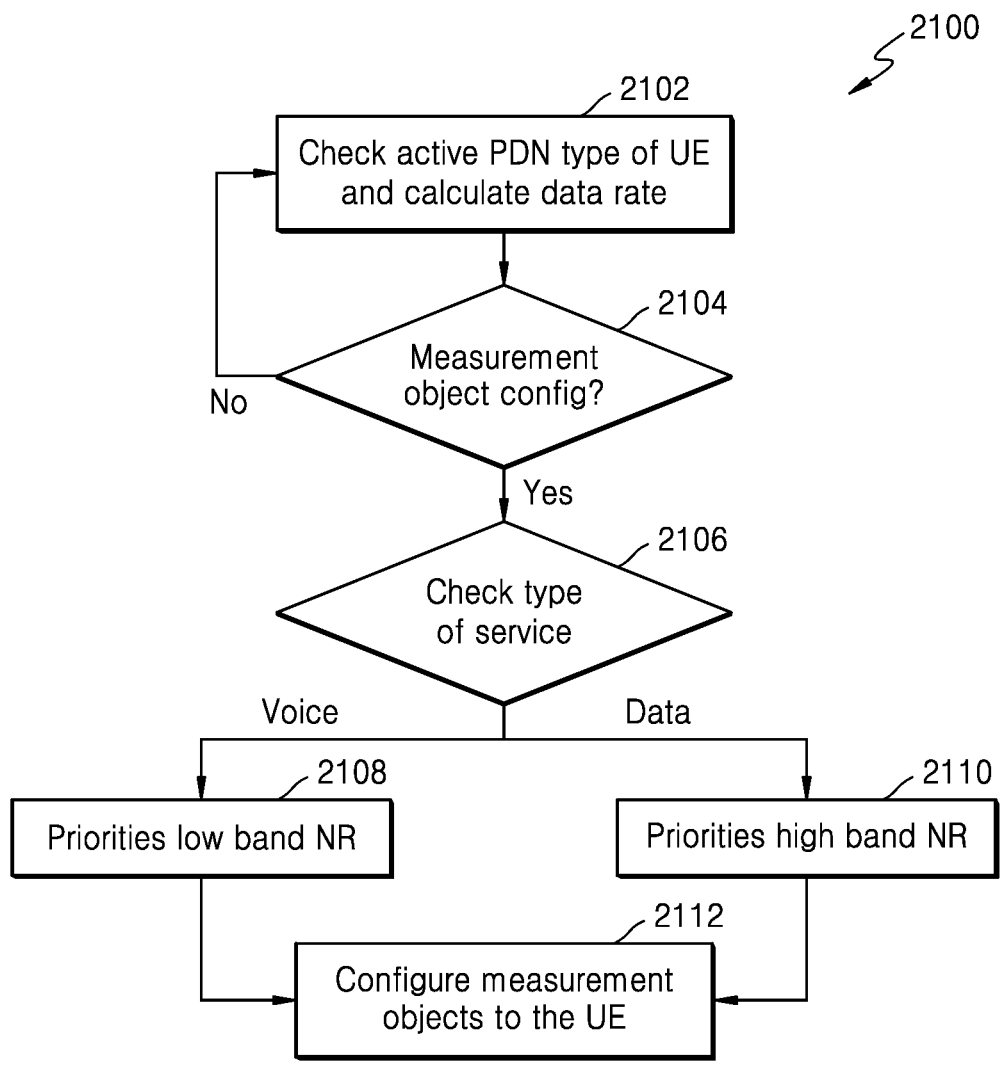

METHOD AND APPARATUS FOR CELL SELECTION BASED ON SERVICE

CROSS-REFERENCE TO RELATED APPLICATIONS

This application is a continuation of International Application No. PCT/KR2021/006701, filed May 28, 2021, designating the United States, in the Korean Intellectual Property Receiving Office, and claiming priority to each of Indian Patent Application Nos. 202041022651 filed May 29, 2020, 202141000359 filed Jan. 5, 2021, and 202041022651 filed May 27, 2021, the disclosures of which are all hereby incorporated by reference herein in their entireties.

BACKGROUND

Field

Certain example embodiments relate to cellular communication and for example to a method and/or device of optimal cell selection for camping a User Equipment (UE) based on Key Performance Indicators (KPIs).

Description of Related Art

Planning of any radio deployment is performed based on a radio link budget. The radio link budget may be an accounting of all gains and losses from a transmitter, through a medium (e.g., free space, cable, waveguide, fiber, etc.) to a receiver in a telecommunication system. The radio link budget may be determined for both downlink and uplink.

A downlink link budget relates to a coverage up to which a UE camped on a cell can achieve a particular data speed with a configured bandwidth. For example, the downlink link budget may be a distance from the cell on which the UE is camped up to which the UE provides 1 Mbps of data speed with 20 MHz bandwidth allocation without any failure. An uplink link budget relates to a coverage up to which the UE transmits the particular data rate with preconfigured bandwidth and a transmission power. For example, the uplink link budget may be, a distance from a cell tower on which the UE is camped up to which the UE transmits 256 Kbps of data with 20 MHz bandwidth allocation with a maximum transmission power of 26 dBm. Radio Link budget calculations are determined using field trials with different parameters associated with the UE or a service requested on the UE.

In case of time critical service, such as voice call, delay of transmission and reception of data is not appropriate. When the UE is moving towards a higher frequency in the spectrum during the voice call, a call drop may happen due to a low uplink link budget. In order to avoid the call drop due to the low link budget, the UE needs to select or reselect or hand over to or redirect to a cell which can provide an optimal link budget.

SUMMARY

It is desirable to provide a method for cell selection/cell resection/cell prioritization based on the service requested at the UE and parameters associated with the UE such as battery level of the UE, transmit power at the UE, connectivity of the UE and the like for 5G Stand Alone (SA) mode.

It is desirable to select an optimal cell based on a radio link budget in a wireless communication system.

Furthermore, it is desirable to provide a method and system for prioritizing Sub6 or mmWave for Standalone (SA) 5G and Evolved Universal Terrestrial Radio Access Network (E-UTRAN) New Radio-Dual Connectivity (ENDC) based on performance factors of the UE.

An example embodiment provides a method for cell selection performed by a User Equipment (UE) in a wireless network. The method in an example embodiment may comprise identifying a trigger for initiation of a service performed in the UE connected to (directly or indirectly) a first cell, checking an availability of a frequency band determined based on the service in the first cell, in case that the frequency band is not available in the first cell, scanning for availability of the frequency band in a second cell, and connecting the UE to the second cell including the available frequency band for the service.

BRIEF DESCRIPTION OF DRAWINGS

This method and the device illustrated in the accompanying drawings, throughout which reference letters indicate corresponding parts in the various figures. Certain example embodiments herein will be better understood from the following description with reference to the drawings, in which:

FIG. 21 is a flow diagram, illustrating a method of handovers by the network, according to an example embodiment.

DETAILED DESCRIPTION

Figure 1A:
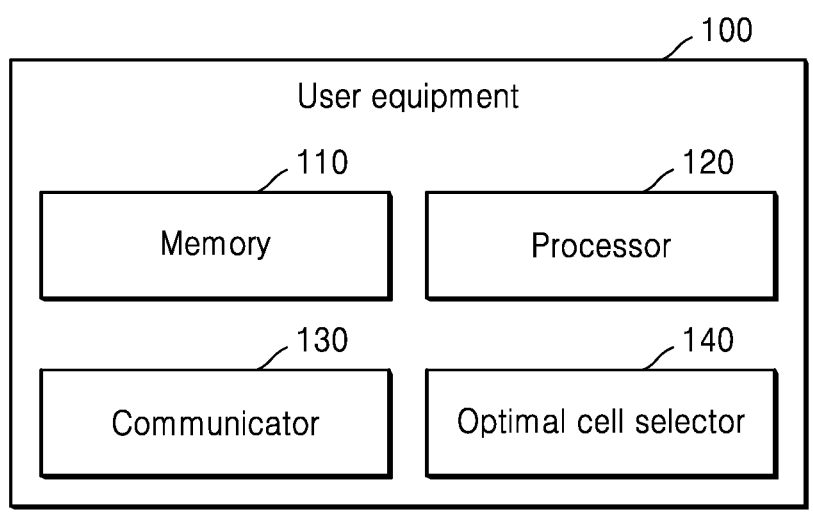
FIG. 1a illustrates a block diagram of a UE for selecting an optimal cell for camping the UE, according to an example embodiment.

Accordingly, example embodiments provide a method of an optimal cell selection for camping a User Equipment (UE) in a wireless network, where the method may comprise: receiving, by the UE, a plurality of Key Performance Indicators (KPIs) associated with the UE, where the plurality of KPIs comprises a data volume at the UE, a transmitter power at the UE, a battery level of the UE, network connection of the UE, an application data usage at the UE, data stalling condition at the UE and a service used by the UE; determining, by the UE, whether at least one KPI from the plurality of KPIs meets at least one KPI criteria; and performing, by the UE, one of: prioritizing Sub6 cell over mmWave cell and selecting a sub6cell cell as the optimal cell in response to determining that the at least one KPI from the plurality of KPIs meets the at least one KPI criteria, prioritizing a LTE cell over Sub6 cell and selecting the LTE cell as the optimal cell in response to determining that the at least one KPI from the plurality of KPIs meets the at least one KPI criteria, prioritizing LTE cell over mmWave cell and selecting the LTE cell as the optimal cell in response to determining that the at least one KPI from the plurality of KPIs meets the at least one KPI criteria, and prioritizing mmWave cell over Sub6 cell and selecting a mmWave cell as the optimal cell in response to determining that the at least one KPI from the plurality of KPIs does not meets the at least one KPI criteria.

In an embodiment where determining by the UE that the at least one KPI from the plurality of KPIs meets the KPI criteria comprises: determining that the UE is currently camped on one of the sub6 cell and the mmWave cell; and determining that a current transmit power of the UE is less than a power threshold; determining that a current data rate at the UE is less than a volume threshold; determining that a current data usage of an application at the UE is less than a data usage threshold; determining that a current battery level of the UE is less than a battery threshold; determining that current data stall of the UE is less than a stall threshold; and determining that the UE is connected to a Wi-Fi connection.

In an embodiment, prioritizing Sub6 cell over mmWave cell and selecting the sub6cell cell as the optimal cell comprises: determining, by the UE, whether a hysteresis timer is active; performing, by the UE, one of: prioritizing Sub6 cell over mmWave cell and selecting the sub6cell cell as the optimal cell in response to determining that the hysteresis timer is not active and re-starting the hysteresis timer, and retaining the UE on the mmWave cell in response to determining that the hysteresis timer is active and waiting for expiry of the hysteresis timer.

In an embodiment prioritizing mmWave cell over Sub6 cell by the UE, and selecting the mmWave cell as the optimal cell comprises: determining, by the UE, whether a hysteresis timer is active; performing, by the UE, one of: prioritizing mmWave cell over Sub6 cell and selecting the mmWave cell as the optimal cell in response to determining that the hysteresis timer is not active and re-starting the hysteresis timer, and retaining the UE on the mmWave cell in response to determining that the hysteresis timer is active and waiting for expiry of the hysteresis timer.

In an embodiment, prioritizing LTE cell over Sub6 cell, by the UE, and selecting the LTE cell as the optimal cell comprises: determining, whether a hysteresis timer is active; and performing, by the UE, one of: prioritizing LTE cell over Sub6 cell and selecting the LTE cell as the optimal cell in response to determining that the hysteresis timer is not active and re-starting the hysteresis timer; and retaining the UE on the sub6 cell in response to determining that the hysteresis timer is active and waiting for expiry of the hysteresis timer.

In another embodiment, prioritizing LTE cell over mmWave cell, by the UE, and selecting the LTE cell as the optimal cell comprises: determining, by the UE, whether a hysteresis timer is active; and performing, by the UE, one of: prioritizing LTE cell over mmWave cell and selecting the LTE cell as the optimal cell in response to determining that the hysteresis timer is not active and re-starting the hysteresis timer; and retaining the UE on the sub6 cell in response to determining that the hysteresis timer is active and waiting for expiry of the hysteresis timer.

In an embodiment prioritizing Sub6 cell over mmWave cell, by the UE, and selecting the sub6 cell as the optimal cell comprises: determining, whether a hysteresis timer is active; and performing, by the UE, one of: prioritizing Sub6 cell over mmWave cell, by the UE, and selecting the sub6 cell as the optimal cell in response to determining that the hysteresis timer is not active and re-starting the hysteresis timer; and retaining the UE on the mmWave in response to determining that the hysteresis timer is active and waiting for expiry of the hysteresis timer.

In an embodiment selecting one of the LTE cell and the sub6cell as the optimal cell in response to determining that the hysteresis timer is not active comprises: determining by the UE, whether the sub 6 cell is available for camping the UE; and performing, by the UE, one of: selecting the sub 6 cell as the optimal cell for camping the UE in response to determining that the sub 6 cell is available; and selecting the LTE cell as the optimal cell for camping the UE in response to determining that the sub6 cell is not available.

In an embodiment, selecting one of the LTE cell and the mmWave as the optimal cell comprises: determining, whether a hysteresis timer is active; performing, by the UE, one of:
de-prioritizing, by the UE, the sub6 cell for a first time period in response to determining that the hysteresis timer is not active and selecting one of the mmWave cell and an LTE cell as the optimal cell and remove de-prioritization for the sub6cell for camping after expiry of the first time period; and retaining the UE on the sub6 in response to determining that the hysteresis timer is active and waiting for expiry of the hysteresis timer.

In an embodiment, selecting one of the mmWave and an LTE cell as the optimal cell in response to determining that the hysteresis timer is not active comprises: determining by the UE, whether the mmWave cell is available for camping the UE; and performing, by the UE, one of: selecting the mmWave cell as the optimal cell for camping the UE in response to determining that the mmWave cell is available; and selecting the LTE cell as the optimal cell for camping the UE in response to determining that the mmWave cell is not available.

In another embodiment, selecting by the UE, the optimal cell for camping the UE comprises: determining that the UE is in Stand Alone (SA) idle mode; determining that cell reselection is required and searching for sub6 cell; and performing one of: selecting the sub6 cell as the optimal cell for camping the UE in response to determining that the sub6cell is available; and selecting the mmWave cell as the optimal cell for camping the UE in response to determining that the sub6cell is not available.

In an embodiment, selecting by the UE, the optimal cell for camping the UE comprises: determining that the UE is connected to a mmWave cell in Stand Alone (SA) connected mode; configuring measurement objects for neighboring sub6 and mmWave cell; determining whether sub6 cell is preferred based on the at least one KPI meeting the KPI criteria; and performing one of: measuring and reporting, by the UE, only the Sub6 cells with good RSRP as the optimal cell for camping the UE in response to determining that the sub6cell is preferred and is available; and measuring and reporting, by the UE, both the sub6 cell and the mmWave cell to a network as the optimal cell for camping the UE in response to determining that the sub6cell is not preferred or sub6 cell preferred but not available.

In an embodiment selecting the sub6cell cell as the optimal cell for camping the UE in response to determining that the sub6cell is preferred comprises: scanning, by the UE, sub6 frequencies for searching the sub6 cell; determining whether the sub6cell with a good RSRP is found in the scan; and performing one of: measuring and reporting, by the UE, sub6 cells and the mmWave cells to the network as the optimal cell for camping the UE in response to determining that the sub6cell with a good RSRP is not found in the scan; measuring and reporting, by the UE, sub6 cell found in the scan to the network as the optimal cell for camping the UE in response to determining that the sub6cell with a good RSRP is found in the scan.

In an embodiment selecting by the UE, the optimal cell for camping the UE comprises: determining that the UE is connected to a sub6c cell in Stand Alone (SA) connected mode; configuring measurement objects for neighboring sub6 and mmWave cell; determining whether a mmWave cell is preferred based on the at least one KPI meeting the KPI criteria; and performing one of: measuring and reporting, by the UE, only the mmWave cells with good RSRP as the optimal cell for camping the UE in response to determining that the mmWave is preferred and is available; and measuring and reporting, by the UE, both the sub6 cell and the mmWave cell to a network as the optimal cell for camping the UE in response to determining that the mmWave cell is not preferred or mmWave cell preferred but not available.

In another embodiment, selecting the mmWave cell as the optimal cell for camping the UE in response to determining that the sub6cell is preferred comprises: scanning, by the UE, mmWave frequencies for searching the mmWave cell; determining whether the mmWave with a good RSRP is found in the scan; and performing one of: measuring and reporting, by the UE, mmWave cells and the sub6 cells to the network as the optimal cell for camping the UE in response to determining that the mmWave with a good RSRP is not found in the scan; measuring and reporting, by the UE, mmWave cell found in the scan to the network as the optimal cell for camping the UE in response to determining that the mmWave with a good RSRP is found in the scan.

In an embodiment, the method further comprises determining that the UE is in 5G SA connected mode; determining that data stalling occurs and a hysteresis timer is active; disabling the 5G SA mode in the UE for a predefined time; checking whether the predefined time is expired; and performing one of: enabling the 5G SA mode in the UE in response to determining that the predefined time is expired; and retaining the disabled 5G SA mode in the UE in response to determining that the predefined time is not expired.

In an embodiment, the method further comprises determining that the UE is in 5G SA connected mode; determining that data stalling occurs and a hysteresis timer is active; moving the UE to an LTE mode and restricting measurements of the 5G SA band in idle mode in the UE for a predefined time; checking whether the predefined time is expired; and performing one of: enabling measurement of the 5G SA band in the idle mode in the UE in response to determining that the predefined time is expired; and retaining the restriction on measurements of the 5G SA band in idle mode in the UE response to determining that the predefined time is not expired.

In an embodiment, the method of cell selection for camping the UE comprises identifying a trigger for initiation of a service from the UE currently latched on to a first cell, checking an availability of an optimum frequency band in the first cell within which the UE is to execute the service, scanning, for availability of the optimum frequency band in a second cell if the optimum frequency band is not available in the first cell, and connecting the UE to the second cell having the optimum frequency band available.

In an embodiment, an optimum frequency band provides highest efficiency for the service. The service comprises at least one of voice service, a data service, and a low latency service over one of a 5G network, a 4G network and a Long Term Evolution (LTE) network. The optimum frequency band comprises a high, medium and low frequency band and wherein the high frequency band is a milimeterWave (mm-Wave) band, the medium frequency band is a sub6 band and the low frequency band is a Long Term Evolution (LTE band).

In an embodiment, connecting to the second cell on the optimum frequency band comprises one of: connecting on the low frequency band in response to determining that the service is a voice service; connecting on one of a high frequency band and a medium frequency band in response to determining that the service is a data service.

In an embodiment, scanning the optimum band may comprise determining, by the UE, a request for cell selection for camping the UE; scanning, by the UE, a list of supported bands by the UE; prioritizing, by the UE, a plurality of cells from the list of supported bands based on at least one of a coverage and a link budget capability of the supported bands and a frequency of the supported bands; populating, by the UE, a priority database with the plurality of prioritized cells; and scanning, by the UE, the priority database for determining a plurality of candidate cells from the plurality of prioritized cells; and selecting, by the UE, a best cell from the plurality of candidate cells for camping the UE. The plurality of candidate cells are stored in a candidate database.

In an embodiment selecting, by the UE the best cell from the plurality of candidate cells may comprise determining, by the UE, whether a plurality of best cell are available for camping the UE; performing, by the UE, on of; reordering the plurality of best cells based on an energy level of the cell and selecting the cell with highest energy level for camping the UE in response to determining that the plurality of best cells are available; and selecting the best cell for camping the UE in response to determining that the plurality of best cells are not available.

Accordingly, an example embodiment involves a method for cell reselection based on a type of service as, where the method may comprise: receiving, by the UE, a request for cell selection for camping the UE based on a specific service required; determining, by the UE, the type of the specific service required; performing, by the UE, one of: determining that the UE is camped on Frequency Range 1 (FR1) or Sub6 Cell and triggering the request for cell selection, or determining that the UE is camped on Frequency Range 2 (FR2) or mmWave cell and selecting a best FR1 cell or Sub6 cell from a Ncell database in response to determining that the specific service required is a voice service; and determining that the UE is camped on Frequency Range 2 (FR2) or mmWave cell and triggering the request for cell selection, or determining that the UE is camped on FR1 or sub6 cell and selecting a best FR2 cell mmWave cell from a Ncell database in response to determining that the specific service required is a data service; and determining, by the UE, whether the cell reselection is required based on a serving cell and a neighboring cell condition; and performing, by the UE, one of: triggering, by the UE, the cell re-selection to a best Ncell from the Ncell database in response to determining that the cell reselecting is required; and triggering the request for cell re-selection to an already camped cell by the UE.

Accordingly, example embodiments disclose the UE for an optimal cell selection for camping the UE in a wireless network, where the UE comprising a memory; a processor; a communicator, comprising communication circuitry, coupled, directly or indirectly, to the processor and configured to: receive a plurality of Key Performance Indicators (KPIs) associated with the UE, where the plurality of KPIs comprises a data volume at the UE, a transmitter power at the UE, a battery level of the UE, network connection of the UE, an application data usage at the UE, data stalling condition at the UE and a service used by the UE; determine, whether at least one KPI from the plurality of KPIs meets at least one KPI criteria; and performing one of: prioritize a Sub6 cell over a mmWave cell and select the sub6cell cell as the optimal cell in response to determining that the at least one KPI from the plurality of KPIs meets the at least one KPI criteria, prioritizing a LTE cell over a Sub6 cell and selecting the LTE cell as the optimal cell in response to determining that the at least one KPI from the plurality of KPIs meets the at least one KPI criteria, prioritizing a LTE cell over an mmWave cell and selecting the LTE cell as the optimal cell in response to determining that the at least one KPI from the plurality of KPIs meets the at least one KPI criteria, and prioritizing an mmWave cell over a Sub6 cell and selecting the mmWave cell as the optimal cell in response to determining that the at least one KPI from the plurality of KPIs does not meets the at least one KPI criteria.

These and other aspects of example embodiments will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of example embodiments without departing from the spirit thereof, and example embodiments include all such modifications.

Example embodiments and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure example embodiments. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which example embodiments can be practiced and to further enable those skilled in the art to practice example embodiments. Accordingly, the examples should not be construed as limiting the scope of example embodiments.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, certain example embodiments should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, certain example embodiments provide a method and a UE for cell selection/resection and a method and a UE for prioritizing a sub6 cell/mmWave cell based on a plurality of parameters termed as KPIs. In an embodiment, the UE determines whether a KPI criteria is met and based on the KPI criteria being met, the UE chooses an optimal cell for camping. In an embodiment, choosing the optimal cell on which the UE camp is based on a service requested at the UE, a battery level of the UE, a transmitter power at the UE, a data volume at the UE, an internet connection at the UE, and a data stall at the UE.

According to the embodiments, the UE is able to achieve best performance with respect to connectivity, the battery level, call dropping and the like.

The method and the UE according to the embodiments ensure continuous connectivity and takes into consideration the UE parameters for optimal cell selection.

A list of various terms and their context with respect to the specification is provided below for better understanding:

ENDC—EUTRAN New Radio Dual Connectivity
EUTRA—Evolved Universal Terrestrial Radio Access
LTE—Long Term Evolution
eLTE—enhanced Long Term Evolution
5GC—$5^{th}$ Generation Core
NRENDC—New Radio EUTRAN New Radio Dual Connectivity
NGENDC—Next Generation EUTRAN New Radio Dual Connectivity
5G cell—Cell available in 5G frequency band
mmWave cell—Cell available in mmWave frequency band
LTE cell—Cell available in LTE frequency band
FR2—FR2 frequency band including mmWave (24-100 GHz)
FR1—FR1 frequency band including sub-6 GHz
Ncell—Neighboring cell
RSRP—Reference Signal Receive Power
Measurement Criteria—Condition when UE is allowed to measure neighbor cells
Measurement Report—Reporting the measured cells to network if the satisfy reporting criteria.
Measurement Objects—Cells that are configured by NW for the UE for measuring (when measuring criteria is met) and reporting (when reporting criteria is met).

Referring now to the drawings, and more particularly to FIGS. 1a through 21, where similar reference characters denote corresponding features consistently throughout the figures, there are shown preferred example embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the disclosure may be implemented in 5G systems. However, certain example embodiments are not limited to 5G systems or the frequency bands associated therewith, and embodiments of the disclosure may be utilized in connection with any frequency band. For example, aspects of the disclosure may also be applied to deployment of 5G communication systems, 6G or even later releases which may use terahertz (THz) bands.

FIG. 1a illustrates a block diagram of an User Equipment (100) for an optimal cell selection based on a service requested at the UE (100) or a plurality of Key Performance Indicators (KPIs) associated with the UE (100), according to certain example embodiments. The UE (100) is communicating in a wireless network. The wireless network may be, for example, but not limited to a 5G standalone network where the UE (100) connects to a 5G Core (5GC) via a Next Generation-Radio Access Network (NG-RAN) or via evolved Long Term Evolution (eLTE). In another embodiment, the wireless network may be a Non Standalone 5G Network such as ENDC, Next Generation ENDC (NGENDC) and New Radio ENDC (NRENDC) where the UE (100) connects to a LTE core network via Long Term Evolution Radio Access Network (LTERAN), or where the UE (100) connects LTE core via NG-RAN. In an embodiment, the UE (100) may be in a single registration mode or a dual registration mode. In the single registration mode, the UE (100) is registered either to an Evolved Packet Core (EPC) or the 5GC. In the dual registration, the UE (100) is registered on both the EPC and the 5GC simultaneously.

The UE (100) may be, for example, but not limited, to social robot, a smart watch, a cellular phone, a smart phone, a Personal Digital Assistant (PDA), a tablet computer, a laptop computer, an Internet of things (IoT) device, an Artificial intelligent (AI) device or the like.

In an embodiment, the UE (100) includes a memory (110), a processor (120), a communicator (130), and an optimal cell selector (140).

The memory (110) stores instructions to be executed by the processor (120) for selection of an optimal cell.

The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than another memory. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

In an embodiment, the processor (120) communicates with the memory (110), the communicator (130), and the optimal cell selector (140). The processor (120) is configured to execute instructions stored in the memory (110) and to perform various processes. The processor (120) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). Each "processor" herein comprises processing circuitry.

In an embodiment, the communicator (130), comprising communication circuitry, is configured for communicating internally between internal hardware components and with external devices via one or more networks. The communicator (130) includes an electronic circuit specific to a standard that enables wired or wireless communication.

The optimal cell selector (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like In an embodiment, the optimal cell selector (140), which may comprise processing circuitry, is responsible for determining the optimal cell on which the UE (100) camp. The optimal cell selector (140) identifies a trigger indicating an initiation of a service on the UE (100), while the UE (100) is currently camped on a first cell. In an embodiment, the first cell may be the sub6 cell or the mmWave cell or the LTE cell. Further, the optimal cell selector (140) checks an availability of an optimum frequency band in the first cell within which the UE (100) is to execute the service. The UE (100) scans for availability of the optimum frequency band in a second cell if the optimum frequency band is not available in the first cell and camps on the second cell having the optimum frequency band available. The optimum frequency band provides highest efficiency for the service. Further, the service initiated at the UE (100) may be a voice service or a data service over a 5G network or a 4G network or a Long Term Evolution (LTE) network. The optimum frequency band comprises a high, medium and low frequency band. The high frequency band may be a milimeterWave (mmWave) band or sub6 Time Division Duplex (TDD) band, the medium frequency band may be a sub6 Frequency Division Duplex (FDD) band and the low frequency band may be a Long Term Evolution (LTE band).

In an embodiment, connecting to the second cell on the optimum frequency band comprises connecting on the low frequency band in case that the service is a voice service or connecting on one of a high frequency band and a medium frequency band in case that the service is a data service.

In an embodiment, the optimal cell selector (140) is responsible for selecting a best available cell for camping the UE (100) based on a plurality of factors associated with the UE (100) and a radio link budget.

In an embodiment, the plurality of parameters associated with the UE (100) are a data volume at the UE (100), a transmitter power at the UE (100), a battery level of the UE (100), network connection of the UE (100), an application data usage at the UE (100), data stalling condition at the UE (100) and a service used by the UE (100). These parameters are hereafter terms as KPIs used for selecting the optimal cell on which the UE (100) camp.

In an embodiment, the UE (100) sets a pre-defined KPI criteria for each parameter from the KPIs. The pre-defined KPI criteria is explained in detail below in the specification. The UE (100) determines whether the pre-defined criteria is met for any of the parameter from the KPIs. If the pre-defined criteria for any parameter is met, then the UE (100) determines the cell over which the UE (100) is already camped and checks whether the current cell on which the UE (100) is the best cell. Further, depending upon the cell on which the UE (100) is currently camped and the pre-defined KPI criteria being met, the UE (100) selects the optimal cell for the UE (100) by prioritizing a candidate cell over the current cell on which the UE (100) is camped.

In an embodiment, the UE (100) may prioritize a sub6 cell when connected, directly or indirectly, to a mmWave cell, or the UE (100) may prioritize the mmWave cell over the sub6 cell, or the UE may prioritize a LTE cell over the sub6 cell and the mmWave cell. The conditions for prioritizing the cell is explained in detail in the specification below.

In another embodiment, the UE (100) determines the service which is ongoing on the UE (100), such a voice call, and the like. The UE (100) further determines a type of a service by determining requirements of the service. For example, if a user of a UE (100) is viewing a video content on the UE (100), then the UE (100) requires data continuously. Upon determining the service type, the UE (100) determines the cell on which the UE (100) is camped. Further, the UE (100) checks if the requirements of the type of service determined matches with the cell on which the UE is camped. If the requirements of the type of the service is not matched with the cell on which the UE is camped, then the UE (100) proceeds for reselection of the cell on which the UE (100) camp. While reselection, the UE (100) searches for the cell which matches the requirements of the type of service determined. In an embodiment, during reselection of the cell, the UE (100) may select the mmWave cell over the sub6 cell and a FR1 Cell, or a FR2 cell over the sub6 cell and the FR1 Cell, or the sub6 cell over the mmWave cell and the FR2 cell, or the FR1 cell over the mmWave cell and the FR2 cell.

As mentioned above, the embodiments of the disclosure provide the method and apparatus for selecting/reselecting the optimal cell for the UE (100) based on the KPIs and the service ongoing on the UE (100) and/or requested on the UE (100).

Although the FIG. 1a shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function to select the optimal cell for the UE (100).

Figure 1B:
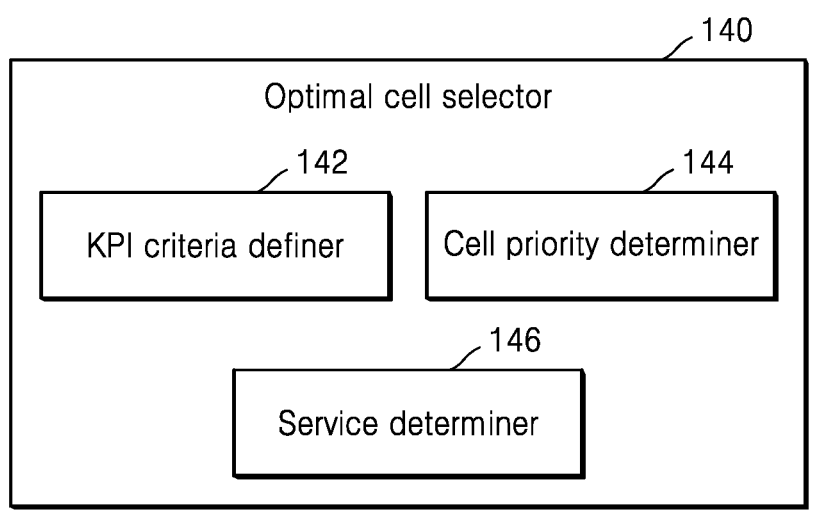
FIG. 1b illustrates a block diagram of an optimal cell selector for selecting the optimal cell for camping the UE, according to an example embodiment.

FIG. 1B illustrates a block diagram of the optimal cell selector (140) for selecting the optimal cell on which the UE (100) camps, according to an embodiment as disclosed herein.

In an embodiment, the optimal cell selector (140) comprises a KPI criteria definer (142), a cell priority determiner (144), and a service determiner (146).

The KPI criteria definer (142) sets the pre-defined KPI criteria for each parameter from the KPIs. Further, the KPI criteria definer (142) also checks whether the pre-defined KPI criteria is met for any of the parameters and informs the cell priority determiner (144) of the result of the check.

The KPI criteria definer (142) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Upon receiving information from the KPI criteria definer (142), the cell priority determiner (144) accordingly prioritizes the cell based on the parameter and the pre-defined criteria being met. The complete cell prioritization for each parameter from the KPIs is explained below.

The service determiner (146) identifies the service requested at the UE (100) and a current service being run on the UE (100). Based on the service, the UE (100) chooses the optimal cell. The cell prioritization based on the service is explained below.

The above described at least one of the plurality of modules/components may be implemented through an Artificial Intelligence (AI) model. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning indicates that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1B shows various hardware components of the optimal cell selector (140) is to be understood that other embodiments are not limited thereon. In other embodiments, the optimal cell selector (140) may include less or more number of components. Further, the labels or names of the components are used only for illustrative purpose and does not limit the scope of the disclosure. One or more components can be combined together to perform same or substantially similar function to optimal cell selection.

Figure 2A:
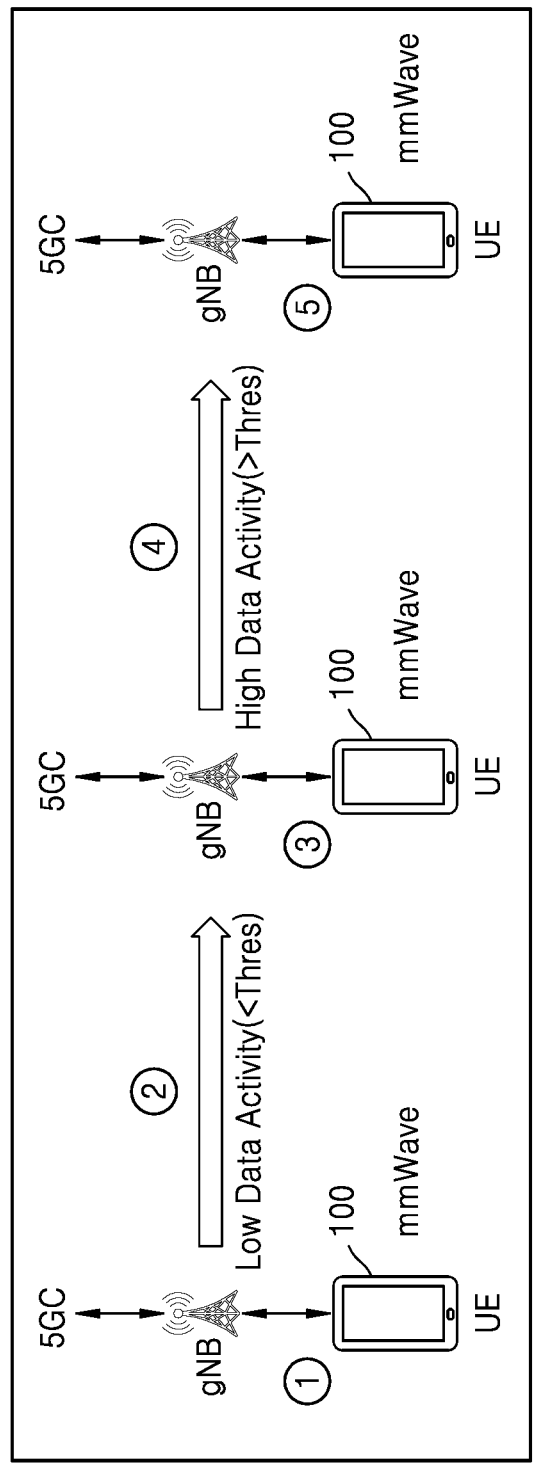
FIG. 2a is a schematic diagram illustrating an example operation of the UE during change in the data volume.

FIG. 2a is a schematic diagram illustrating an operation of the UE (100) during change in the data volume, according to a prior art.

Referring to the FIG. 2a, the UE (100) may be connected to the 5GC over the eNB. It is assumed that the UE (100) is presently camped on the mmWave cell as seen at 1. At 2, if a data activity at the UE (100) is determined to be less than a data volume threshold, then the UE (100) need not be camped on the mmWave cell as the data activity at the UE (100) is less than the data volume threshold. However, as seen at 3, the UE (100) is still camped on the mmWave cell. Thus, there is extra loss of the battery level, as the UE (100) consumes more electric power due to being camped on the mmWave cell. Further, at 4, the data activity at the UE (100) is determined to be more than the data volume threshold.

Since the data activity is more than the data volume threshold, the UE (100) should be on the mmWave cell. As seen at 5, the UE (100) is still on the mmWave cell. It is to be noted that the UE (100) should be camped on the optimal cell for better performance of the UE (100). As stated in the above example, the prior art does not disclose the UE (100) camps on the optimal cell based on the data activity/data volume at the UE (100). According to the above example, the UE (100) is camped on the same cell irrespective of the data activity at the UE (100). Thus, there is a need to provide a method and device for optimal cell selection based on the data activity/data volume at the UE (100). Certain example embodiments provides the method and the device for the optimal cell selection based on the data activity/data volume at the UE (100).

Figure 2B:
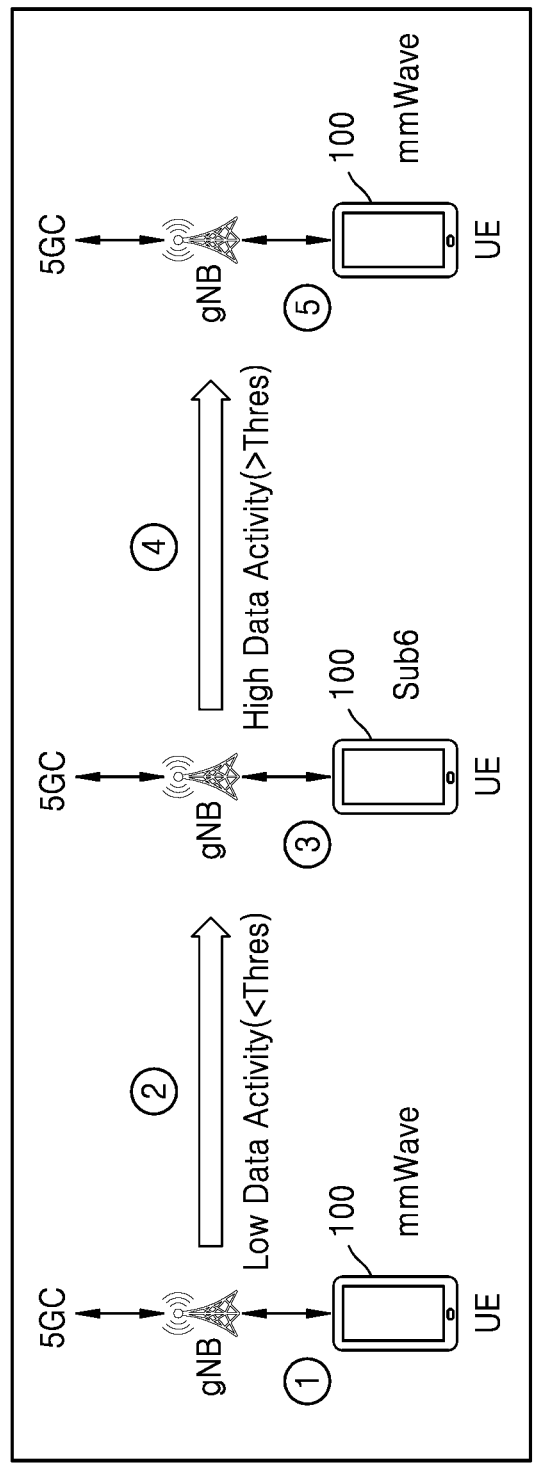
FIG. 2b is a schematic diagram illustrating an operation of the UE during change in the data volume, according to an example embodiment.

FIG. 2b is a schematic diagram illustrating an operation of the UE during change in the data volume, according to an example embodiment.

As seen in FIG. 2b, the UE (100) is connected to the 5GC over the gNB. It is assumed that the UE (100) is presently camped on the mmWave cell as seen at 1. At 2, if the data activity at the UE (100) is determined to be less than the data volume threshold, then the UE (100) need not be camped on the mmWave cell as the data activity at the UE (100) is less than the data volume threshold. Thus, the UE (100) disables mmWave cell and move to sub6 cell at 3. Thus, there is extra saving of battery, as the UE (100) consumes less power due to being camped on the sub6 cell which includes lower frequency band than the mmWave cell. Further, as seen at 4, it is assumed that the data activity at the UE (100) is determined to be more than the data volume threshold. Since the data activity is more than the data volume threshold, the UE (100) should be on mmWave cell. Thus, as seen at 5, the UE (100) disables the sub6 cell and move to the mmWave cell. It is to be noted that if the UE (100) is camped on the optimal cell for better performance of the UE (100). According to the embodiment of the disclosure, the UE (100) camps on the optimal cell based on the data activity/data volume at the UE (100).

Figure 2C:
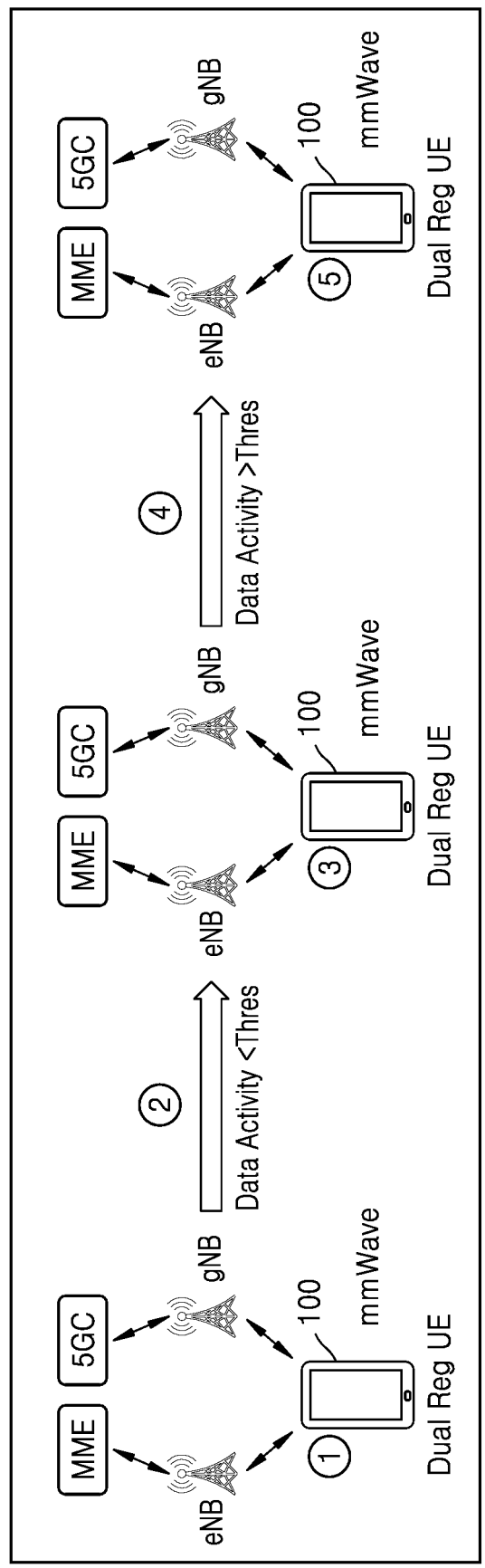
FIG. 2c is a schematic diagram illustrating an example operation of the UE during change in the data volume where the UE is in the dual registration mode.

FIG. 2c is a schematic diagram illustrating an operation of the UE during change in the data volume where the UE is in the dual registration mode, according to a prior art.

As seen in the FIG. 2c, it is assumed that the UE (100) is firstly in dual registration mode and is connected to the 5GC over the gNB and to MME over eNodeB (eNB). The UE (100) is presently camped on the mmWave cell as seen at 1. At 2, if the data activity at the UE (100) is determined to be less than the data volume threshold, then the UE (100) need not be camped on the mmWave cell as the data activity at the UE (100) is less than the data volume threshold. However, as seen at 3, the UE (100) is still camped on the mmWave cell according to the prior art. Thus, there is extra loss of the battery level, as the UE (100) consumes more electric power due to being camped on the mmWave cell. Further, at 4, if the data activity at the UE (100) is determined to be more than the data volume threshold, then the UE (100) should be on mmWave cell. As seen at 5, the UE (100) is still on the mmWave cell because there was no cell change. It is to be noted that the UE (100) should be camped on the optimal cell for better performance of the UE (100). As stated in the present example, the prior art does not disclose camping the UE (100) on the optimal cell based on the data activity/data volume at the UE (100). In fact, the UE (100) is camped on the same cell irrespective of the data activity at the UE (100). Thus there is a need to provide a method and device for optimal cell selection based on the data activity/data volume at the UE (100). Certain example embodiments provide the method as device for optimal cell selection based on the data activity/data volume at the UE (100).

Figure 2D:
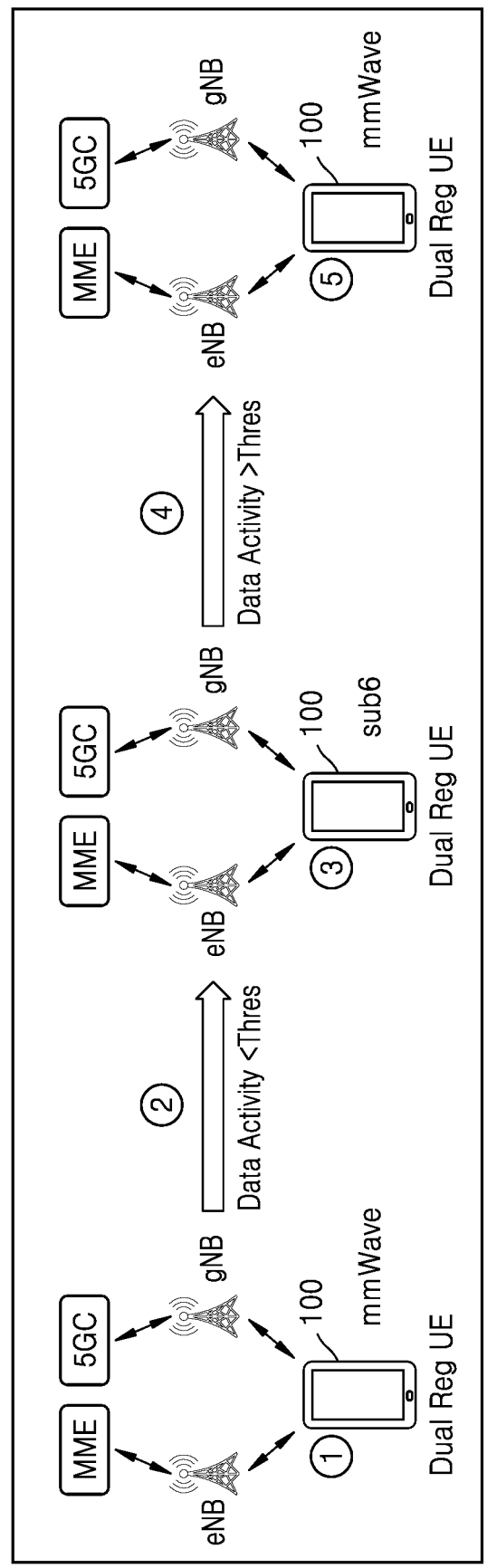
FIG. 2d is a schematic diagram illustrating an operation of the UE during change in the data volume where the UE is in the dual registration mode, according to an example embodiment.

FIG. 2d is a schematic diagram illustrating an operation of the UE during change in the data volume according to an example embodiment.

As seen in FIG. 2d, it is assumed that the UE (100) is firstly connected to the 5GC over the gNB and to the MME over the eNB in dual registration mode. The UE (100) is presently camped on the mmWave cell as seen at 1. At 2, if the data activity at the UE (100) is determined to be less than the data volume threshold, then the UE (100) need not be camped on the mmWave cell as the data activity at the UE (100) is less than the data volume threshold. Thus, the UE (100) disables the mmWave cell and move to the sub6 cell at 3. Thus, there is extra saving of battery, as the UE (100) consumes less power when being camped on the sub6 cell. Further, at 4, if the data activity at the UE (100) is determined to be more than the data volume threshold, then the UE (100) should be on mmWave cell. As seen at 5, the UE (100) disables the sub6 cell and move to the mmWave cell. It is to be noted that if the UE (100) is camped on the optimal cell for better performance of the UE (100). As stated in the present example, the claimed method disclose camping the UE (100) on the optimal cell based on the data activity/data volume at the UE (100).

Figure 2E:
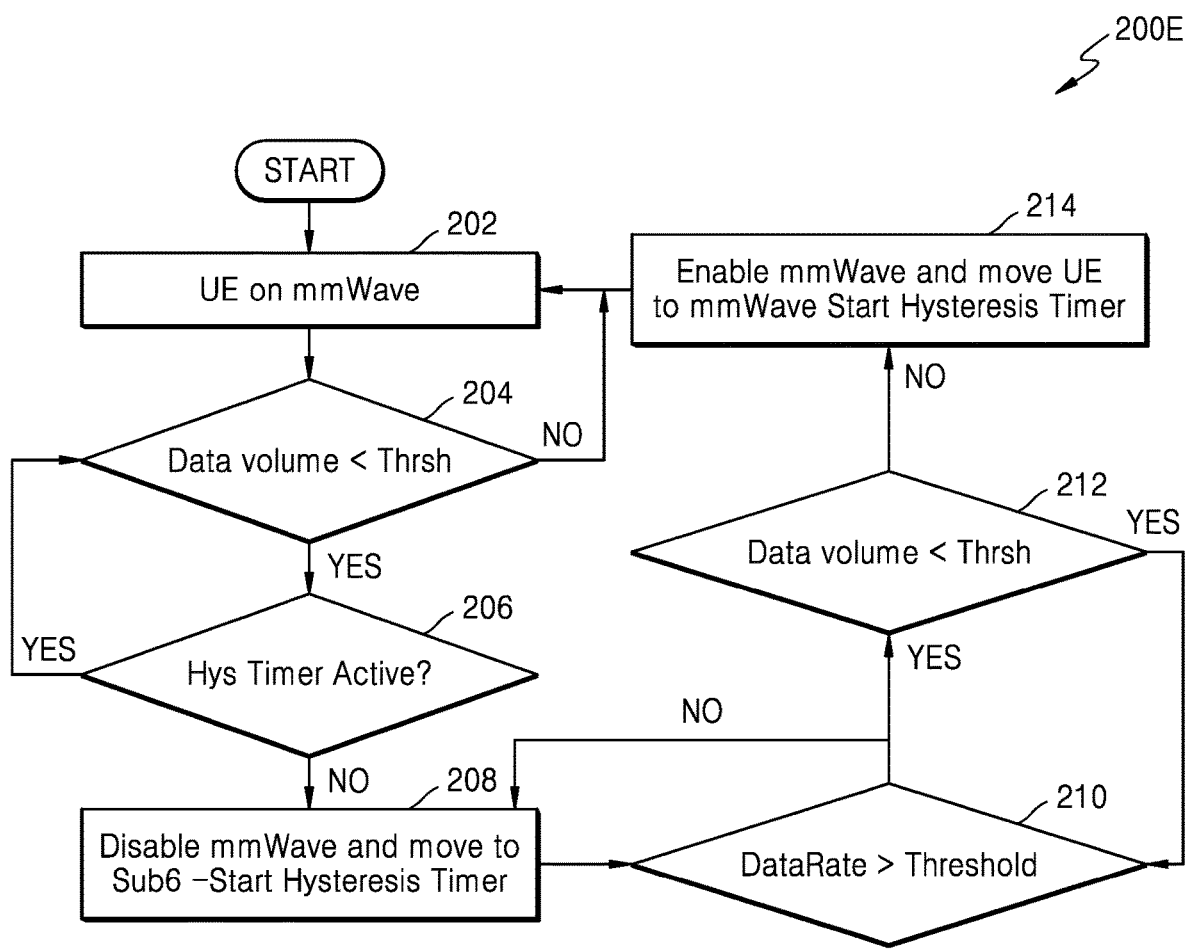
FIG. 2e is a flow diagram, illustrating an embodiment of choosing the optimal cell based on a data volume at the UE, according to an example embodiment.

FIG. 2e is flow diagram, illustrating an embodiment of choosing the optimal cell based on the data volume at the UE (100), according to an embodiment as disclosed herein.

In the present embodiment, the UE (100) is in connected mode and may be camped to the sub6 cell or the mmWave cell. The UE (100) needs to determine whether the cell on which the UE (100) is camped is the optimal cell or not. For determining, the UE (100) checks the data volume and determines whether the pre-defined KPI criteria for the data volume at the UE (100) is met. In the present embodiment, the data volume may be considered as the KPI. In the present embodiment, the UE may be in the single registration mode, or the dual registration mode.

Referring to FIG. 2e, at operation 202, the UE (100) is camped on the mmWave cell. At operation 204, the UE (100) determines whether the data volume at the UE (100) less than the data volume threshold. Operation 206 is performed in case that the data volume at the UE (100) is less than the data volume threshold. Operation 202 is performed in case that the data volume at the UE (100) is greater than the data volume threshold. At operation 202, the UE (100) is camped on the mmWave cell in case that the data volume at the UE (100) is greater than the data volume threshold, the UE (100) is retained on the mmWave cell.

Whereas at operation 206, the UE (100) checks whether a hysteresis timer is active or expired. The hysteresis timer is used in order to avoid Ping-Pong effect. This avoids continuous enablement and disablement of the mmWave/the Sub6 capability. In other words, the hysteresis timer prevents or reduces frequent switching between the mmWave/ the Sub6. Operation 208 is performed in case that the hysteresis timer is expired (non-active). Operation 204 is performed again in case that the hysteresis timer is active.

At operation 208, the UE (100) disables the mmWave cell and camps on the sub6 cell. Further, the hysteresis time is activated at operation 208. It is to be noted that since the data volume at the UE (100) is less than the data volume threshold, there is no requirement for the mmWave frequency and thus, the UE (100) disables the mmWave cell and camps on the sub6 cell which suits to the requirement of the UE (100). Thereby the power consumption by the UE (100) is reduced considerably. Further, moving to the mmWave cell happens only when the mmWave cell is needed. The mmWave cell coverage is short, and a frequency range for the mmWave cell is high, thus the UE (100) consumes more power to operate in the mmWave cell. By avoiding the mmWave cell when it is not necessary, the power consumption is reduced considerably.

After switching to the sub6 cell and activating the hysteresis timer, the UE (100) checks if the data rate at the UE (100) is greater than a data rate threshold at operation 210. Operation 212 is performed in case that the data rate at the UE (100) is greater than the data rate threshold.

Operation 208 is performed again in case that the data rate at the UE (100) is not greater than the data rate threshold. At operation 208, the UE (100) is camped on the sub6 cell and in case that the data volume at the UE (100) is less than the data volume threshold, the UE (100) is retained on the sub6 cell.

Whereas at operation 212, the UE (100) checks whether the hysteresis timer is active or expired. Operation 214 in response in case that the hysteresis timer is expired. Operation 210 is performed in case that the hysteresis timer is active. At operation 214, the UE (100) disables the sub6 cell and camps on the mmWave cell. Further, the hysteresis time is activated at operation 214.

It is to be noted that if the data rate at the UE (100) is greater than the threshold rate at operation 210, there is no requirement for the sub6 frequency and then, the UE (100) disables the sub6 cell and camps on the mmWave cell which suits the requirement of the UE (100). Thereby fulfilling data requirement is performed efficiently by choosing to move to the mmWave cell only when necessary.

Figure 3A:
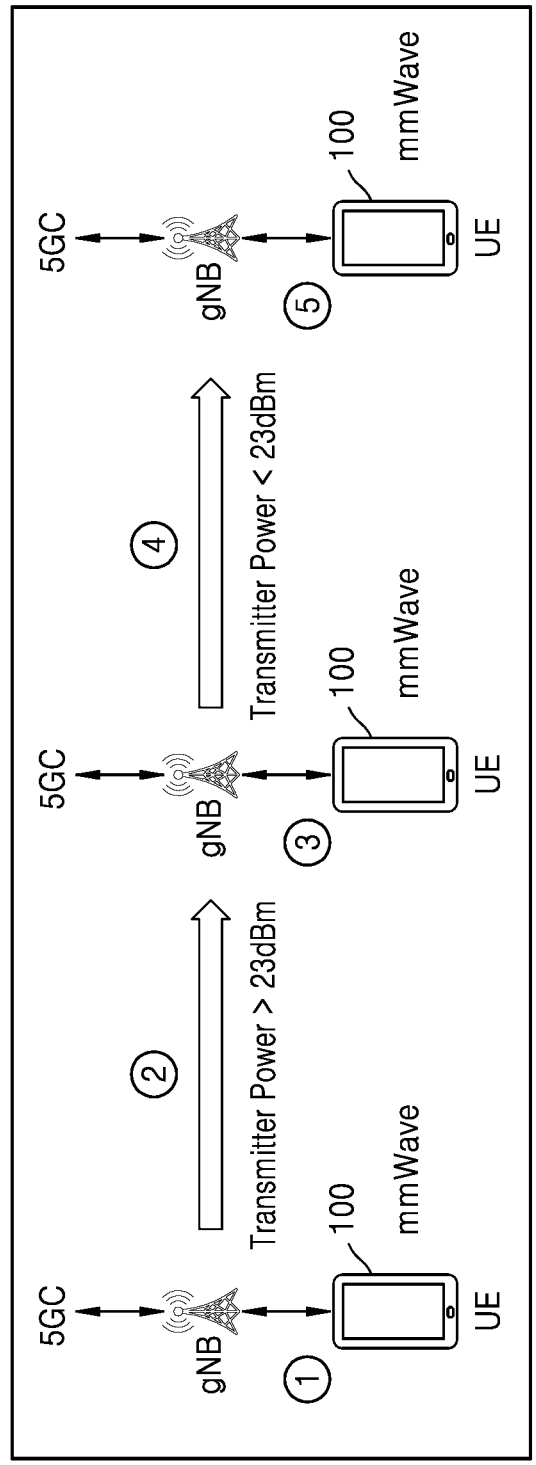
FIG. 3a is a schematic diagram illustrating an example operation of the UE based on a transmitter power.

FIG. 3a is a schematic diagram illustrating an operation of the UE during change in the transmitter power, according to a prior art.

As seen in FIG. 3a, the UE (100) is connected to the 5GC over the gNB. It is assumed that the UE (100) is presently camped on the mmWave cell as seen at 1. At 2, the transmitter power at the UE (100) is determined to be more than a threshold power, for example, 23 dBm, then UE (100) need not be camped on the mmWave cell. However, as seen at 3, the UE (100) is still camped on the mmWave cell. Thus, there is extra loss of battery, as the UE (100) consumes more power when being camped on the mmWave cell. Further, at 4, the transmitter power at the UE (100) is determined to be greater than 23 dBm. Since the transmitter power is more than the threshold power, the UE (100) should be on the mmWave cell. As shown at 5, the UE (100) is still on the mmWave cell. It is to be noted that the UE (100) should be camped on the optimal cell for better performance of the UE (100). As stated in the present example, the prior art does not disclose camping the UE (100) on the optimal cell based on the transmitter power at the UE (100). The cell on which the UE (100) camps (is connected to) does not change according to the transmitter power at the UE (100). In fact, according to the prior art, the UE (100) is camped on the same cell irrespective of the transmitter power at the UE (100). Thus, there is a need to provide a method and device for optimal cell selection based on the transmitter power at the UE (100). Certain example embodiments provides the method as device for optimal cell selection based on the transmitter power at the UE (100).

Figure 3B:
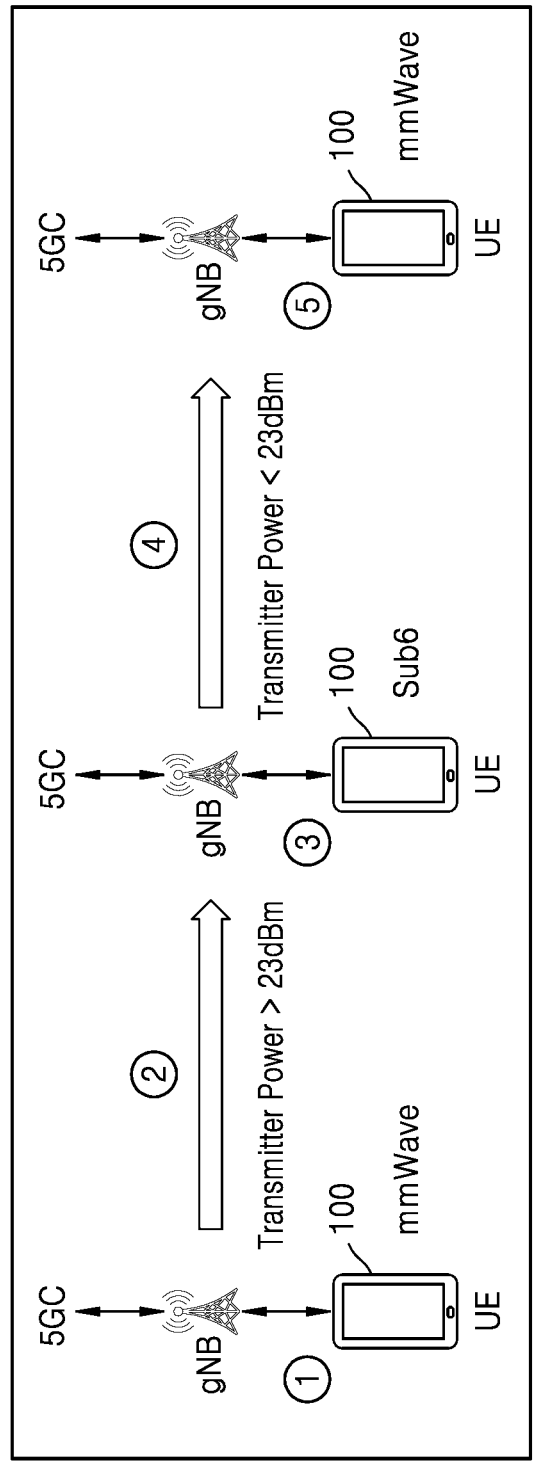
FIG. 3b is a schematic diagram illustrating an operation of the UE based on the transmitter power, according to an example embodiment.

FIG. 3b is a schematic diagram illustrating an operation of the UE during change in the transmitter power, according to an embodiment of disclosure.

As seen in FIG. 3b, the UE (100) is connected to the 5GC over the gNB. The UE (100) is presently camped on the mmWave cell as seen at 1. At 2, if the transmitter power at the UE (100) is determined to be more than 23 dBm, then the UE (100) need not be camped on the mmWave cell. Thus, the UE (100) disables mmWave cell and move to sub6 cell at 3. Thus, there is extra saving of battery, as the UE (100) consumes less power when being camped on the sub6 cell. Further, at 4, if the transmitter power at the UE (100) is determined to be less than 23 dBm, then the UE (100) should be on mmWave cell. As see at 5, the UE (100) disables the sub6 cell and move to the mmWave cell. It is to be noted that the UE (100) is camped on the optimal cell for better performance of the UE (100). As stated in the present example, the claimed method disclose the UE (100) camps on the optimal cell based on the transmitter power at the UE (100).

Figure 3C:
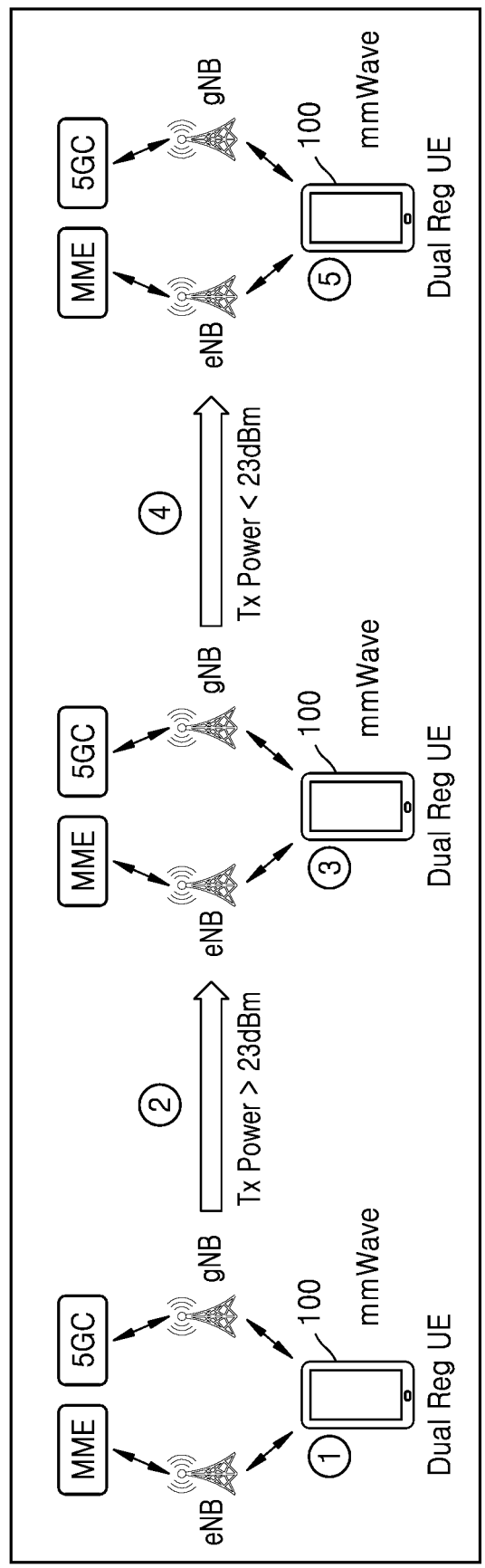
FIG. 3c is a schematic diagram illustrating an example operation of the UE based on the transmitter power where the UE is in the dual registration mode.

FIG. 3c is a schematic diagram illustrating an operation of the UE during change in the transmitter power where the UE is in the dual registration mode, according to a prior art.

As seen in FIG. 3c, the UE (100) is in the dual registration mode and is connected to the 5GC over the gNB and to MME over the eNB. The UE (100) is presently camped on the mmWave cell as seen at 1. At 2, a transmitter power at the UE (100) is determined to be more than 23 dBm, then the UE (100) need not be camped on the mmWave cell. However, as seen at 3, the UE (100) is still camped on the mmWave cell. Thus, there is extra loss of battery, as the UE (100) consumes more power when being camped on the mmWave cell. Further, at 4, the transmitter power at the UE (100) is determined to be greater than 23 dBm. Since the transmitter power is more the UE (100) should be on mmWave cell. As see at 5, the UE (100) is still on mmWave cell. It is to be noted that the UE (100) should be camped on the optimal cell for better performance of the UE (100). As stated in the present example, the prior art does not disclose that the UE (100) camps on the optimal cell based on the transmitter power at the UE (100). In fact the UE (100) is camped on the same cell irrespective of the transmitter power at the UE (100). Thus, there is a need to provide a method and device for the optimal cell selection based on the transmitter power at the UE (100). Certain example embodiments provides the method and device for optimal cell selection based on the transmitter volume at the UE (100).

Figure 3D:
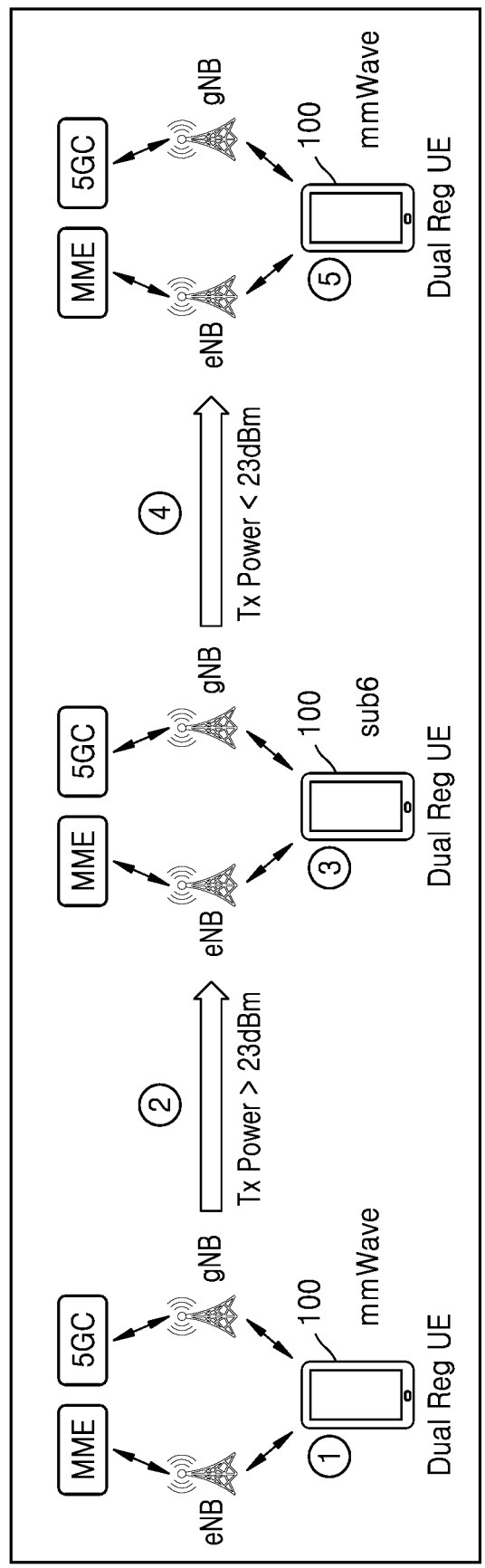
FIG. 3d is a schematic diagram illustrating an operation of the UE based on the transmitter power where the UE is in the dual registration mode, according to an example embodiment.

FIG. 3d is a schematic diagram illustrating an operation of the UE during change in the transmitter power, according to an example embodiment.

As seen in FIG. 3d, the UE (100) is connected to the 5GC over the gNB and to the MME over the eNB. The UE (100) is presently camped on the mmWave cell as seen at 1. At 2, the transmitter power at the UE (100) is determined to be greater than 23 dBm, then the UE (100) need not be camped on the mmWave cell. Thus, the UE (100) disables the mmWave cell and move to the sub6 cell at 3. Thus, there is extra saving of battery level, as the UE (100) consumes less electric power when being camped on the sub6 cell. Further, at 4, the transmitter power at the UE (100) is determined to be less than 23 dBm, the UE (100) should be on mmWave cell. As seen at 5, the UE (100) disables the sub6 cell and moves to the mmWave cell. It is to be noted that if the UE (100) is camped on the optimal cell for better performance of the UE (100). As stated in the present example, the claimed method disclose camping the UE (100) on the optimal cell based on the transmitter power at the UE (100).

Figure 3E:
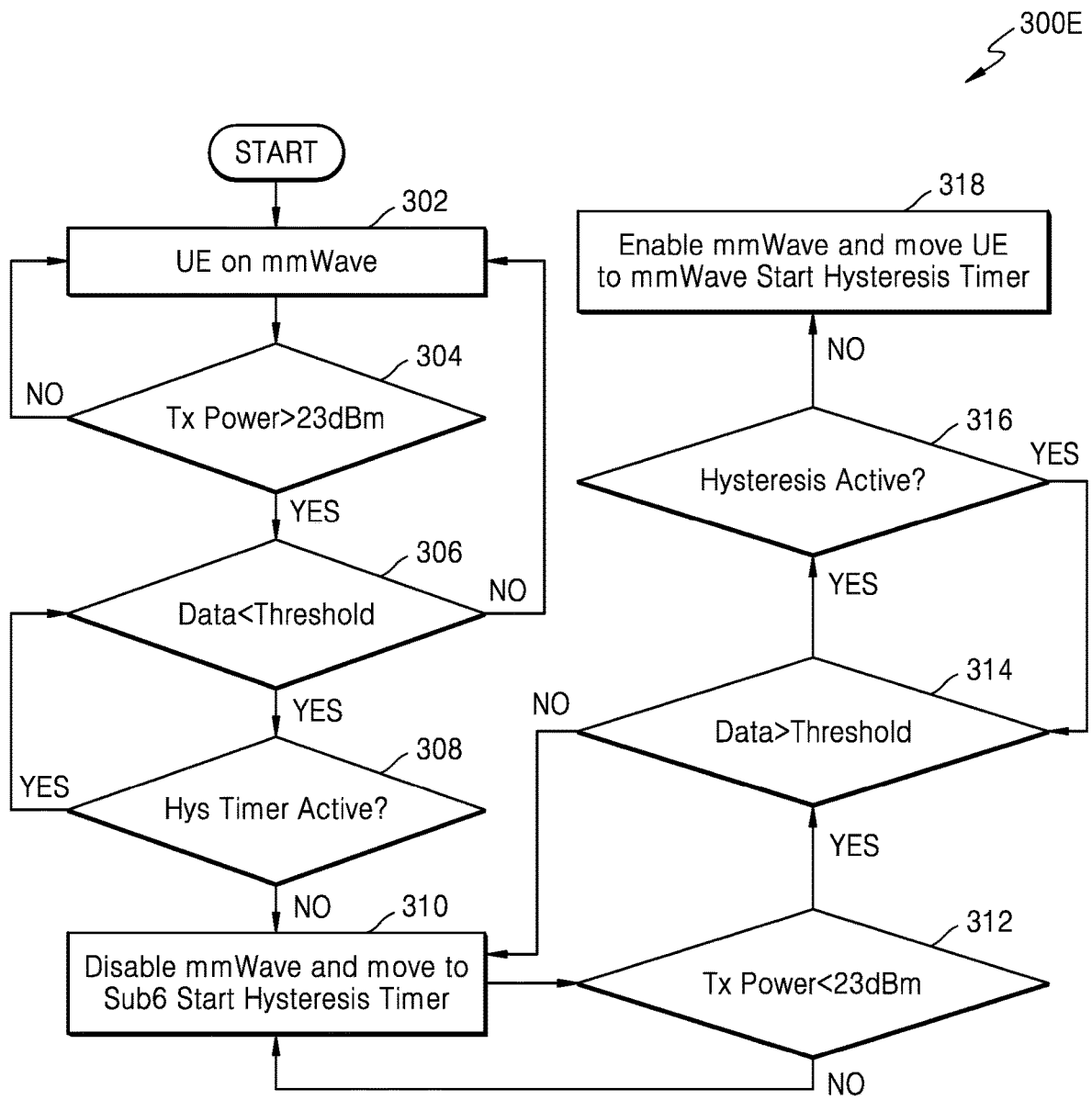
FIG. 3e is flow diagram, illustrating an embodiment of choosing the optimal cell based on the transmitter power at the UE, according to an example embodiment.

FIG. 3e is flow diagram, illustrating an embodiment of choosing the optimal cell based on the transmitter power at the UE (100), according to an example embodiment.

In the present embodiment, the UE (100) may be in connected mode and may be camped to the sub6 cell or the mmWave cell. The UE (100) needs to determine whether the cell on which the UE (100) is camped is the optimal cell or not. For determining so, the UE (100) checks the transmitter power at the UE (100) along with the data rate required at the UE (100) and determines whether the pre-defined KPI criteria for the transmitter power at the UE (100) is met. In the present embodiment, the transmitter power may be the KPI. In the present embodiment, the UE may be in a single registration mode or a dual registration mode.

Referring to FIG. 3e, at operation 302, it is assumed that the UE (100) is camped on the mmWave cell. At operation 304, the UE (100) determines whether the transmitter power at the UE (100) is greater than the threshold power, for example, 23 dBm. Operation 306 is performed in case that the transmitter power at the UE (100) is less than 23 dBm. Operation 302 is performed again in case that the transmitter power at the UE (100) is less than 23 dBm.

At operation 306, the UE (100) determines whether the data volume at the UE (100) is less than the data volume threshold. Operation 308 is performed in case that the data volume at the UE (100) is less than the data volume threshold. Operation 302 is performed again in case that that the data volume at the UE (100) is greater than the data volume threshold. As seen, at operation 302, the UE (100) is camped on the mmWave cell and hence the data volume at the UE (100) is greater than the data volume threshold, and the transmitter power is greater than 23 dBm, the UE (100) is retained on the mmWave cell.

Whereas at operation 308, the UE (100) checks whether the hysteresis timer is active or expired. Operation 310 is performed in case that the hysteresis timer is expired. Operation 306 is performed again in case that the hysteresis timer is active.

At operation 310, the UE (100) disables the mmWave cell and camps on the sub6 cell. Further, the hysteresis time is activated at operation 310. It is to be noted that since the data volume at the UE (100) is less than the data volume threshold, there is no requirement for the mmWave frequency and thus, the UE (100) disables the mmWave cell and camps on the sub6 cell which suits the requirement of the UE (100). Thereby, the power consumption by the UE (100) is reduced considerably.

After switching to the sub6 cell and activating the hysteresis timer, the UE (100) again checks if the transmitter power is less than 23 dBm at operation 312. Operation 314 is performed in case that the transmitter power is less than 23 dBm. Operation 310 is performed again in case that the transmitter power is greater than 23 dBm.

At operation 314, the UE (100) again checks if the data volume at the UE (100) is greater than the data volume threshold.

Operation 316 is performed in case that the data volume at the UE (100) is greater than the data volume threshold.

Operation 310 is performed again in case that the data volume at the UE (100) is not greater than the data volume threshold. As seen, at operation 310, the UE (100) is camped on the sub6 cell and hence after determining that the data volume at the UE (100) is less than the data volume threshold and the transmitter power is greater than 23 dBm, the UE (100) is retained on the sub6 cell.

Whereas at operation 316, the UE (100) checks whether the hysteresis timer is active or expired. Operation 318 is performed in case that the hysteresis timer is expired. Operation 314 is performed again in case that the hysteresis timer is active. At operation 318, the UE (100) enables the mmWave cell and camps on the mmWave cell.

It is to be noted that the data volume at the UE (100) is greater than the threshold volume at operation 314, there is no requirement for the sub6 frequency and then, the UE (100) disables the sub6 cell and camps on the mmWave cell which suits the requirement of the UE (100). Thereby, data requirement is fulfilled efficiently.

Figure 4A:
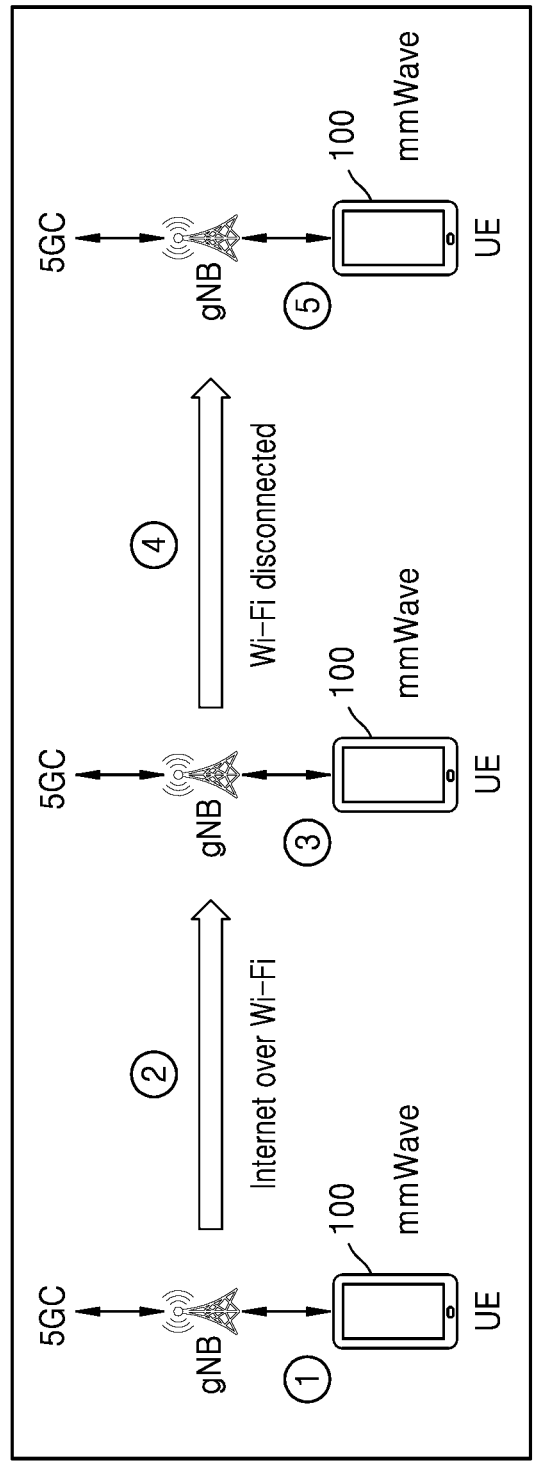
FIG. 4a is a schematic diagram illustrating an example operation of the UE based on connectivity of the UE to WiFi, where the UE is in single registration mode.

FIG. 4a is a schematic diagram illustrating an operation of the UE based on connectivity of the UE to WiFi, where the UE is in single registration mode according to a prior art.

As seen in FIG. 4a, the UE (100) is connected to the 5GC over the gNB. The UE (100) is presently camped on the mmWave cell as seen at 1. At 2, UE (100) is determined to be connected to the WiFi, then the UE (100) need not be camped on the mmWave cell. However, as seen at 3, the UE (100) is still camped on the mmWave cell. Thus, there is extra loss of battery, as the UE (100) consumes more power due to being camped on the mmWave cell. Further, at 4, the Wi-Fi is disconnected and the UE (100) should be on mmWave cell. As seen at 5, the UE (100) is still on mmWave cell. It is to be noted that the UE (100) should be camped on the optimal cell for better performance of the UE (100). As stated in the present example, the prior art does not disclose the UE (100) camps on the optimal cell based on the WiFi connectivity at the UE (100). In fact, the UE (100) is camped on the same cell irrespective of the Wi-Fi connection at the UE (100). Thus, there is a need to provide a method and device for optimal cell selection based on the Wi-Fi connectivity at the UE (100). Certain example embodiments provides the method and device for optimal cell selection based on the Wi-Fi connectivity at the UE (100).

Figure 4B:
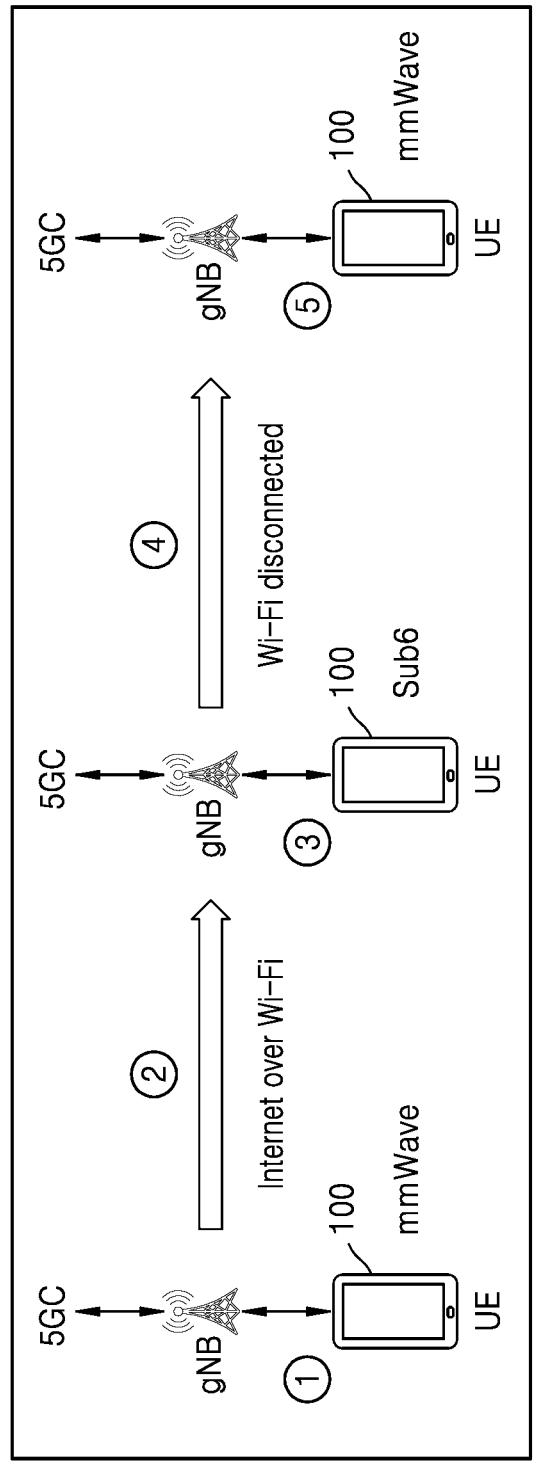
FIG. 4b is a schematic diagram illustrating an operation of the UE based on the Wi-Fi connectivity, according to an example embodiment.

FIG. 4b is a schematic diagram illustrating an operation of the UE based on the Wi-Fi connectivity, according to an embodiment as disclosed herein.

As seen in FIG. 4b, the UE (100) is connected to the 5GC over the gNB. The UE (100) is presently camped on the mmWave cell as seen at 1. At 2, the UE (100) is determined to be connected to the Wi-Fi, then the UE (100) need not be camped on the mmWave cell. Thus, the UE (100) disables the mmWave cell and move to the sub6 cell at 3. Thus, there is extra saving of battery, as the UE (100) consumes less power when being camped on the sub6 cell. Further, at 4, the Wi-Fi is disconnected and hence the UE (100) should be on mmWave cell. As seen at 5, the UE (100) disables the sub6 cell and move to the mmWave cell. It is to be noted that the UE (100) is camped on the optimal cell for better performance of the UE (100). As stated in the present example, according to the embodiments of the disclosure, the UE (100) camps on the optimal cell based on Wi-Fi connectivity at the UE (100).

Figure 4C:
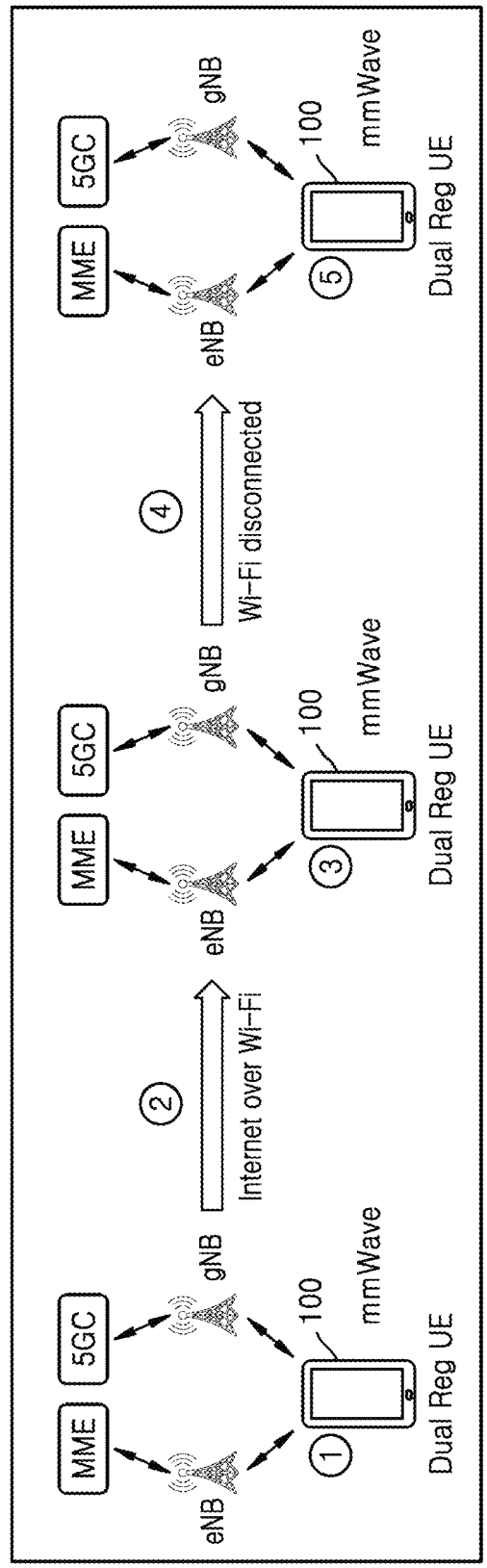
FIG. 4c is a schematic diagram illustrating an example operation of the UE based on Wi-Fi connectivity where the UE is in dual registration mode.

FIG. 4c is a schematic diagram illustrating an operation of the UE based on Wi-Fi connectivity where the UE is in dual registration mode, according to a prior art.

As seen in FIG. 4c, the UE (100) is in dual registration mode and is connected to the 5GC over the gNB and to MME over eNB. The UE (100) is presently camped on the mmWave cell as seen at 1. At 2, UE (100) is determined to be connected to the WiFi, then the UE (100) need not be camped on the mmWave cell. However, as seen at 3, the UE (100) is still camped on the mmWave cell. Thus, there is extra loss of battery, as the UE (100) consumes more power when being camped on the mmWave cell. Further, at 4, the Wi-Fi is disconnected and the UE (100) should be on mmWave cell. As seen at 5, the UE (100) is still on mmWave cell. It is to be noted that the UE (100) should be camped on the optimal cell for better performance of the UE (100). As stated in the present example, the prior art does not disclose camping the UE (100) on the optimal cell based on the WiFi connectivity at the UE (100). In fact, the UE (100) is camped on the same cell irrespective of the Wi-Fi connectivity at the UE (100). Thus, there is a need to provide a method and device for optimal cell selection based on the Wi-Fi connectivity at the UE (100). Certain example embodiments provide the method and device for optimal cell selection based on the Wi-Fi connectivity at the UE (100).

Figure 4D:
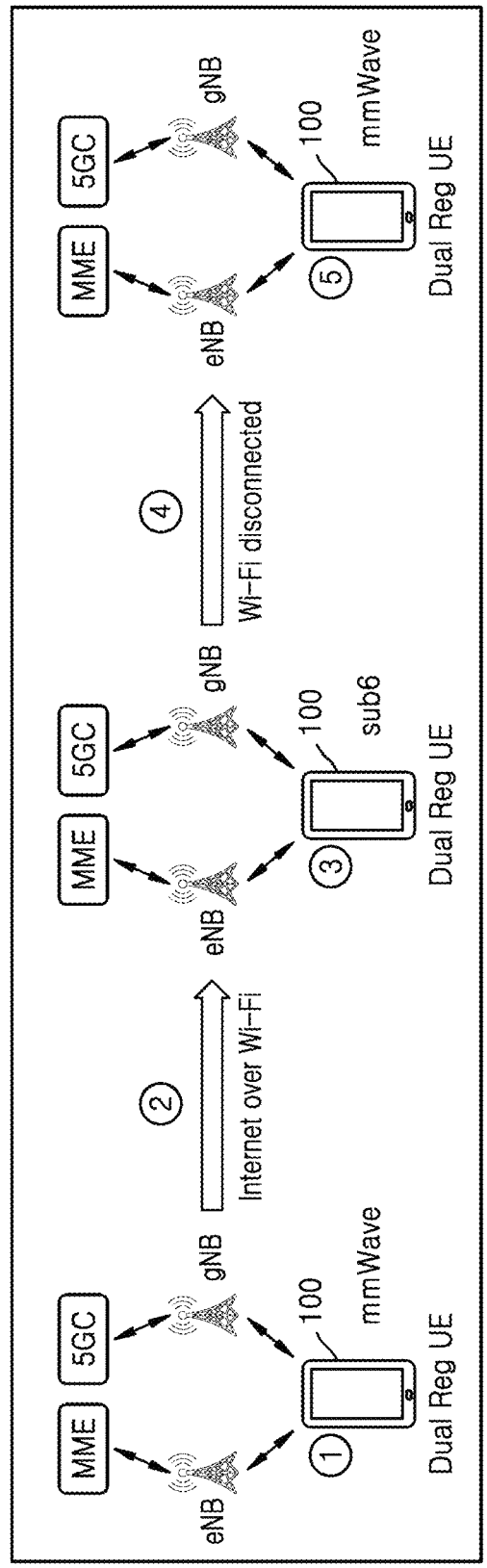
FIG. 4d is a schematic diagram illustrating an example operation of the UE based on Wi-Fi connectivity where the UE is in dual registration mode, according to an example embodiment.

FIG. 4d is a schematic diagram illustrating an operation of the UE based on the Wi-Fi, according to an example embodiment.

As seen in FIG. 4d, the UE (100) is connected to the 5GC over the gNB and to the MME over the eNB. The UE (100) is presently camped on the mmWave cell as seen at 1. At 2, the UE (100) is determined to be connected to the Wi-Fi, which explains that the UE (100) need not be camped on the mmWave cell. Thus, the UE (100) disables the mmWave cell and move to the sub6 cell at 3. Thus, there is extra saving of battery, as the UE (100) consumes less power when being camped on the sub6 cell. Further, at 4, the Wi-Fi is disconnected and hence the UE (100) should be on mmWave cell. As seen at 5, the UE (100) disables the sub6 cell and move to the mmWave cell. It is to be noted that if the UE (100) is camped on the optimal cell for better performance of the UE (100). As stated in the present example, according to the embodiments of the disclosure, the UE (100) camps on the optimal cell based on Wi-Fi connectivity at the UE (100).

Figure 4E:
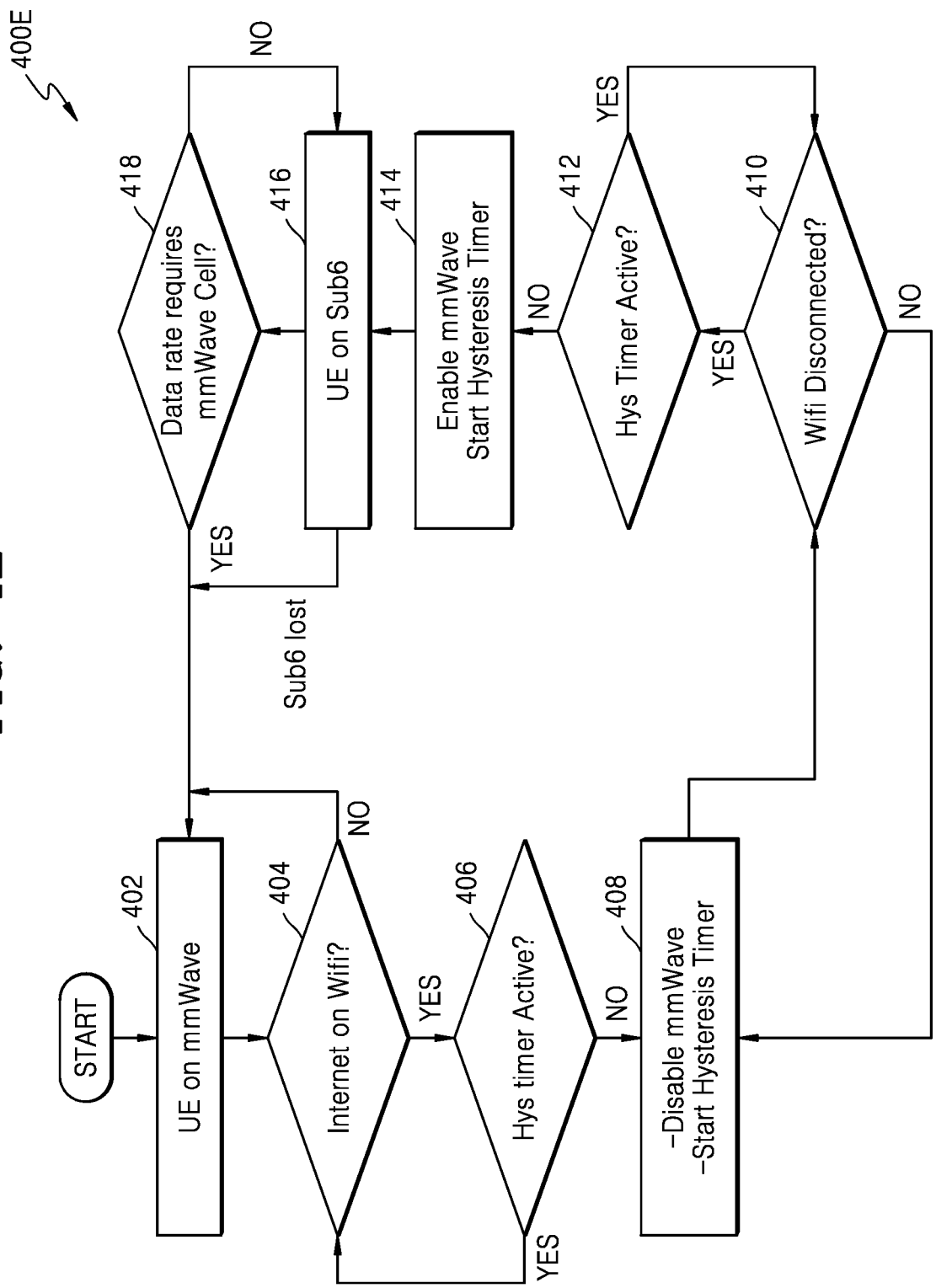
FIG. 4e is flow diagram, illustrating an example embodiment of choosing the optimal cell based on the internet connectivity at the UE, according to an example embodiment.

FIG. 4e is flow diagram, illustrating an embodiment of choosing the optimal cell based on the Wi-Fi connectivity of the UE (100), according to an example embodiment.

In the present embodiment, the UE (100) is in the connected mode and may be camped to the sub6 cell or the mmWave cell. The UE (100) needs to determine whether the cell on which the UE (100) is camped is the optimal cell or not. For determining so, the UE (100) checks the Wi-Fi connectivity and determines whether the pre-defined KPI criteria for the Wi-Fi connectivity of the UE (100) is met. In the present embodiment, the Wi-Fi connectivity is considered as the KPI. In the present embodiment, the UE may be in the single registration mode, or the dual registration mode.

Referring to FIG. 4e, at operation 402, the UE (100) is camped on the mmWave cell. At operation 404, the UE (100) determines whether the UE (100) is connected to the Wi-Fi. Operation 406 is performed in case that the UE (100) is connected to the Wi-Fi. Operation 402 is performed again in case that the UE (100) is not connected to the Wi-Fi. As seen, at operation 402 the UE (100) is camped on the mmWave cell and hence after determining that the UE (100) is not connected to the Wi-Fi, the UE (100) is retained on the mmWave cell.

Whereas at operation 406, the UE (100) checks whether a hysteresis timer is active or expired. The hysteresis timer is used on order to avoid a Ping-Pong effect. In other words, the hysteresis timer is used to prevent or reduce frequent cell change.

Operation 408 is performed in case that the hysteresis timer is expired. Operation 404 is performed in case that the hysteresis timer is active.

At operation 408, the UE (100) disables the mmWave cell and camps on the sub6 cell. Further, the hysteresis time is activated at operation 408. It is to be noted that since internet Public Data Network (PDN) can be moved to the Wifi and then all data traffic can also be moved over to the Wifi. So, the UE (100) can move to the Sub6 cell instead of staying on the mmWave cell to reduce the power consumption.

After switching to the sub6 cell and activating the hysteresis timer, the UE (100) checks if the Wi-Fi is disconnected at operation 410. Operation 412 is performed in case that Wi-Fi is disconnected.

Operation 408 is performed again in case that the Wi-Fi is disconnected. As seen, at operation 408, the UE (100) is camped on the sub6 cell and hence after determining that that Wi-Fi is not disconnected, the UE (100) is retained on the sub6 cell.

Whereas at operation 412, the UE (100) checks whether the hysteresis timer is active or expired. Operation 414 is performed in case that the hysteresis timer is expired. Operation 410 is performed in case that the hysteresis timer is active. At operation 414, the UE (100) enables the mmWave cell. Further, the hysteresis time is activated at operation 414. At operation 416, the UE (100) is still camped on the sub6 cell. At operation 418, the UE (100) determines whether the mmWave cell is required based on the data volume at UE (100) and camps the UE (100) on the mmWave in case that mmWave cell is required or else retains the UE (100) on the sub6 cell.

It is to be noted that the UE (100) is disconnected from WiFi, the Internet PDN will be moved back to New Radio and mmWave capabilities shall be enabled. Thus, based on the data volume, the UE (100) may decide whether to stay on Sub6 cell or move to mmWave cell.

Figure 5A:
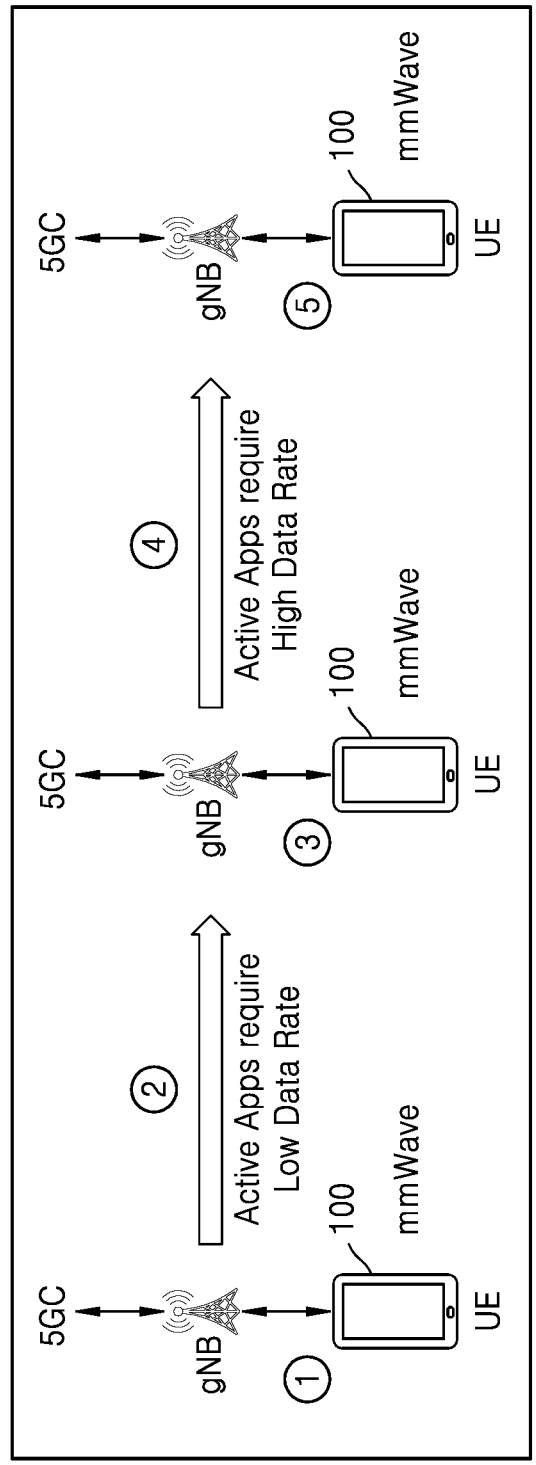
FIG. 5a is a schematic diagram illustrating an example operation of the UE based on data usage by active applications on the UE, where the UE is in single registration mode.

FIG. 5a is a schematic diagram illustrating an operation of the UE based on data usage by active applications on the UE, where the UE is in single registration mode according to a prior art.

As seen in FIG. 5a, the UE (100) is connected to the 5GC over the gNB. It is assumed that the UE (100) is presently camped on the mmWave cell as seen at 1. At 2, if the UE (100) determines that the applications active at the UE (100) requires low data rate, then the UE (100) need not be camped on the mmWave cell. However as seen at 3, the UE (100) is still camped on the mmWave cell. Thus, there is extra loss of battery, as the UE (100) consumes more power when being camped on the mmWave cell. Further, at 4, UE (100) determines that the applications active at the UE (100) requires high data rate and the UE (100) should be on mmWave cell. As seen at 5, the UE (100) is still on mmWave cell. It is to be noted that the UE (100) should be camped on the optimal cell for better performance of the UE (100). As stated in the present example, the prior art does not disclose camping the UE (100) on the optimal cell based on data usage by active applications on the UE (100). In fact, the UE (100) is camped on the same cell irrespective of the Wi-Fi at the UE (100). Thus, there is a need to provide a method and device for optimal cell selection based data usage by active applications on the UE (100). Certain example embodiments provides the method and device for optimal cell selection based data usage by active applications on the UE (100).

Figure 5B:
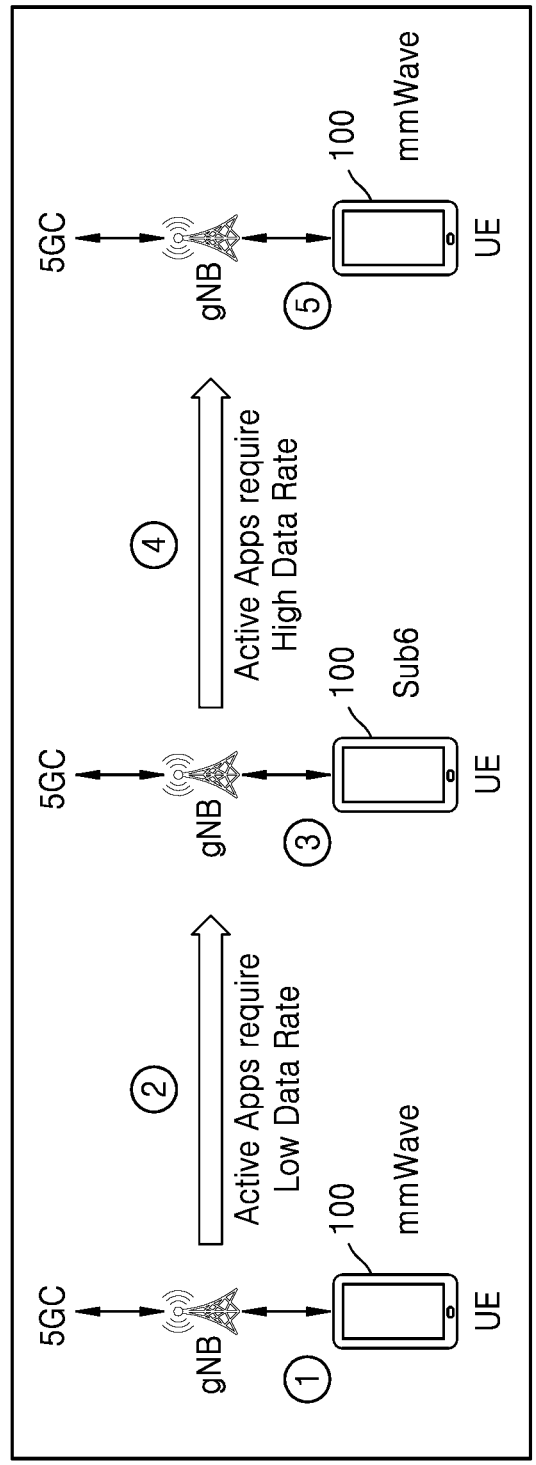
FIG. 5b is a schematic diagram illustrating an example operation of the UE based on data usage by active applications on the UE, where the UE is in single registration mode according to an example embodiment.

FIG. 5b is a schematic diagram illustrating an operation of the UE based on data usage by active applications on the UE, according to an embodiment as disclosed herein.

As seen in FIG. 5b, the UE (100) is connected to the 5GC over the gNB. It is assumed that the UE (100) is presently camped on the mmWave cell as seen at 1. At 2, if the UE (100) determines that the applications active at the UE (100) requires low data rate, then the UE (100) need not be camped on the mmWave cell. Thus, the UE (100) disables the mmWave cell and move to the sub6 cell at 3. Thus, there is extra saving of battery, as the UE (100) consumes less power when being camped on the sub6 cell. Further, at 4, UE (100) determines that the applications active at the UE (100) requires high data rate and hence the UE (100) should be on mmWave cell. As seen at 5, the UE (100) disables the sub6 cell and move to the mmWave cell. It is to be noted that the UE (100) is camped on the optimal cell for better performance of the UE (100). As stated in the present example, according to the embodiment of the disclosure, the UE (100) camps on the optimal cell based on data usage by active applications at the UE (100).

Figure 5C:
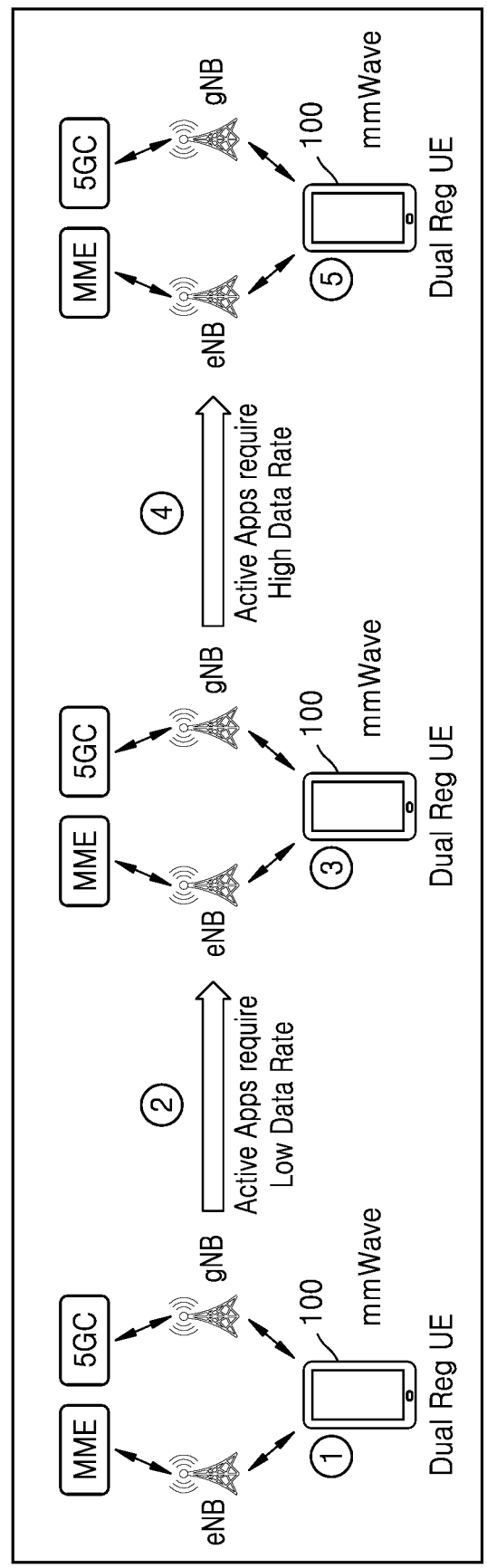
FIG. 5c is a schematic diagram illustrating an example operation of the UE based on the data rate required by an active application on UE, where the UE is in the dual registration mode.

FIG. 5c is a schematic diagram illustrating an operation of the UE based on the data rate required by an active application on UE, where the UE is in the dual registration mode, according to a prior art.

As seen in FIG. 5c, the UE (100) is in dual registration mode and is connected to the 5GC over the gNB and to MME over eNB. It is assumed that the UE (100) is presently camped on the mmWave cell as seen at 1. At 2, the UE (100) determines that the applications active at the UE (100) requires low data rate, which explains that the UE (100) need not be camped on the mmWave cell. However as seen at 3, the UE (100) is still camped on the mmWave cell. Thus, there is extra loss of battery, as the UE (100) consumes more power when being camped on the mmWave cell. Further, at 4, UE (100) determines that the applications active at the UE (100) requires high data rate and the UE (100) should be on the mmWave cell. As seen at 5, the UE (100) is still on the mmWave cell. It is to be noted that the UE (100) should be camped on the optimal cell for better performance of the UE (100). As stated in the present example, the prior art does not disclose camping the UE (100) on the optimal cell based on data usage by the active applications on the UE (100). In fact, the UE (100) is camped on the same cell irrespective of the Wi-Fi at the UE (100). Thus, there is a need to provide a method and device for optimal cell selection based data usage by active applications on the UE (100). Certain example embodiments provides the method and device for optimal cell selection based data usage by active applications on the UE (100).

Figure 5D:
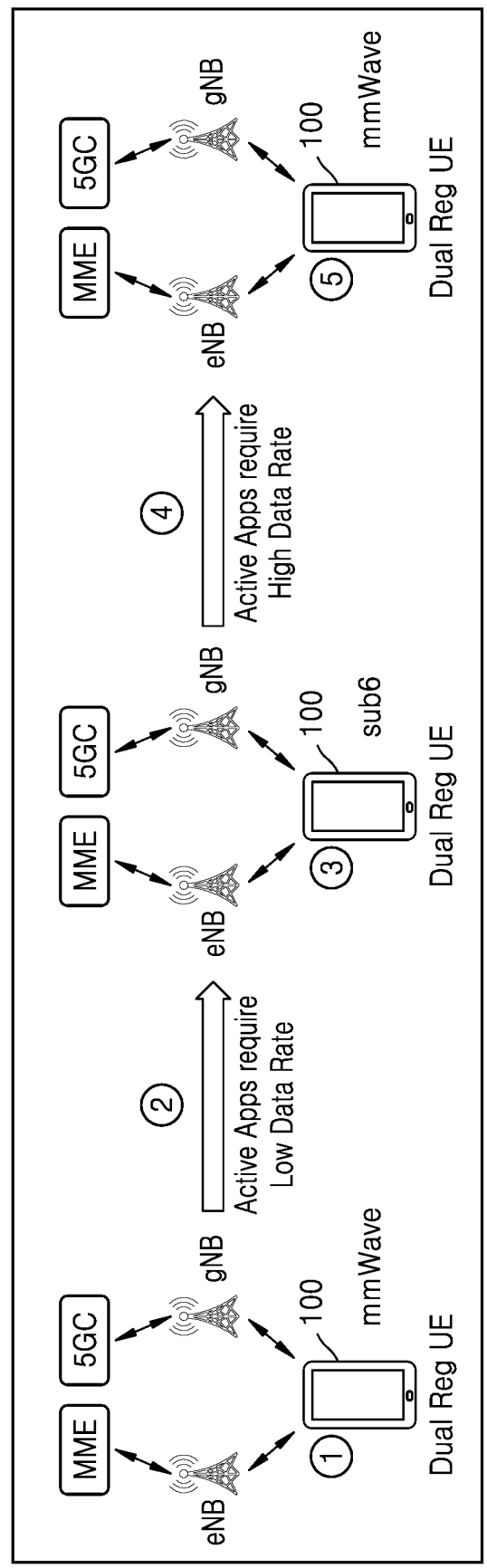
FIG. 5d is a schematic diagram illustrating an example operation of the UE based on the data rate required by an active application on UE, where the UE is in the dual registration mode, according to an example embodiment.

FIG. 5d is a schematic diagram illustrating an operation of the UE based on the data rate required by active applications on the UE, according to an embodiment as disclosed herein.

As seen in FIG. 5d, the UE (100) is connected to the 5GC over the gNB and to the MME over the eNB. It is assumed that the UE (100) is presently camped on the mmWave cell as seen at 1. At 2, the UE (100) determines that the applications active at the UE (100) requires low data rate, which explains that the UE (100) need not be camped on the mmWave cell. Thus, the UE (100) disables the mmWave cell and move to the sub6 cell at 3. Thus, there is extra saving of battery, as the UE (100) consumes less power due to being camped on the sub6 cell. Further, at 4, UE (100) determines that the applications active at the UE (100) requires high data rate and hence the UE (100) should be on mmWave cell. As seen at 5, the UE (100) disables the sub6 cell and move to the mmWave cell. It is to be noted that if the UE (100) is camped on the optimal cell for better performance of the UE (100). As stated in the present example, according to the embodiments of the disclosure, the UE (100) camps on the optimal cell based on data usage by active applications on the UE (100).

Figure 5E:
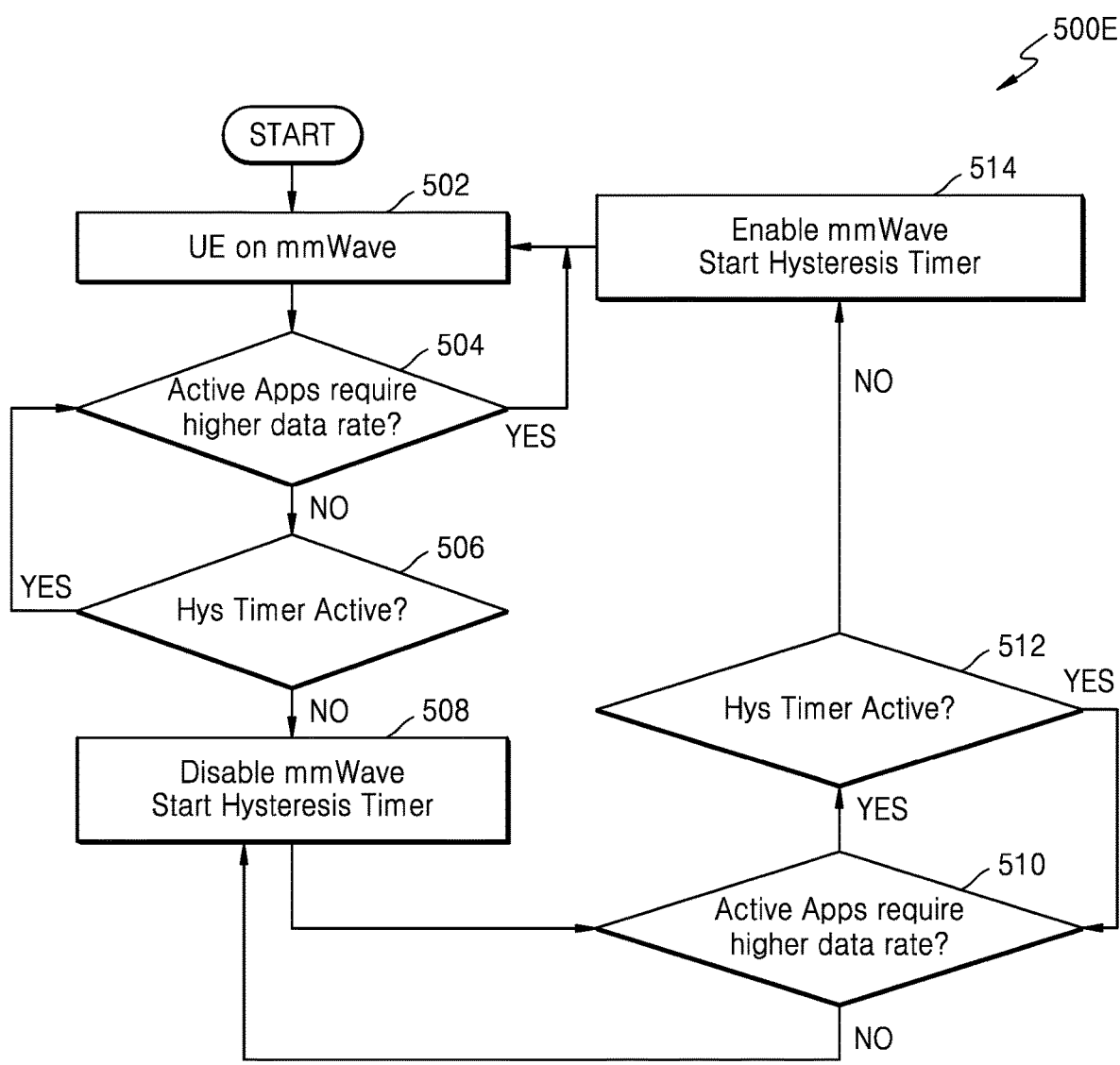
FIG. 5e is flow diagram, illustrating an example embodiment of choosing the optimal cell based on data required by active applications at the UE, according to an example embodiment.

FIG. 5e is flow diagram, illustrating an embodiment of choosing the optimal cell based on the application data usage at the UE (100), according to an example embodiment.

In the present embodiment, the UE (100) is in connected (directly or indirectly) mode and may be camped to the sub6 cell or the mmWave cell. The UE (100) needs to determine whether the cell on which the UE (100) is camped is the optimal cell or not. For determining so, the UE (100) checks the data usage of the application on the UE (100) and determines whether the pre-defined KPI criteria for the data volume at the UE (100) is met. Based on learning and data usage statistics of the application, the UE (100) may categorise the application to be of "Low data usage" and "High data usage" application. When the UE (100) is moving to the connected mode due to trigger from lower data usage apps, the UE (100) may choose to move to the Sub6 cell if currently on the mmWave cell. Similarly, when the UE (100) is moving to connected mode because of data from the high data usage application, the UE (100) may choose to move to the mmWave cell if currently on the Sub6 cell.

In the present embodiment, the application data usage at the UE (100) is considered as the KPI. In the present embodiment, the UE may be in a single registration mode, or a dual registration mode.

Referring to FIG. 5e, at operation 502, the UE (100) is camped on the mmWave cell.

At operation 504, the UE (100) determines whether the active application on the UE (100) requires higher data rate. Higher data rate depends on data volume requirement by the active applications on the UE (100). If the current data volume requirement is higher than the current throughput supported in the current camped RAT/frequency by threshold, then the UE (100) shall move to the mmWave cell if the UE (100) has not camped on the mmWave cell. In this embodiment, threshold may be predefined in the user equipment (UE) or it is updated through over the Air or OMA (opem mobile alliance) or operator specific method Operation 506 is performed in case that the active application on the UE (100) do not require higher data rate. Operation 502 is maintained in case that the active application on the UE (100) requires higher data rate. As seen, at operation 502 the UE (100) is camped on the mmWave cell and hence after determining that the active application on the UE (100) requires the higher data rate, the UE (100) is retained on the mmWave cell.

Whereas at operation 506, the UE (100) checks whether the hysteresis timer is active or expired. The hysteresis timer is used in order to avoid the ping-pong effect. In other words, the hysteresis timer is used to prevent or reduce frequent cell change. Operation 508 is performed in case that the hysteresis timer is expired. Operation 504 is maintained in case that the hysteresis timer is active.

At operation 508, the UE (100) disables the mmWave cell and camps on the sub6 cell. Further, the hysteresis time is activated at operation 508. It is to be noted that since the active application on the UE (100) do not require higher data rate, there is no requirement for the mmWave frequency and thus, the UE (100) disables the mmWave cell and camps on the sub6 cell which suits the requirement of the UE (100). Thereby, the power consumption by the UE (100) is reduced considerably.

After switching to the sub6 cell and activating the hysteresis timer, the UE (100) again checks if the active application on the UE (100) requires higher data rate at operation 510. Operation 512 is performed in case that the active application on the UE (100) require higher data rate.

Operation 508 is performed again in case that the active application on the UE (100) do not require higher data rate. As seen, at operation 508, the UE (100) is camped on the sub6 cell and hence after determining that the active application on the UE (100) do not require higher data rate, the UE (100) is retained on the sub6.

Whereas at operation 512, the UE (100) checks whether the hysteresis timer is active or expired. Operation 514 is performed in case that the hysteresis timer is expired. Operation 510 is maintained in case that the hysteresis timer is active. At operation 514, the UE (100) disables the sub6 cell and camps on the mmWave cell. Further, the hysteresis time is activated at 514.

Figure 6:
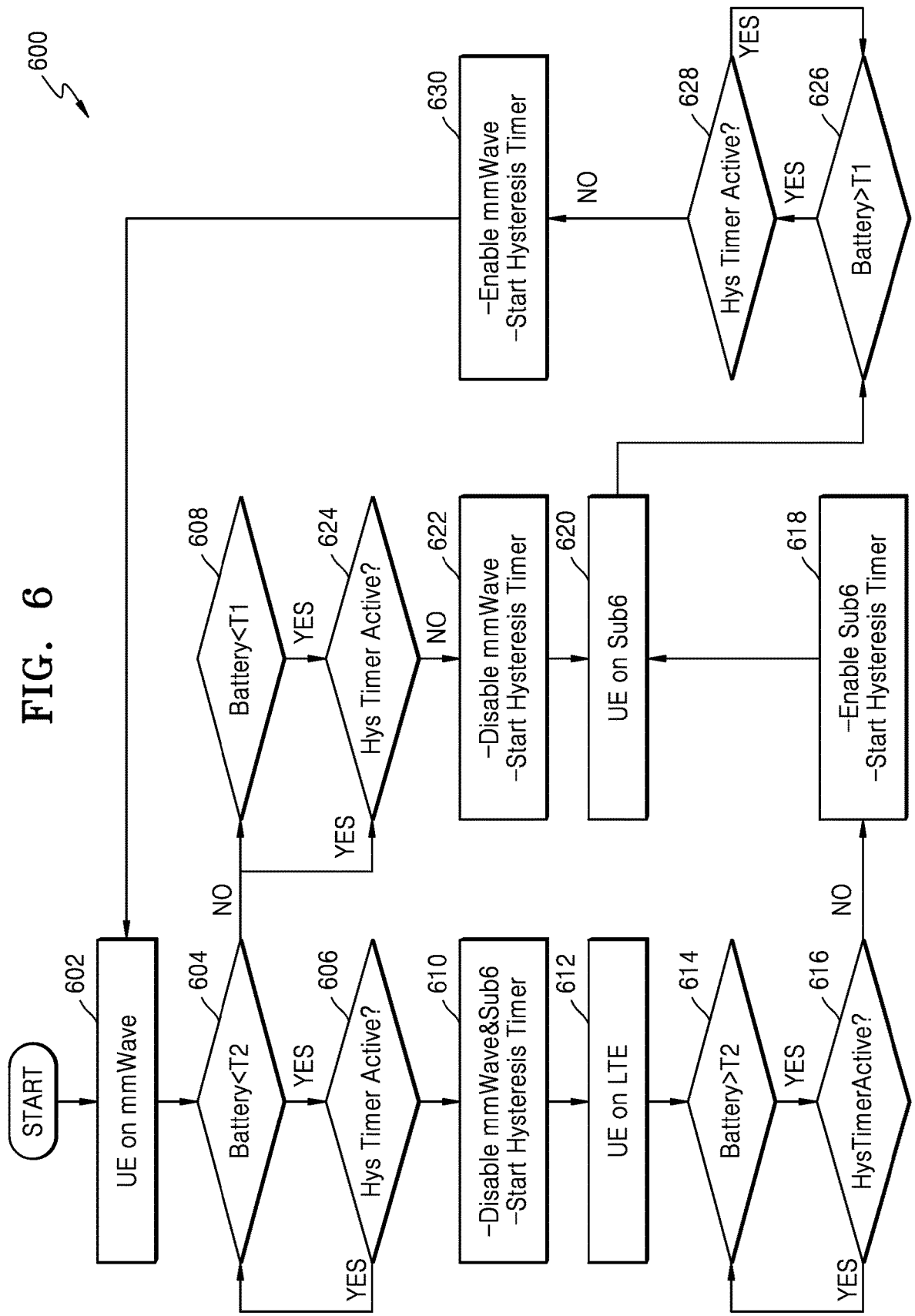
FIG. 6 is flow diagram, illustrating an embodiment of choosing the optimal cell based on a battery level at the UE, according to an example embodiment.

FIG. 6 is flow diagram, illustrating an embodiment of choosing the optimal cell based on the battery level of the UE (100), according to an example embodiment.

In the present embodiment, the UE (100) is in connected mode and may be camped to the sub6 cell or the mmWave cell. The UE (100) needs to determine whether the cell on which the UE (100) is camped is the optimal cell or not. For determining so, the UE (100) checks the battery level of UE (100) and determines whether the pre-defined KPI criteria for the battery level of the UE (100) is met. During low battery conditions, two thresholds are defined T2 (e.g. 15% left) and T1 (e.g. 30% left). When battery level goes below T1, mmWave capabilities can be disabled so that UE (100) still operate on Sub6 5G and get better data rate. When battery level goes below T2, Sub6 also may be disabled so that UE (100) moves to legacy RATs such as LTE. This approach allows the UE (100) to operate for longer duration during low battery.

In the present embodiment, the battery level UE (100) is considered as the KPI. In the present embodiment, the UE (100) may be in the single registration mode, or the dual registration mode.

Referring to FIG. 6, at operation 602, the UE (100) is found to be camped on the mmWave cell. At operation 604, the UE (100) determines whether the battery level of the UE (100) is less than T2. Operation 606 is performed in case that the battery level of the UE (100) is less than T2. Operation 608 is performed in case that that the battery level of the UE (100) is greater than T2.

At operation 606, the UE (100) checks whether the hysteresis timer is active or expired. The hysteresis timer is used in order to avoid the ping-pong effect. In other words, the hysteresis timer is used to prevent or reduce frequent cell change. According to the embodiments, only after a predetermined time go by, cell change may happen. Operation 610 is performed in case that the hysteresis timer is expired. Operation 606 is maintained in case that the hysteresis timer is active.

At operation 610, the UE (100) disables the mmWave cell and activates the hysteresis timer. At operation 612, the UE (100) is camped on the LTE cell. It is to be noted that since battery level of the UE (100) is very less (below T2), the UE (100) disables both the mmWave cell and the sub6 cell, and camps on the LTE cell which increases the battery time.

After switching to the LTE cell and activating the hysteresis timer, the UE (100) determines that the battery level is greater than T2 at operation 614. At Operation 616, the UE (100) determines whether the hysteresis timer is active or expired. Operation 618 is performed in case that the hysteresis timer is expired. Operation 614 is maintained while the hysteresis timer is active. At operation 618, the UE (100) enables the sub6 cell and restarts the hysteresis timer. At operation 620, the UE (100) is camped on the sub6 cell.

In case that the UE (100) determines whether the battery level of the UE (100) is greater than T2 at operation 604, the UE (100) determines whether the battery level is less than T1, at operation 608. Operation 624 is performed in case that the battery level of the UE (100) is less than T1.

At operation 624, the UE (100) checks whether the hysteresis timer is active or expired. The hysteresis timer is used on order to avoid a ping-pong effect. Operation 622 is performed in case that the hysteresis timer is expired. Operation 608 is maintained while the hysteresis timer is active.

At operation 624, the UE (100) disables the mmWave cell and activates the hysteresis timer. At operation 620, the UE (100) is camped on the sub6 cell.

The UE (100) determines whether the battery level is greater than T1, at operation 626. Operation 628 is performed in case that the battery level of the UE (100) is greater than T1.

At operation 628, the UE (100) determines the hysteresis timer is active or expired. The hysteresis timer is used on order to avoid a ping-pong effect. Operation 630 is performed in case that the hysteresis timer is expired. Operation 626 is maintained while the hysteresis timer is active.

At operation 630, the UE (100) enables the mmWave cell and activates the hysteresis timer.

Figure 7A:
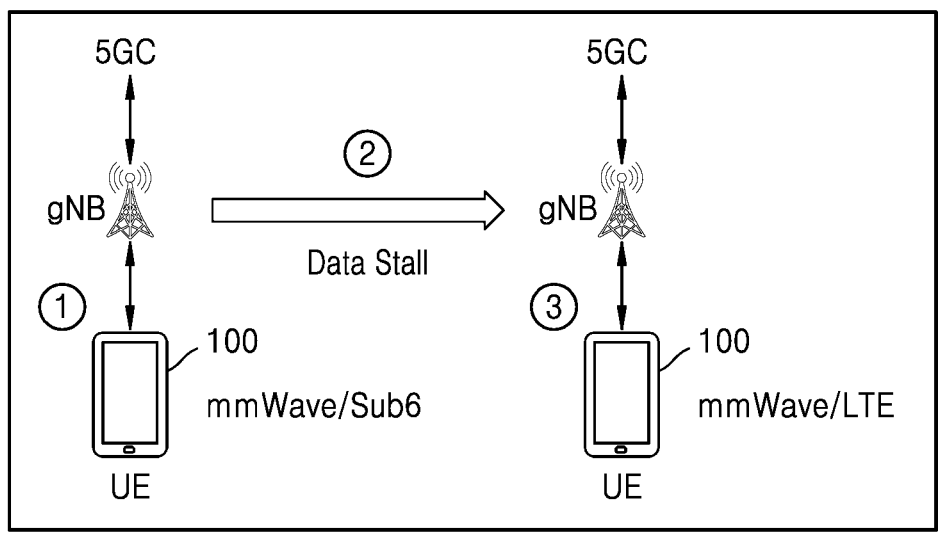
FIG. 7a is a schematic diagram illustrating an example operation of the UE based on data stalling on the UE, where the UE is in single registration mode according to a prior art.

FIG. 7a is a schematic diagram illustrating an operation of the UE based on data stalling on the UE, where the UE is in single registration mode according to a prior art.

As seen in FIG. 7a, the UE (100) is connected to the 5GC over the gNB. It is assumed that the UE (100) is presently camped on the mmWave cell as seen at 1. At 2, if the UE (100) determines that data stalling happens, then the UE (100) need not be camped on the mmWave cell. However, as seen at 3, the UE (100) is still camped on the mmWave cell. Thus, there is extra loss of battery, as the UE (100) consumes more power when being camped on the mmWave cell.

In another embodiment, the UE (100) is connected to the 5GC over the gNB. The UE (100) is presently camped on the sub6 cell as seen at 1. At 2, if the UE (100) determines that data stalling happens, then the UE (100) need not be camped on the sub6 cell. However, as seen at 3, the UE (100) is still camped on the sub6 cell. Thus, there is extra loss of battery, as the UE (100) consumes more power due to being camped on the sub6 cell.

Thus, there is a need to provide a method and device for optimal cell selection based on data stalling at the UE (100). Certain example embodiments provides the method and device for optimal cell selection based on data stalling at the UE (100).

Figure 7B:
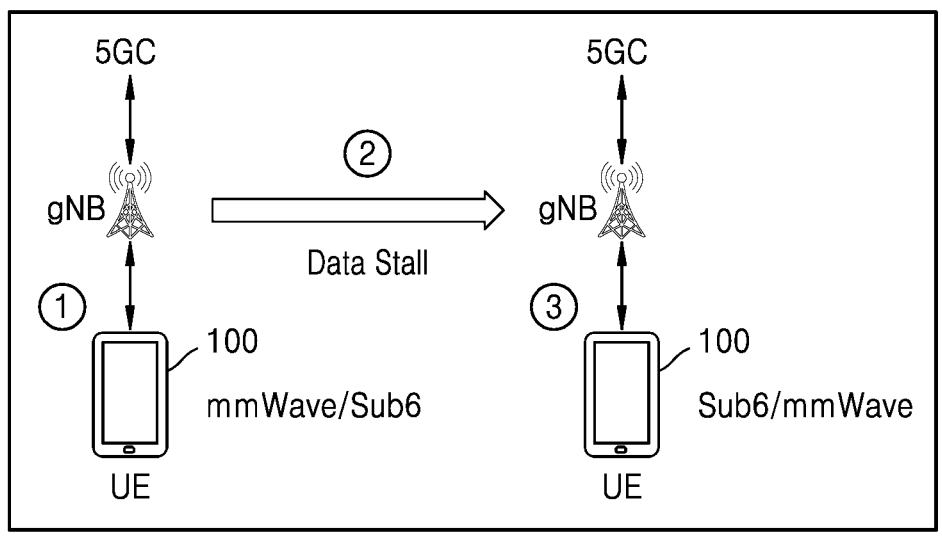
FIG. 7b is a schematic diagram illustrating an operation of the UE based on data stalling the UE, according to an example embodiment.

FIG. 7b is a schematic diagram illustrating an operation of the UE based on data stalling the UE, according to an example embodiment.

As seen in FIG. 7b, the UE (100) is connected, directly or indirectly, to the 5GC over the gNB. The UE (100) is presently camped on the mmWave cell as seen at 1. At 2, the UE (100) determines that data stalling is occurring at the UE (100), then the UE (100) need not be camped on the mmWave cell. Thus, the UE (100) disables the mmWave cell and moves to the sub6 cell at 3. Thus, there is extra saving of battery, as the UE (100) consumes less power when being camped on the sub6 cell.

In another embodiment, the UE (100) is connected to the 5GC over the gNB. The UE (100) is presently camped on the sub6 as seen at 1. At 2, the UE (100) determines that data stalling is occurring at the UE (100), then the UE (100) need not be camped on the sub6 cell. Thus, the UE (100) disables the sub6 cell and move to the LTE cell at 3. Thus there is extra saving of battery, as the UE (100) consumes less power due to being camped on the LTE cell. It is to be noted that the UE (100) is camped on the optimal cell for better performance of the UE (100). As stated in the present example, according to the embodiments of the disclosure, the UE (100) camps on the optimal cell based on data stalling at the UE (100).

Figure 7C:
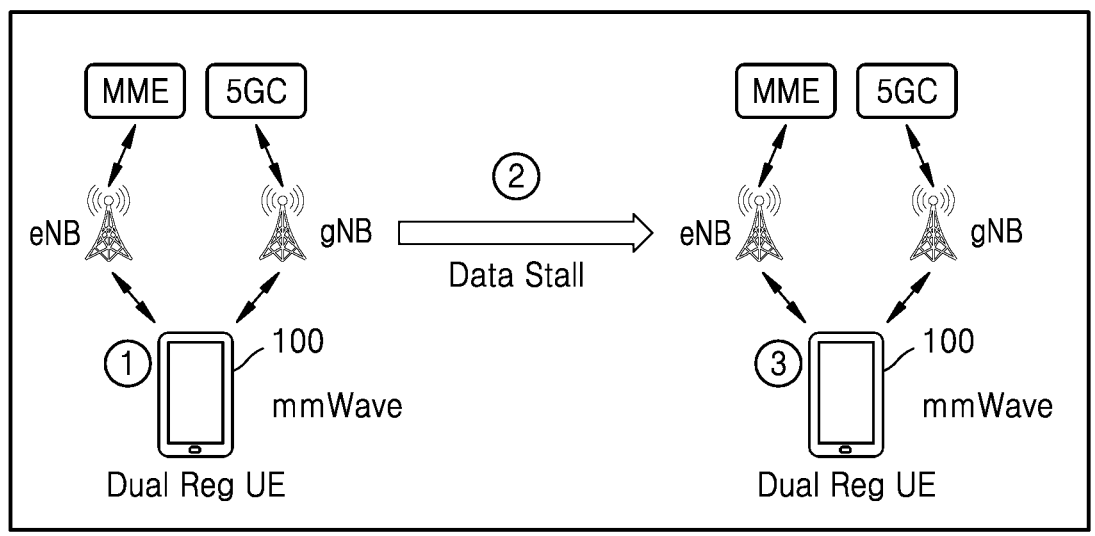
FIG. 7c is a schematic diagram illustrating an example operation of the UE based data stalling on UE, where the UE is in dual registration mode.

FIG. 7c is a schematic diagram illustrating an operation of the UE based on data stalling on UE, where the UE is in dual registration mode, according to a prior art.

As seen in FIG. 7c, the UE (100) is in dual registration mode and is connected to the 5GC over the gNB and to MME over eNB. The UE (100) is presently camped on the mmWave cell as seen at 1. At 2, the UE (100) determines that data stalling is occurring, then the UE (100) need not be camped on the mmWave cell. However, as seen at 3, the UE (100) is still camped on the mmWave cell. Thus, according to the prior art, there is extra loss of battery, as the UE (100) consumes more power due to being camped on the mmWave cell.

In another embodiment, the UE (100) is connected to the 5GC over the gNB. The UE (100) is presently camped on the sub6 cell. If the UE (100) determines that data stalling is happening, then the UE (100) need not be camped on the sub6 cell. It is more proper for the UE (100) to camp on the LTE cell. However, according to the prior art, the UE (100) is still camped on the sub6 cell. Thus, there is extra loss of battery, as the UE (100) consumes more power due to being camped on the sub6 cell.

Thus, there is a need to provide a method and device for optimal cell selection based on data stalling at the UE (100). Certain example embodiments provides the method and device for optimal cell selection based on data stalling at the UE (100).

Figure 7D:
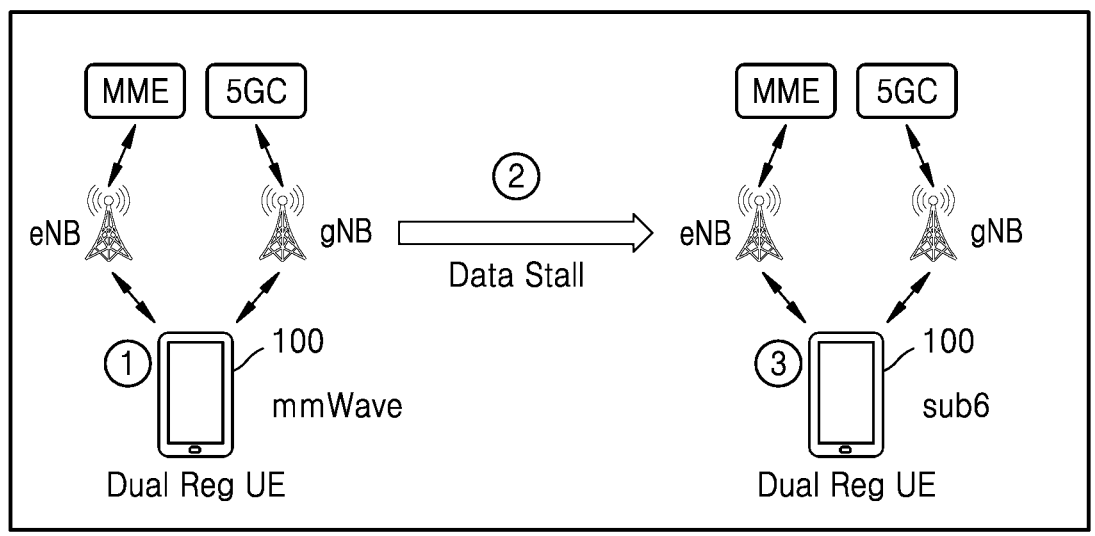
FIG. 7d is a schematic diagram illustrating an operation of the UE based on data stalling at the UE, according to an example embodiment.

FIG. 7d is a schematic diagram illustrating an operation of the UE based on data stalling at the UE, according to an embodiment as disclosed herein.

As seen in FIG. 7d, the UE (100) is connected to the 5GC over the gNB and to the MME over the eNB. The UE (100) is presently camped on the mmWave cell as seen at 1. At 2, the UE (100) determines that data stalling is occurring at the UE (100), then the UE (100) need not be camped on the mmWave cell. Thus, the UE (100) disables the mmWave cell and move to the sub6 cell at 3. Thus, there is extra saving of battery, as the UE (100) consumes less power when being camped on the sub6 cell.

In another embodiment, the UE (100) is connected, directly or indirectly, to the 5GC over the gNB. The UE (100) is presently camped on the sub6 cell. If the UE (100) determines that data stalling is occurring at the UE (100), then the UE (100) need not be camped on the sub6 cell. Thus, the UE (100) disables the mmWave cell and move to the LTE cell. Thus, there is extra saving of battery, as the UE (100) consumes less power when being camped on the LTE cell. It is to be noted that the UE (100) is camped on the optimal cell for better performance of the UE (100). As stated in the present example, according to the embodiment of the disclosure, the UE (100) camps on the optimal cell based on data stalling at the UE (100).

Figure 7E:
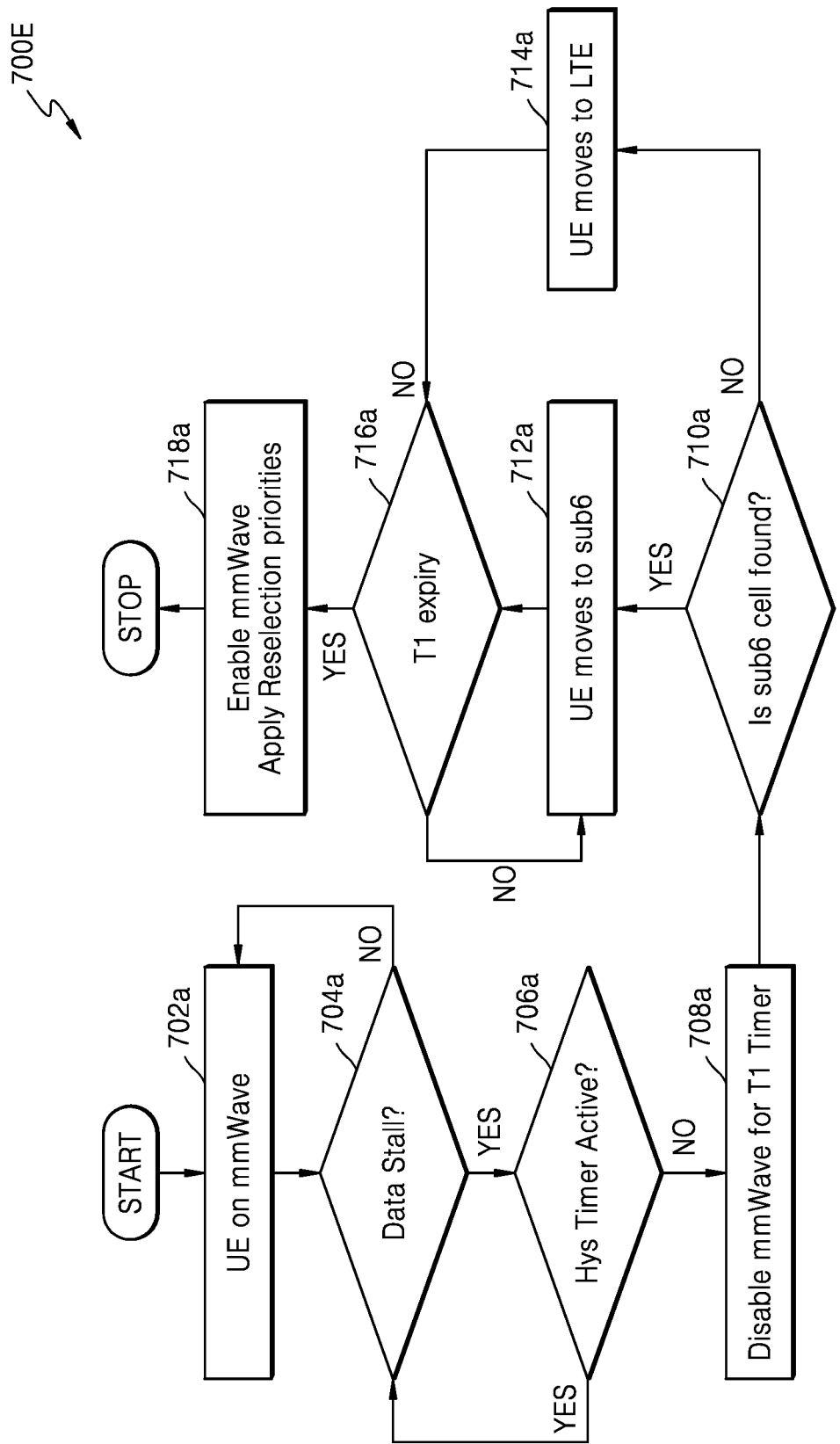
FIGS. 7e and 7f are flow diagrams, illustrating a method of choosing the optimal cell for camping the UE based on data stalling at the UE, according to an example embodiment.
Figure 7F:
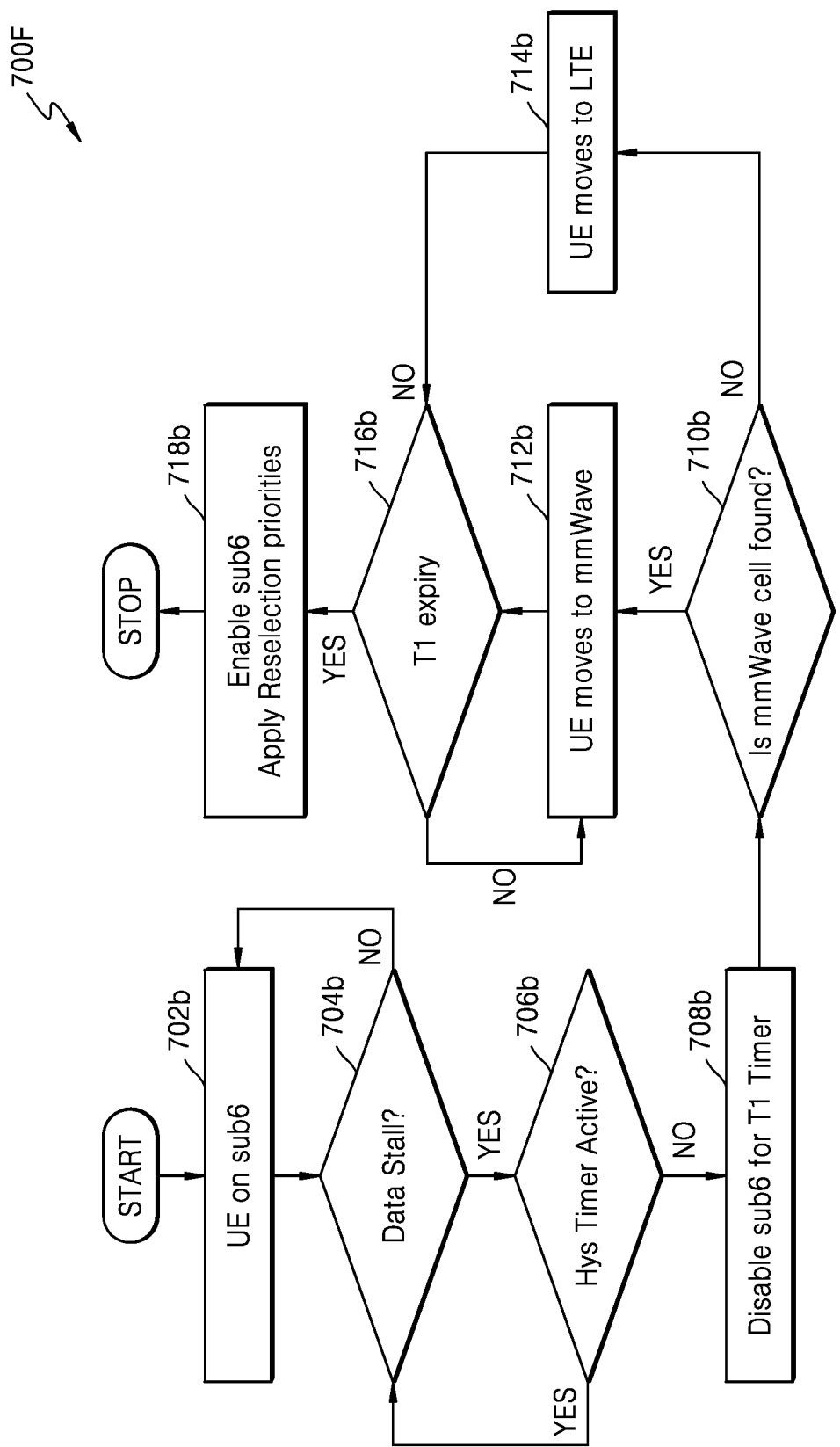

FIGS. 7e and 7f are flow diagrams, illustrating a method of choosing the optimal cell for camping the UE (100) based on data stalling at the UE (100), according to an example embodiment.

In the present embodiment, the UE (100) is in the connected mode and may be camped to the sub6 cell or the mmWave cell. The UE (100) needs to determine whether the cell on which the UE (100) is camped is the optimal cell or not. For determining so, the UE (100) checks the data stalling at the UE (100) and determines whether the pre-defined KPI criteria for the data stalling at the UE (100) is met.

FIG. 7e illustrates a method of choosing the optimal cell for camping the UE (100) based on data stalling at the UE (100), where the UE (100) is camped on the mmWave cell.

Referring to FIG. 7e, at operation 702a, the UE (100) is camped on the mmWave cell. At operation 704a, the UE (100) determines whether there is the data stalling at the UE (100). Operation 706a is performed in case that there is data stalling. Operation 702a is maintained in case that there is no data stalling at the UE (100), and the UE (100) is retained in the mmWave cell.

At operation 706a, the UE (100) checks whether the hysteresis timer is active or expired. The hysteresis timer is used on order to avoid a ping-pong effect. Operation 708a is performed in case that the hysteresis timer is expired. Operation 704a is maintained while the hysteresis timer is active.

At operation 708a, the UE (100) disables the mmWave cell for a timer T1 and activate the timer T1 and the flow proceeds to 710a. At operation 710a, the UE (100) determines whether the sub6 cell is available. Operation 712a is performed in case that the sub6 cell is available. If the sub6 cell is not available, Operation 714a is performed.

At operation 712a, the UE (100) is camped on the sub6 cell. Whereas at operation 714a, the UE (100) is camped on the LTE cell. When the UE (100) is camped on one of the sub 6 or LTE cell, Operation 716a is performed. At operation 716a, the UE (100) determines that the timer T1 is expired. At operation 718a, the mmWave cell is enabled and the UE (100) checks for re-selection of the cell.

FIG. 7f illustrates a method of choosing the optimal cell for camping the UE (100) based on data stalling at the UE (100), where the UE (100) is camped on the Sub6 cell.

Referring to FIG. 7f, at operation 702b, the UE (100) is found to be camped on the sub6 cell. At operation 704b, the UE (100) determines whether there is data stalling at the UE (100). Operation 706b is performed in case that there is data stalling. Operation 702b is maintained in case that there is no data stalling at the UE (100), where the UE (100) is retained in the sub6 cell.

At operation 706b, the UE (100) checks whether the hysteresis timer is active or expired. The hysteresis timer is used on order to avoid a ping-pong effect. Operation 708b is performed in case that the hysteresis timer is expired. Operations 704b is maintained while the hysteresis timer is active.

At operation 708b, the UE (100) disables the sub6 cell for a timer T1 and activates the timer T1. At operation 710b, the UE (100) determines whether the mmWave cell is available. Operation 712b is performed in case that the sub6 cell is available. If the sub6 cell is not available, operation 714b is performed.

At operation 712b, the UE (100) is camped on the mmWave cell. Whereas at operation 714b, the UE (100) is camped on the LTE cell. The flow proceeds to operation 716b from operations 712b and 714b. At operation 716b, the UE (100) determines that the timer T1 is expired and the flow moves to operation 718b. At operation 718b, the sub6 cell is enabled and the UE (100) check for re-selection of the cell.

Figure 8:
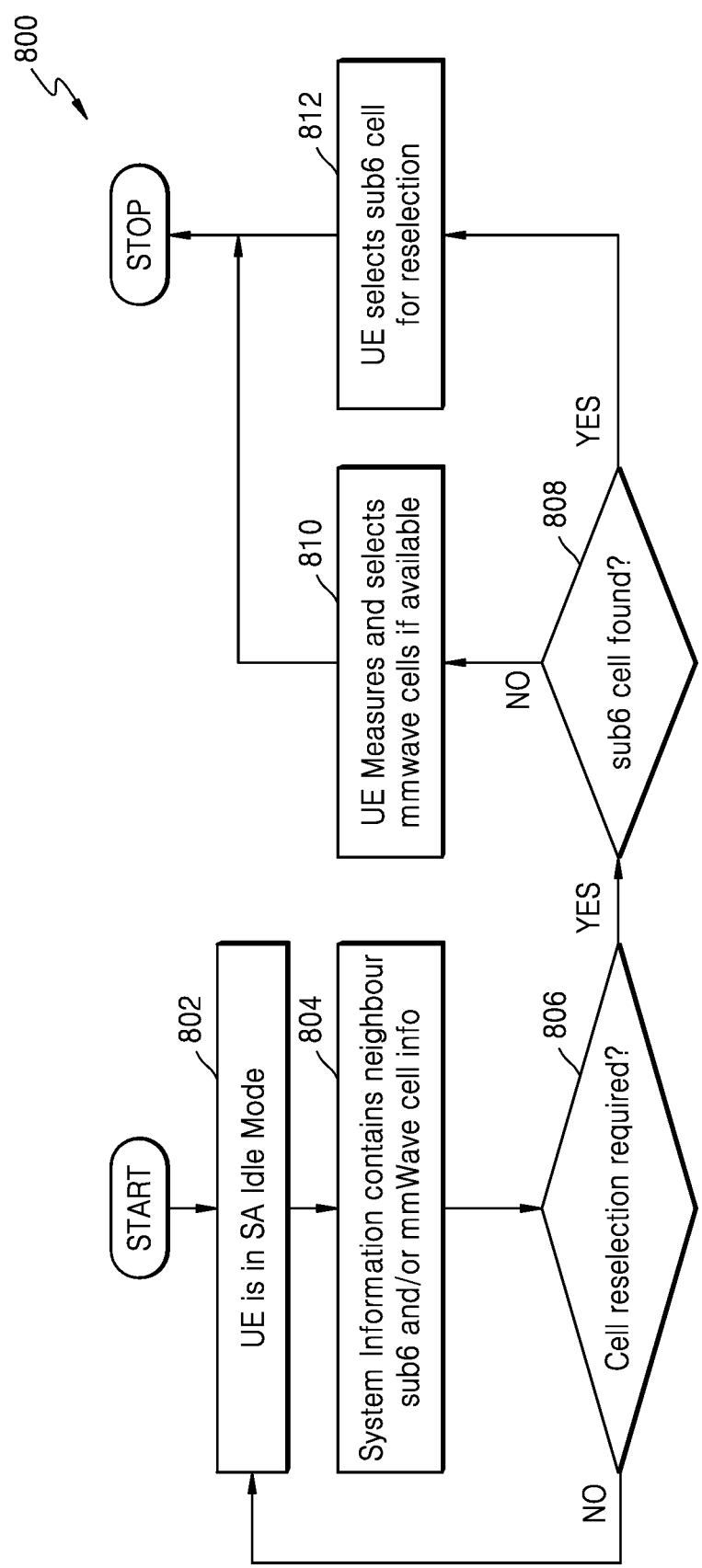
FIG. 8 is flow diagram, illustrating an embodiment of choosing the optimal cell when the UE is in a SA idle mode, according to an example embodiment.

FIG. 8 illustrates the method for optimal cell selection in the 5G standalone idle mode of the UE (100) according to an example embodiment.

In the present embodiment, the UE (100) is in the idle mode. The UE (100) needs to camp on the optimal cell.

The present embodiment provides two solution, one is blocking the mmWave cells based on the data stalling and the other is conditional blocking of the mmWave cell based on the data stalling at the UE (100).

In the present embodiment, the UE (100) acquires available New Radio frequency channel number (NARFCN) using Radio Resource Control (RRC) messages for Idle mode reselections.

For NR.

SIB4 IE->InterFreqCarrierFreqList->dl-CarrierFreq
RRC Release IE->CellReselectionPriorities->freqPriorityListNR
RRC Release IE->redirectedCarrierinfo->CarrierinfoNR
For LTE:
SIB24 IE->SystemInformationBlockType24-r15->carrierFreqListNR-r15->carrierFreq-r15 (NR ARFCN)
RRC Connection Release IE->IdleModeMobilityControlInfo->FreqPriorityListNR-r15->FreqPriorityNR-r15->carrierFreq-r15
RRC Connection Release IE->RedirectedCarrierinfo->nr-r15->CarrierinfoNR-r15->carrierFreq-r15

The cell reselection priorities provided in RRC Connection Release IE takes precedence over the ones in system information.

The complete flow is explained below referring to FIG. 8.

At operation 802, the UE (100) is in Stand Alone (SA) idle mode. At operation 804, the UE (100) gathers system information containing information about neighboring sub6 and/or mmWave cell. Further at operation 806, the UE (100) checks whether cell reselection is required. Operation 808 is performed in case that the cell reselection is required. Operation 802 is performed again in case that the cell reselection is not required. At operation 808, the UE (100) determines whether sub6 cell is available or not. Operation 810 is performed in case that the sub6 cell is not found. Operation 812 is performed in case that the sub6 cell is available. At operation 812, the UE (100) selects the sub6 cell for camping. At operation 810, the UE (100) measure and selects mmWave cell if available in case that the available sub6 cell is not found.

From the above description, it is clear that in Idle mode, the UE (100) shall move to the sub6 Cell if any available sub6 exist. The sub6 cell has higher coverage compared to the mmWave cells. Camping on the sub6 cell in idle mode, reduces mobility updates sent to the network.

Figure 9A:
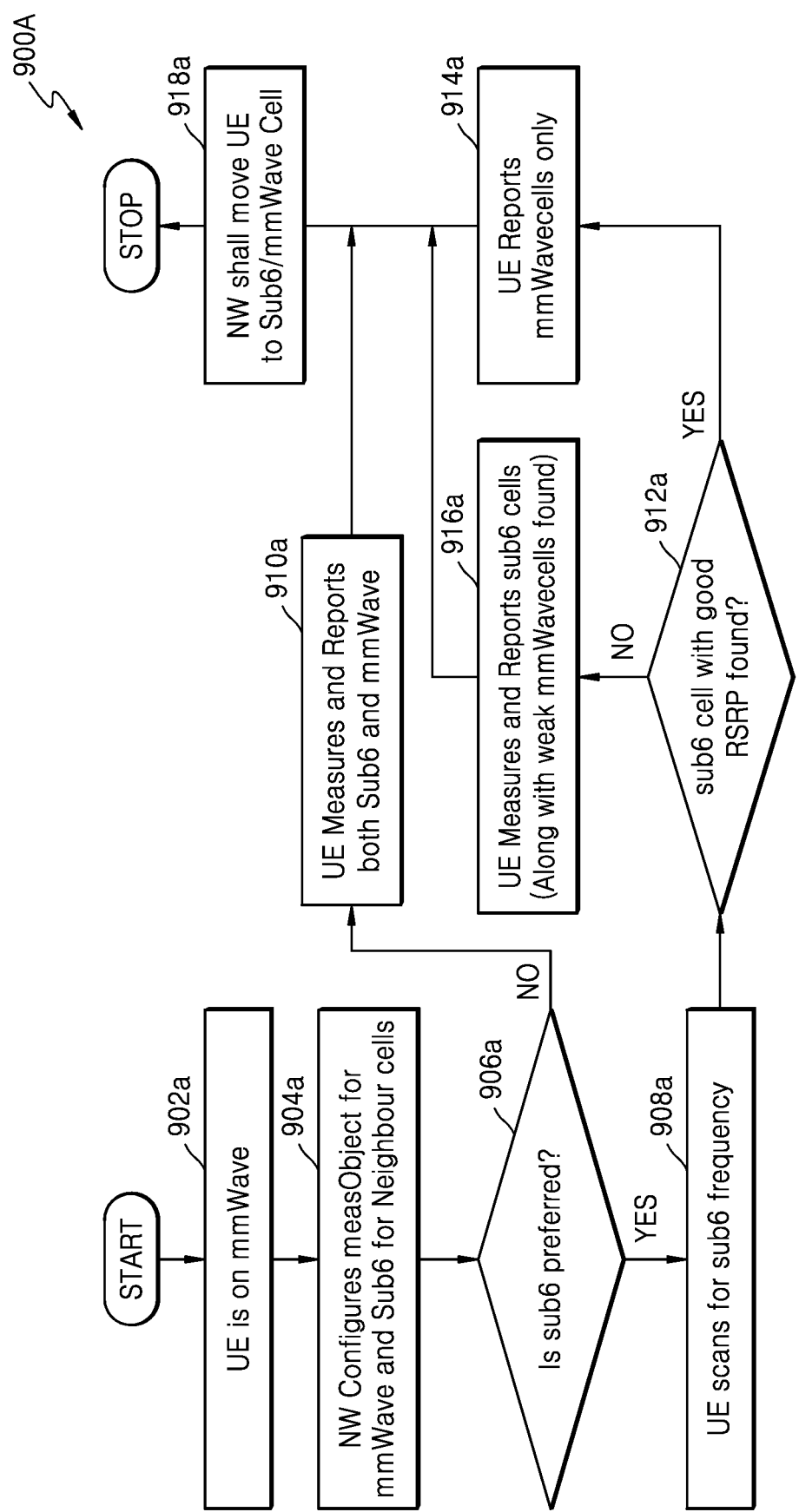
FIGS. 9a and 9b are flow diagram illustrating the method for the optimal cell selection in a 5G standalone connected mode of the UE, according to an example embodiment.
Figure 9B:
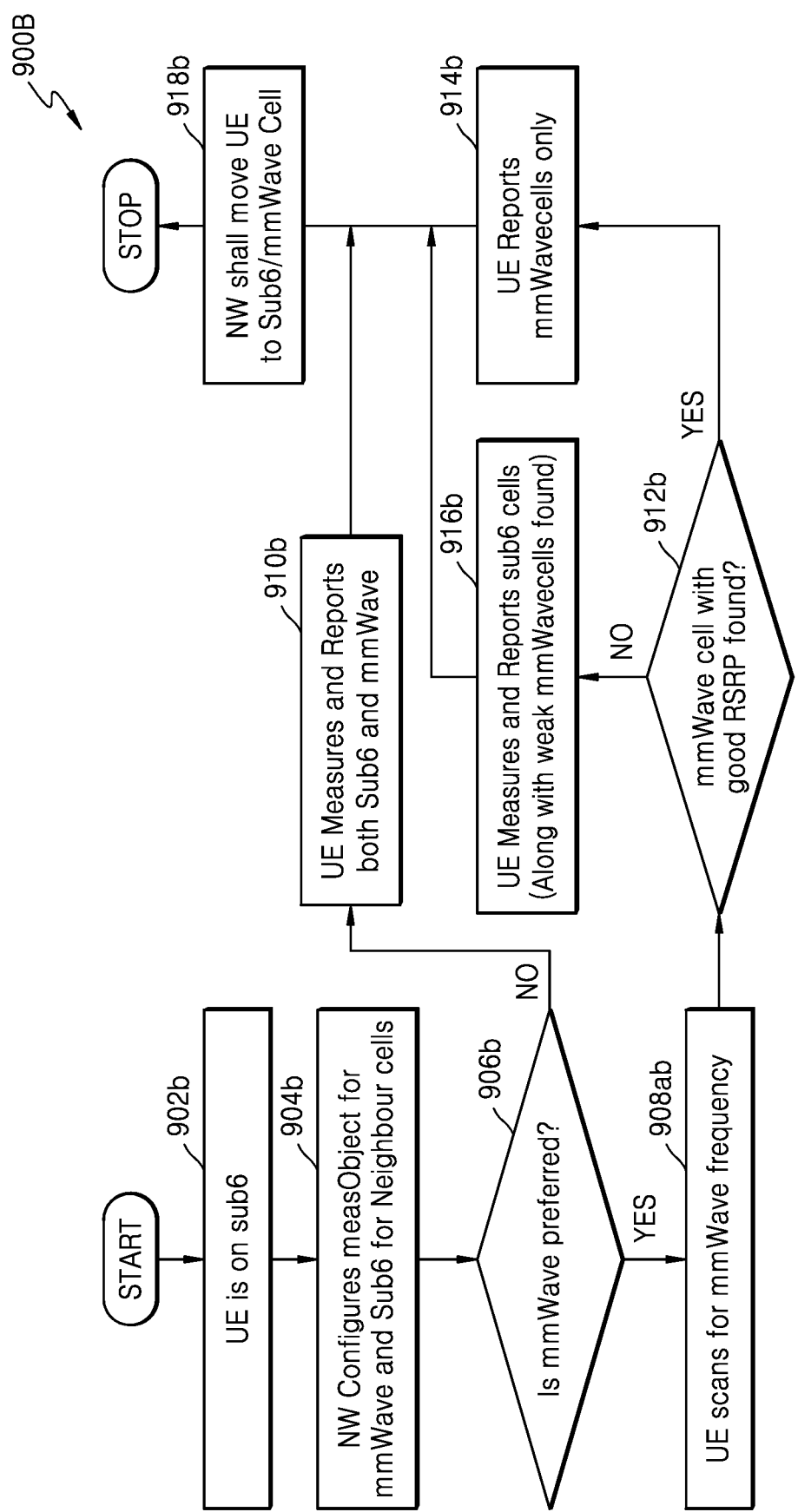

FIGS. 9a and 9b illustrate the method for optimal cell selection in a 5G standalone connected mode of the UE (100) according to an example embodiment.

In the present embodiment, the UE (100) is in the connected mode. The UE (100) may be camped on the sub6 cell or the mmWave cell. The UE (100) needs to camp on the optimal cell.

The network configures measurement object for the mmWave and the Sub6 frequencies. Based on the KPI criteria discussed before (Data Volume, Tx power, and the like.), if the UE (100) does not prefer the mmWave cell, then the UE (100) initially scan for Sub6 frequencies. If the Sub6 cell with good Reference Signal Received Power (RSRP) is found, then, only Sub6 Cells are reported to network. If Sub6 cell with good RSRP is not found, only then mmWave frequencies are scanned and reported to Network.

In another embodiment, if the UE (100) prefers mmWave cell based on the data volume, battery level and the other KPI discussed above, then the UE (100) initially scans for the mmWave frequencies. If the mmWave cell with good RSRP is found, then, only the mmWave cells are reported to network. If mmWave cell with good RSRP is not found, only then sub6 frequencies are scanned and reported to Network.

Referring to FIG. 9a, it is assumed that the UE (100) is currently camped on the mmWave cell. At operation 902a, the UE (100) is determined to be on the mmWave cell. At operation 904a, the network configures the measurement object for the mmWave cells and the sub6 neighbouring cells. At operation 906a, the UE (100) determines whether the sub6 cell is preferred or not. Operation 908a is performed in the case that the sub6 cells are preferred, and operation 910a is performed in case that the sub6 cells are not preferred. At operation 908a, the UE (100) scans the sub6 frequency for the sub6 cells. Whereas at operation 910a, the UE (100) measures and reports both the sub6 cell and the mmWave cells to the network.

At operation 912a, the UE (100) checks whether the sub6 cell with the good RSRP is found or not. The flow proceeds to operation 914a in case that the cell with good RSRP is found, and operation 916a is performed in case that the sub6 cell with the good RSRP is not found. At operation 914a, the UE (100) reports only the sub6 cells to the network. Finally, at operation 918a, the UE (100) is camped on the sub6 cell. At operation 916a, the UE (100) measures and reports the mmWave cell along with the sub6 cells found with low RSRP. Finally, at operation 918a, the UE (100) is camped on the mmWave cell or the sub6 cell depending upon the KPI criteria.

Referring to FIG. 9b, it is assumed that the UE (100) is currently camped on the sub6 cell. At operation 902b, the UE (100) is determined to be on the sub6 cell. At operation 904b, the network configures measurement object for the mmWave cells and the sub6 neighbouring cells. At operation 906b, the UE (100) determines whether the mmWave cell is preferred or not. The flow proceeds to operation 908b in response to determining that the mmWave cells are preferred or else to operation 910b. At operation 908b, the UE (100) scans the mmWave frequency for the mmWave cells. Whereas at operation 910b, the UE (100) measures and reports both the sub6 cell and the mmWave cells to the network.

At operation 912b, the UE (100) checks whether the mmWave cell with good RSRP is found or not. The flow proceeds to operation 914b in response to determining that the mmWave cell with good RSRP is found or else to operation 916b. At operation 914b, the UE (100) reports only the mmWave cells to the network. At operation 916b, the UE (100) measures and reports the sub6 cell along with the mmWave cells found with low RSRP. Finally, at operation 918b, the UE (100) is camped on the mmWave cell or the sub6 cell depending upon the KPI criteria.

Figure 10A:
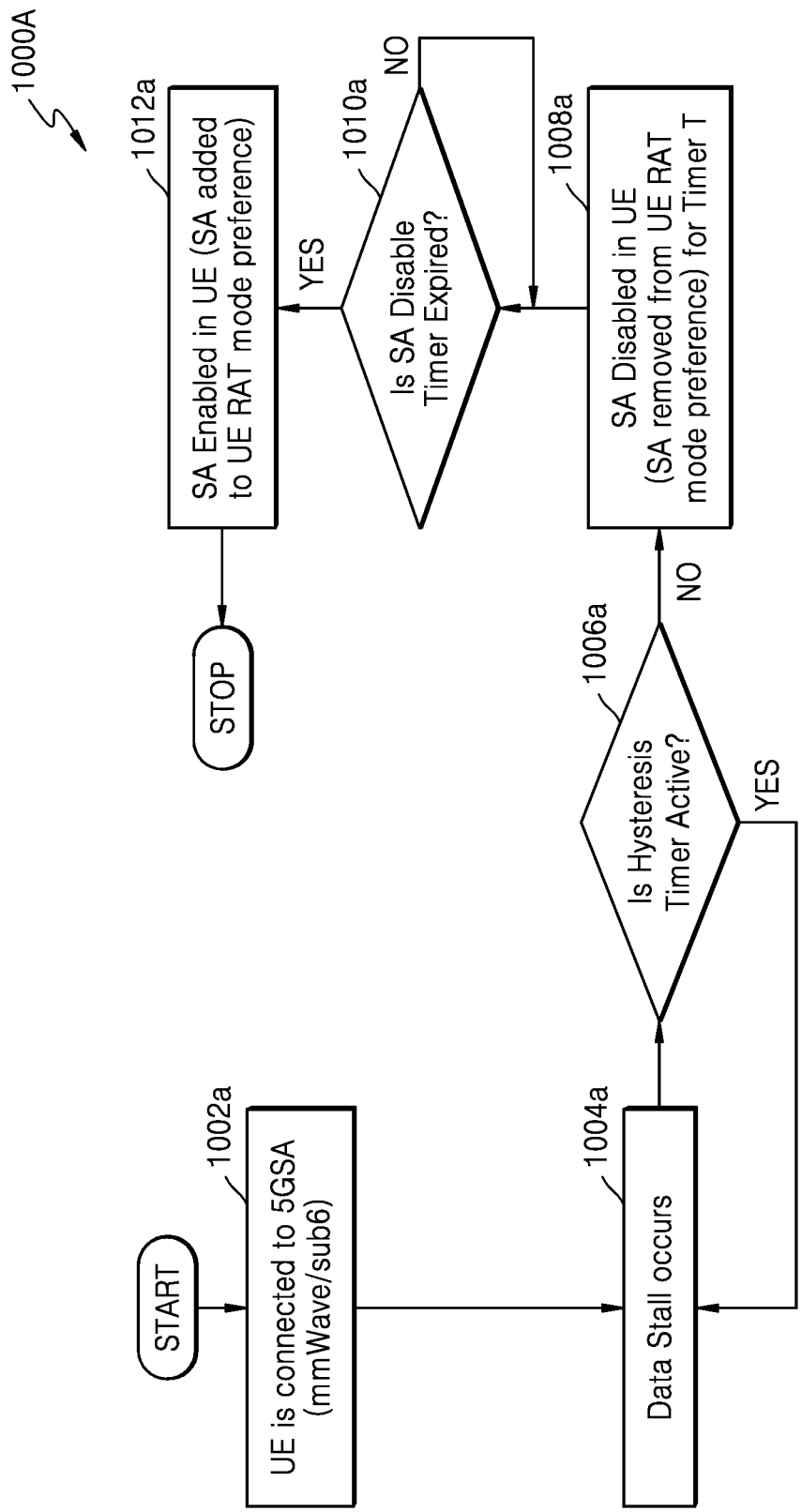
FIGS. 10a and 10b are flow diagrams, illustrating the method for disabling a 5G standalone during data stall at the UE, according to an example embodiment.
Figure 10B:
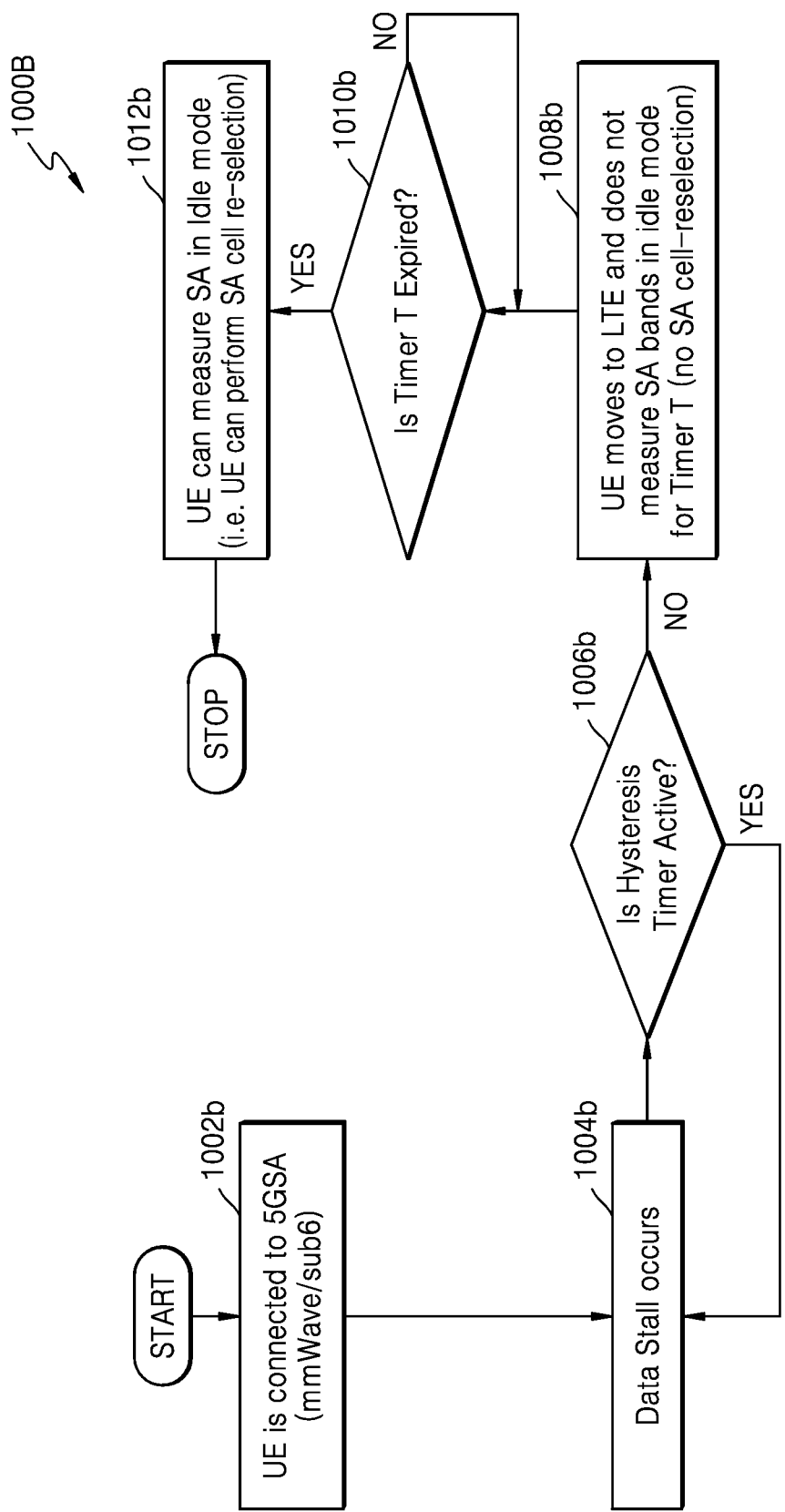

FIGS. 10a and 10b illustrate the method for disabling 5G standalone (SA) during data stall at the UE (100), according to an example embodiment.

In the present embodiment, the SA mode is disabled in the UE (100), when data stalling occurs. It is to be noted that the UE (100) may take a decision to remove the SA mode from the UE (100) mode preference and move to the LTE mode. The SA may be removed for timer T and added back once the timer T is expired. In another embodiment, the UE (100) moves to the LTE and stops measuring SA bands in idle mode. Further, the UE (100) process runs for a timer T and at the end of the timer T, the UE (100) measures SA band in the idle mode.

In an embodiment, if the UE (100) detects data stall on 5G SA mode, then the UE (100) shall move to the LTE cell. In an embodiment the UE (100) shall remove SA mode from mode preferences for timer T duration. In another embodiment, the UE (100) avoids measuring SA cell for timer T duration. By doing so, data stalling is avoided on SA and the UE (100) shall get service on the LTE.

FIG. 10a illustrates the first method for disabling the SA mode, where the SA mode is removed for timer T.

At operation 1002a, the UE (100) is determined to be in connected 5GSA mode and may be camped in either the mmWave cell or the sub6 cell. At operation 1004a, the UE (100) determines that data stall is occurred. At operation 1006a, the UE (100) determined whether the hysteresis timer is active. Operation 1008a is performed in case that the hysteresis timer has expired or else operation 1004a maintains. At operation 1008a, the UE (100) disables the SA mode for timer T. At operation 1010a, the UE (100) determines whether the timer for disabling the SA mode is expired. Operation 1012a is performed, in response to determining that the timer T is expired or else goes back to operation 1010a. At operation 1012a, the UE (100) enables the SA mode.

FIG. 10b illustrates the second method for disabling the SA mode, where the SA do not remove SA mode but does not measures the SA band for a timer T.

At operation 1002b, the UE (100) is determined to be in connected 5GSA mode and may be camped in either the mmWave cell or the sub6 cell. At operation 1004b, the UE (100) determines that data stall is occurred. At operation 1006b, the UE (100) determined whether the hysteresis timer is active. Operation 1008b is performed in response to determining that the hysteresis timer has expired or else operation 1004b is performed again. At operation 1008b, the UE (100) moves to the LTE mode and does not measures the SA band in the idle mode for the timer T. At operation 1010b, the UE (100) determines whether the timer T is expired. Operation 1012b is performed, in case that the timer T is expired or else operation 1010b is performed again. At operation 1012b, the UE (100) starts measuring the SA band in the idle mode.

Figure 11A:
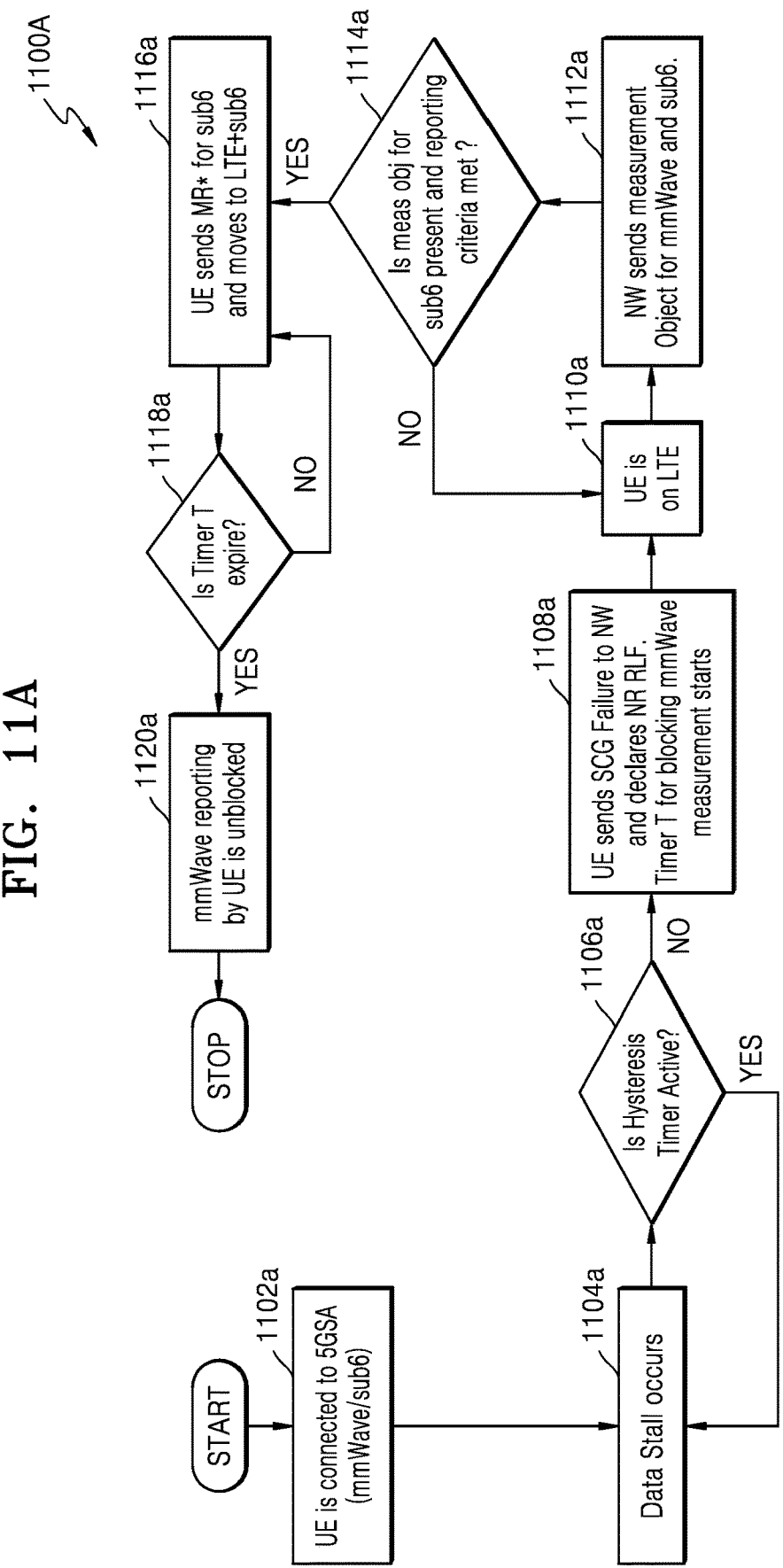
FIGS. 11a and 11b are flow diagram, illustrating a method for disabling the mmWave/Sub6 cell during data stall in an ENDC mode, according to an example embodiment.
Figure 11B:
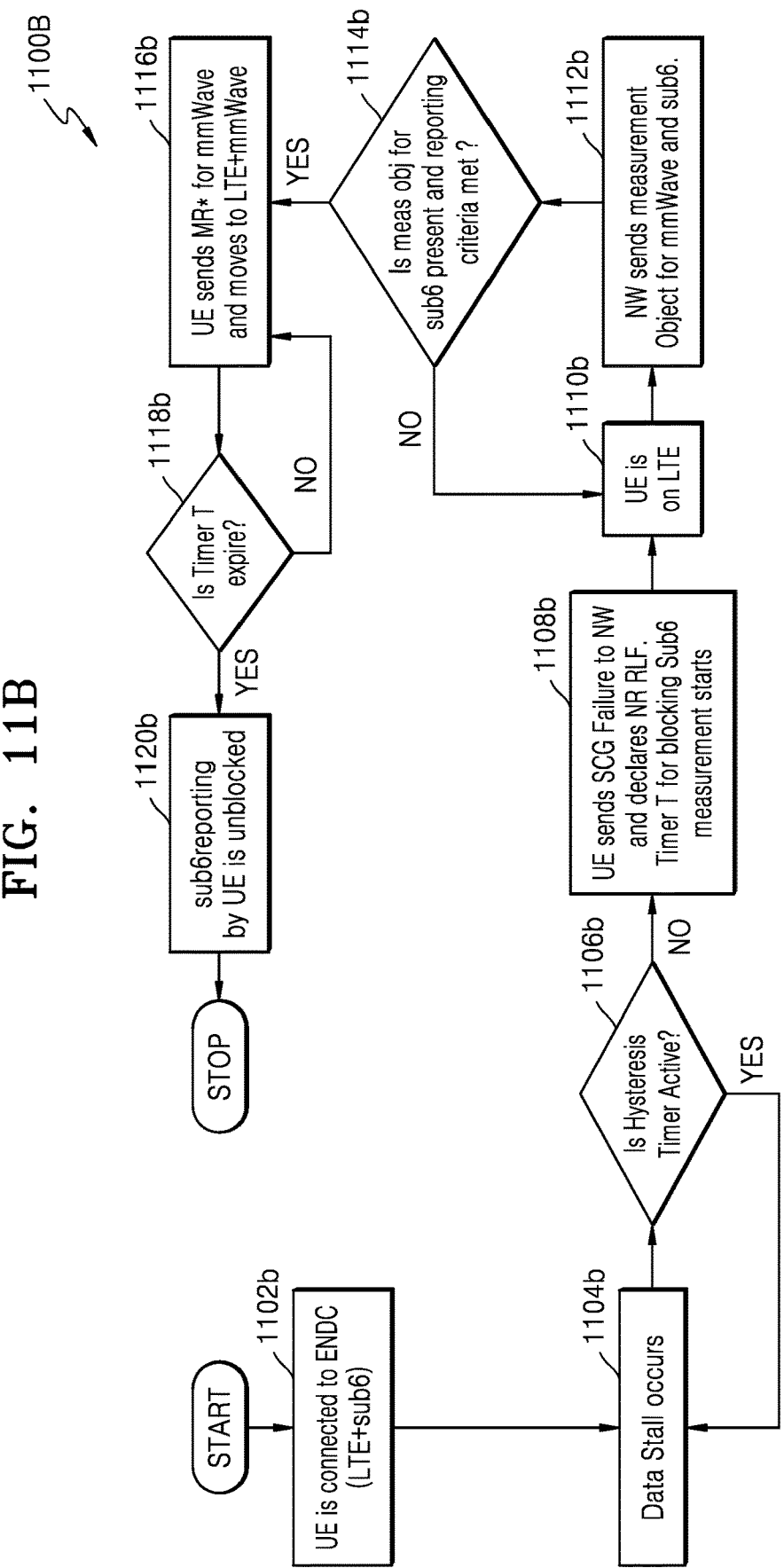

FIGS. 11a and 11b illustrate a method for disabling mmWave/Sub6 cell during data stall in ENDC mode, according to an example embodiment.

As disclosed above, the UE (100) may select the mmWave cell or the sub6 cell for camping based on the data stalling. FIGS. 11a and 11b illustrate the method of disabling the sub6 cell/mmWave cell and enabling the mmWave/sub6 cell, when the UE (100) is in the ENDC mode, accordingly.

In an embodiment, when data stall is observed at the UE (100) while the UE (100) is camped on the mmWave cell, the UE (100) send a Secondary Cell Group (SCG) failure to the network and declares the NR Radio Link Failure (RLF). The Network sends measurement object for the NR frequencies. The UE (100) does not measure and report mmWave for Timer T. If sub6 measurement object is present, the UE (100) sends a measurement report for sub6 if reporting criteria are met else the UE (100) remains in the LTE cell. After Timer T expires, mmWave reporting is unblocked.

In an embodiment, when data stall is observed at the UE (100) while the UE (100) is camped on the sub6 cell, the UE (100) sends the SCG failure to the network and declares the NR RLF. The network sends the measurement object for the NR frequencies. The UE (100) does not measure and report the sub6 cell for Timer T. If the mmWave measurement object is present, the UE (100) sends the measurement report for mmWave if reporting criteria are met else the UE (100) remains in LTE. After Timer T expires the sub6 cell reporting is unblocked.

Flow 1100A explains the above process in detail, where the UE (100) is camped to the mmWave cell. At operation 1102a, the UE (100) is determined to be in the ENDC connected mode. The UE (100) is camped on the mmWave cell. At operation 1104a, data stalling occurs at the UE (100). At operation 1106a, the method determines whether the hysteresis timer is active. The flow proceeds to operation 1108a in response to determining that the hysteresis timer is expired or else the flow goes back to operation 1104a. At operation 1108a, the UE (100) sends the SCG failure to the network and declares the NR RLF. Further, the UE (100) sets a timer T, such that the mmWave reporting by the UE (100) are blocked for the time T and the timer is started. Further, at operation 1110a, the UE (100) is on LTE. At operation 1112a, the network sends measurement object for the mmWave cell and the sub6 cell. At operation 1114a, the UE (100) determines whether the measurement object for sub6 is present and whether the network configured reporting criteria for the sub6 measurement object is met. The flow proceeds to operation 1116a in response to determining that the measurement object for the sub 6 cell is received and the reporting criteria is met or else the flow goes back to operation 1110a. At operation 1116a, the UE (100) sends the measurement report for the sub6 cell and moves to the sub6 cell. At operation 1118a, the UE (100) checks whether the timer T is expired, and proceeds to operation 1120a if the timer is expired or else goes back to operation 1116a. At operation 1120a the UE (100) unblocks the reporting of the mmWave cell.

Flow 1100B explains the above process in detail, where the UE (100) is camped to the sub6 cell. At operation 1102b, the UE (100) is determined to be in ENDC connected mode. The UE (100) is camped on the sub6 cell. At operation 1104b, data stalling occurs at the UE (100). At operation 1106b, the method determines whether the hysteresis timer is active. The flow proceeds to operation 1108b in response to determining that the hysteresis timer is expired or else the flow goes back to operation 1104b. At operation 1108b, the UE (100) sends the SCG failure to the network and declares the NR RLF. Further, at the UE (100) sets a timer T, such that the sub6 cell reporting by the UE (100) are blocked for the time T and the timer is started. Further, at operation 1110b, the UE (100) is on LTE. At operation 1112b, the network send measurement object for the mmWave cell and the sub6 cell. At operation 1114b, the UE (100) determines whether the measurement object for the sub6 cell is present and whether the network configured reporting criteria for the mmWave measurement object is met. The flow proceeds to operation 1116b in response to determining that the measurement object for the mmWave cell is received and the reporting criteria is met or else the flow goes back to operation 1110b. At operation 1116b, the UE (100) sends the measurement report for the mmWave cell and moves to the sub6 cell. At operation 1118b, the UE (100) checks whether the timer T is expired, and proceeds to operation 1120b if the timer is expired or else goes back to operation 1116b. At operation 1120b the UE (100) unblocks the reporting of the sub6 cell.

Figure 12A:
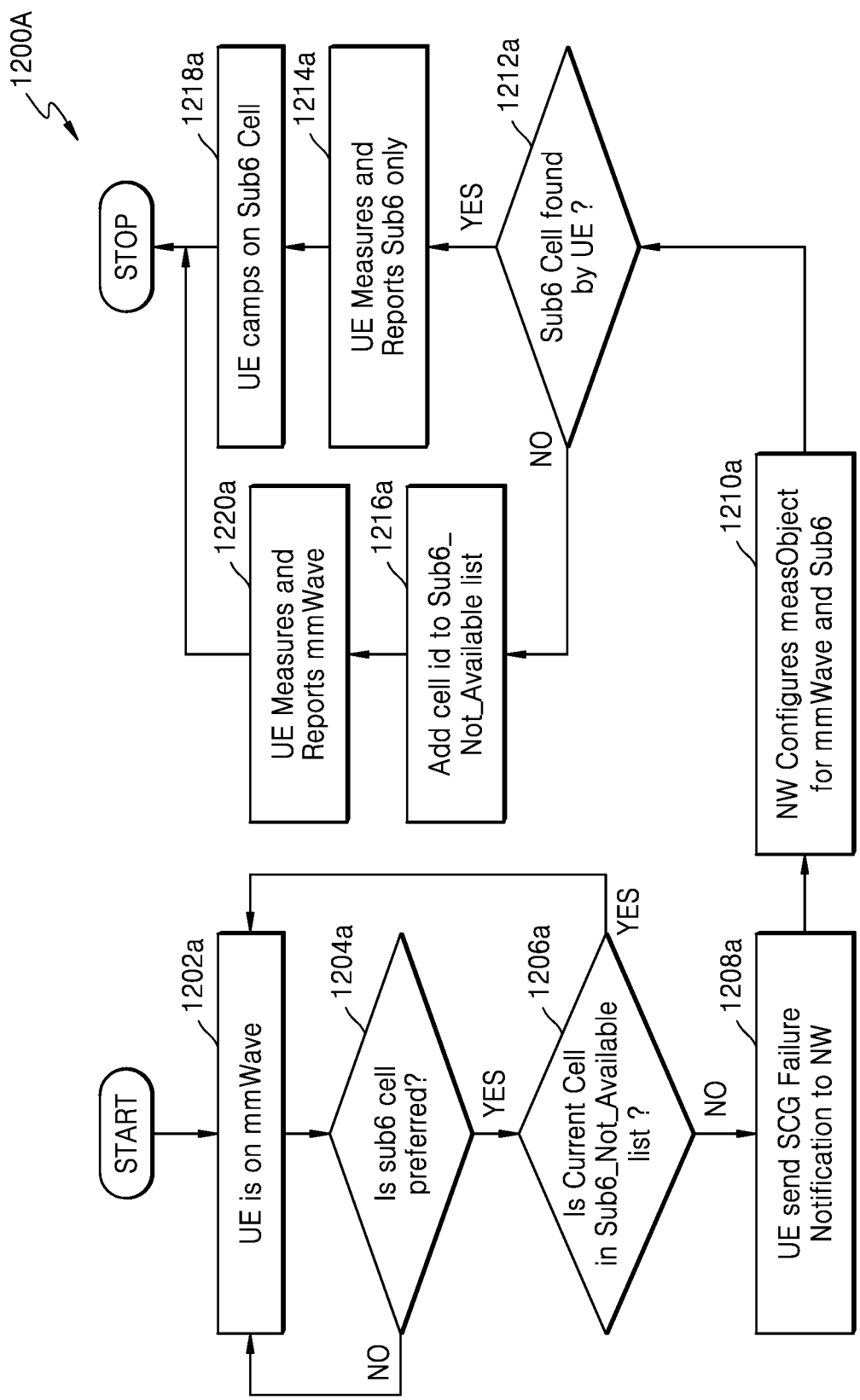
FIGS. 12a and 12b are flow diagrams 1200a and 1200b illustrating the method of prioritizing the mmWave cell and the sub6 cell in an ENDC connected mode of the UE, according to an example embodiment.
Figure 12B:
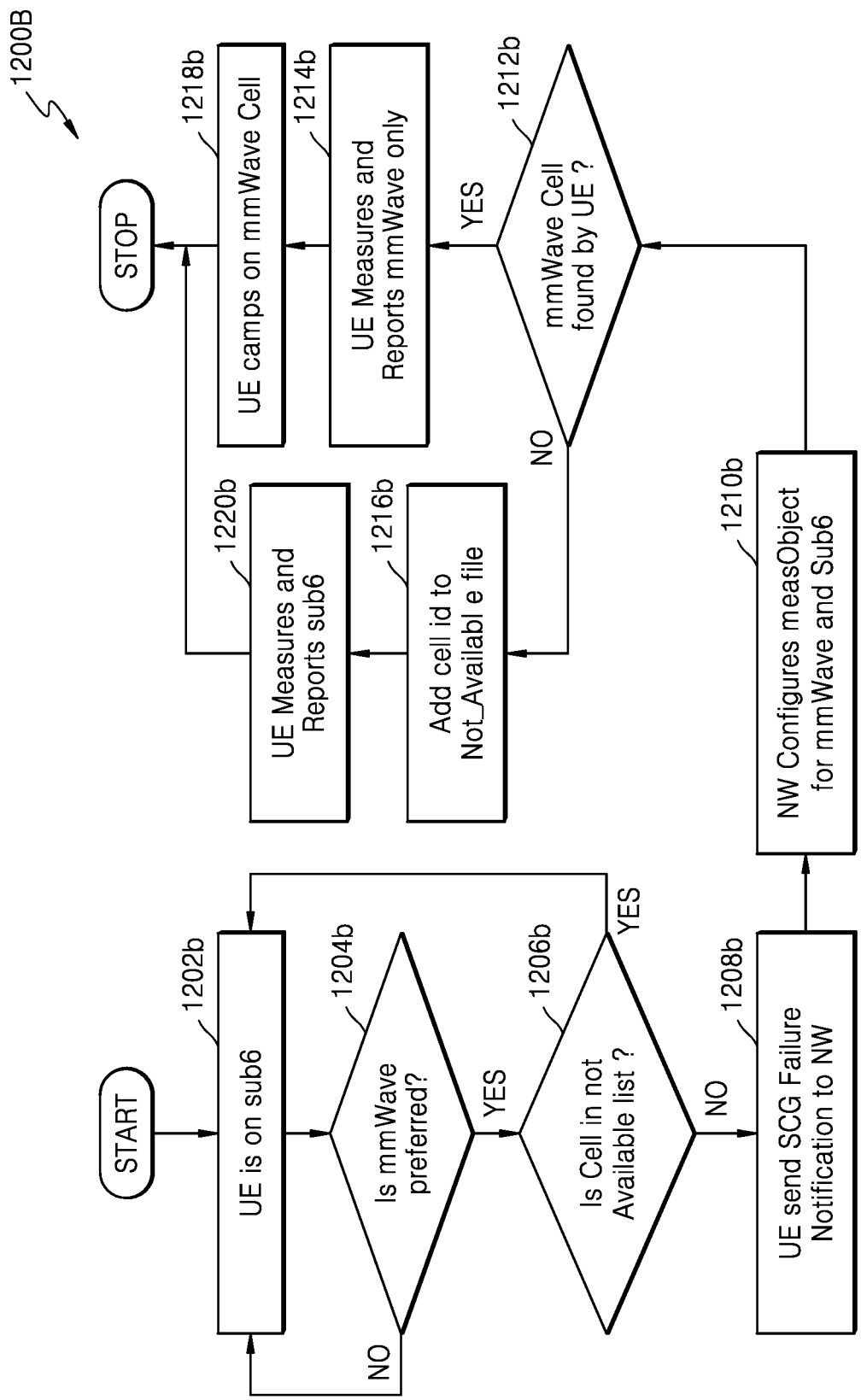

FIGS. 12a and 12b are flow diagrams 1200A and 1200B illustrating the method of prioritizing mmWave cell and sub6 cell in the ENDC connected mode of the UE (100), according to an example embodiment.

It is to be noted that the existing ENDC power saving optimizations does not take into consideration, the difference between Sub6 and mmWave Frequency operations and associated power consumption characteristics. Using separate handling for Sub6 and mmWave in ENDC mode of operation is more beneficial compared to already available solutions as claimed in the current disclosure.

The embodiment discloses that the UE (100) maintains a list of EUTRA Cell Global Identity (ECGI) and/or NR Cell Global Identifier (NCGI), where a list of Sub6_Not_Available comprises the ECGIs/NCGIs where Sub6 frequencies were scanned but no Sub6 Cells were found. Similarly, a list mmWave_Not_Available comprising the ECGIs/NCGIs where mmWave frequencies were scanned but no mmWave cells were found. Thus, when the UE (100) scans for the mmWave frequencies but finds no cells, then the current ECGI/NCGI is added to mmWave_Not_Available file. Similarly, when the UE (100) scans for Sub6 frequencies but finds no cells, current ECGI/NCGI shall be added to Sub6_Not_Available file. These lists are deleted upon reboot of the UE (100). The entry in the list mmWave_Not_Available is removed, if by any means, the UE (100) finds a mmWave cell on an EUTRA/NR cell, which was present in mmWave_Not_Available list. Similarly, the entry in the file Sub6_Not_Available is removed, if by any means, the UE (100) finds the Sub6 cell on an EUTRA/NR cell, which was present in Sub6_Not_Available file.

In an embodiment, if the UE (100) is on the mmWave cell and current cell ID (ECGI/NCGI) is not in Sub6_Not_Available list, then the UE (100) sends a SCG Failure notification to the network. The network configures measurement objects for the mmWave and the Sub6. The UE (100) measures and reports only if the Sub6 cells. If the Sub6 cell is not found, the UE (100) measures and reports the mmWave cells. This way, the network configures the UE (100) with Sub6 cell if Sub6 cell is available.

The flow 1200A, illustrates the method of prioritizing the sub6 cell over the mmWave cell. At operation 1202*a*, the UE (100) is determined to be on the mmWave cell. At 1204*a*, the UE (100) determines whether the sub6 cell is preferred. The UE (100) determines which cell is preferred based on the KPIs and the KPI criteria as discussed previously in the specification. In an embodiment, the flow 1200A proceeds to operation 1206*a* in response to determining that the sub6 cell is preferred or else goes back to operation 1202*a*. At operation 1206*a*, the UE (100) checks whether the current sub6 cell is present in the sub6_Not_Available list. The flow proceeds to operation 1208*a* in response to determining that the present cell is not therein the sub6_Not_Available list or else to operation 1202*a*. At operation 1208*a*, the UE (100) sends the SCG failure notification to the network. At 1210*a*, the network configures measurement objects for the mmWave and the sub6 cell. At operation 1212*a*, the UE (100) determines whether the sub6 cell is found. The flow proceeds to operation 1214*a* in response to determining that the sub6 cell is found by the UE (100) or else to operation 1216*a* in response to determining that the sub6 cell is not found by the UE (100). At operation 1214*a*, the UE (100) measures and reports on the sub6 cells and camps on the sub 6 cell at operation 1218*a*. Whereas at operation 1216*a*, the UE (100) adds the cell ID of the cell which was not found by the UE (100) to the sub6_Not_Available list. At operation 1220*a*, the UE (100) measures and reports the mmWave cell.

The flow 1200B, illustrates the method of prioritizing the mmWave cell over the sub6 cell. At operation 1202*b*, the UE (100) is determined to be on the sub6 cell. At operation 1204*b*, the UE (100) determines whether the mmWave cell is preferred. The UE (100) determines which cell is preferred based on the KPIs and the KPI criteria as discussed previously in the specification. In an embodiment, the flow 1200B proceeds to operation 1206*b* in response to determining that the mmWave cell is preferred or else goes back to operation 1202*b*. At operation 1206*b*, the UE (100) checks whether the current mmWave cell is present in the mmWave_Not_Available list. In an embodiment, the mmWave cell ID are found in the list. For example, for 5G cell the ID be termed as 5GNR Cell Global Identity (NCGI) and for LTE cell, the cell ID is termed as E-UTRAN cell global identifier (ECGI).

The flow proceeds to operation 1208*b* in response to determining that the present cell is not therein the mmWave_Not_Available list or else to operation 1202*b*. At operation 1208*b*, the UE (100) sends the SCG failure notification to the network. At operation 1210*b*, the network configures measurement objects for the mmWave and the sub6 cell. At operation 1212*b*, the UE (100) determines whether the mmWave cell is found. The flow proceeds to 1214*b* in response to determining that the mmWave cell is found by the UE (100) or else to operation 1216*b* in response to determining that the mmWave cell is not found by the UE (100). At operation 1214*b*, the UE (100) measures and reports the mmWave cells and camps on the mmWave cell at operation 1218*b*. Whereas at operation 1216*b*, the UE (100) adds the cell ID of the cell which was not found by the UE (100) to the mmWave_Not_Available list. At operation 1220*b*, the UE (100) measures and reports the sub6 cell.

Figure 13A:
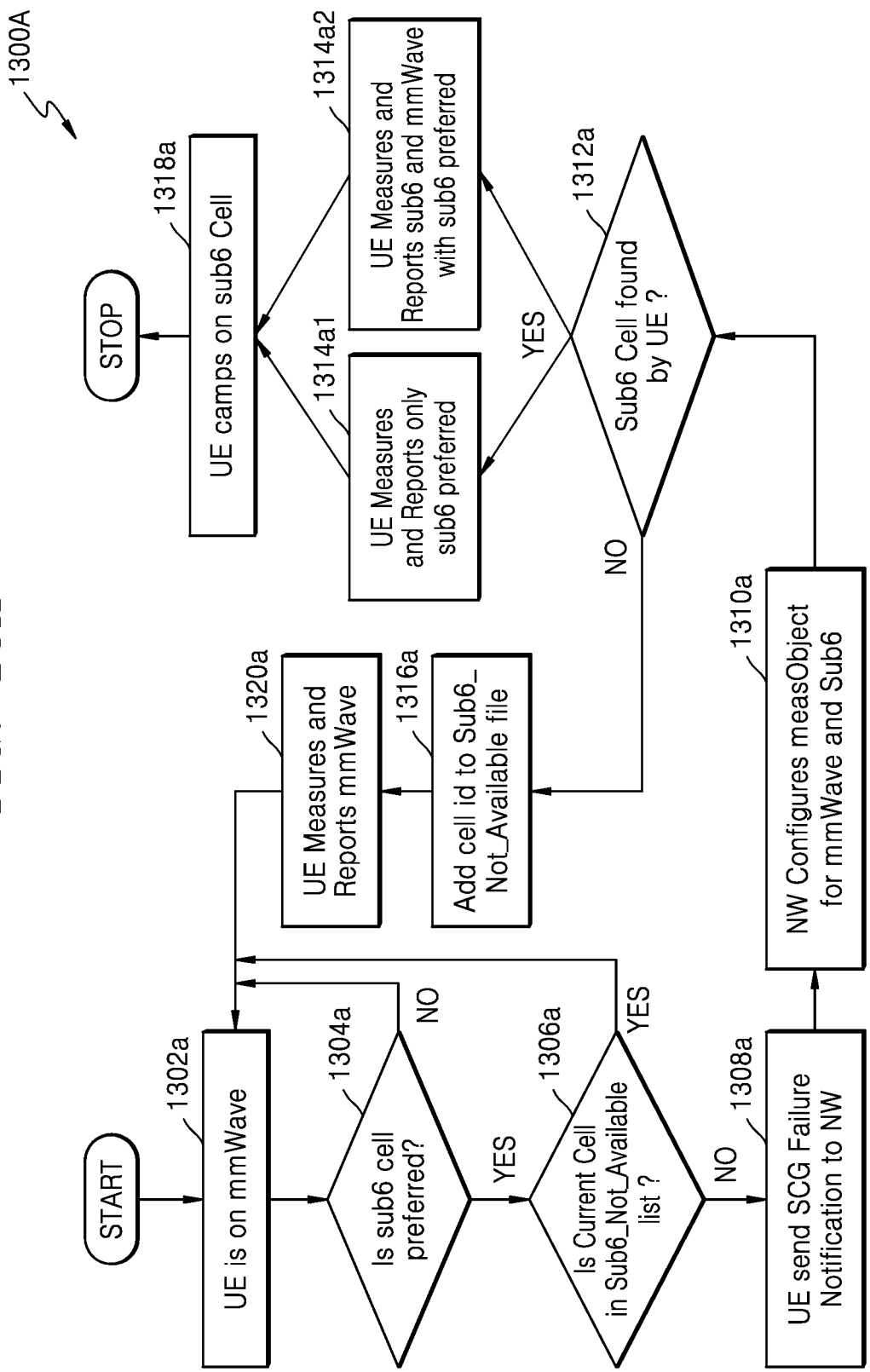
FIGS. 13a and 13b are flow diagrams 1300a and 1300b illustrating the method of prioritizing the mmWave cell and the sub6 wave cell in the ENDC connected mode of the UE, according to an example embodiment.
Figure 13B:
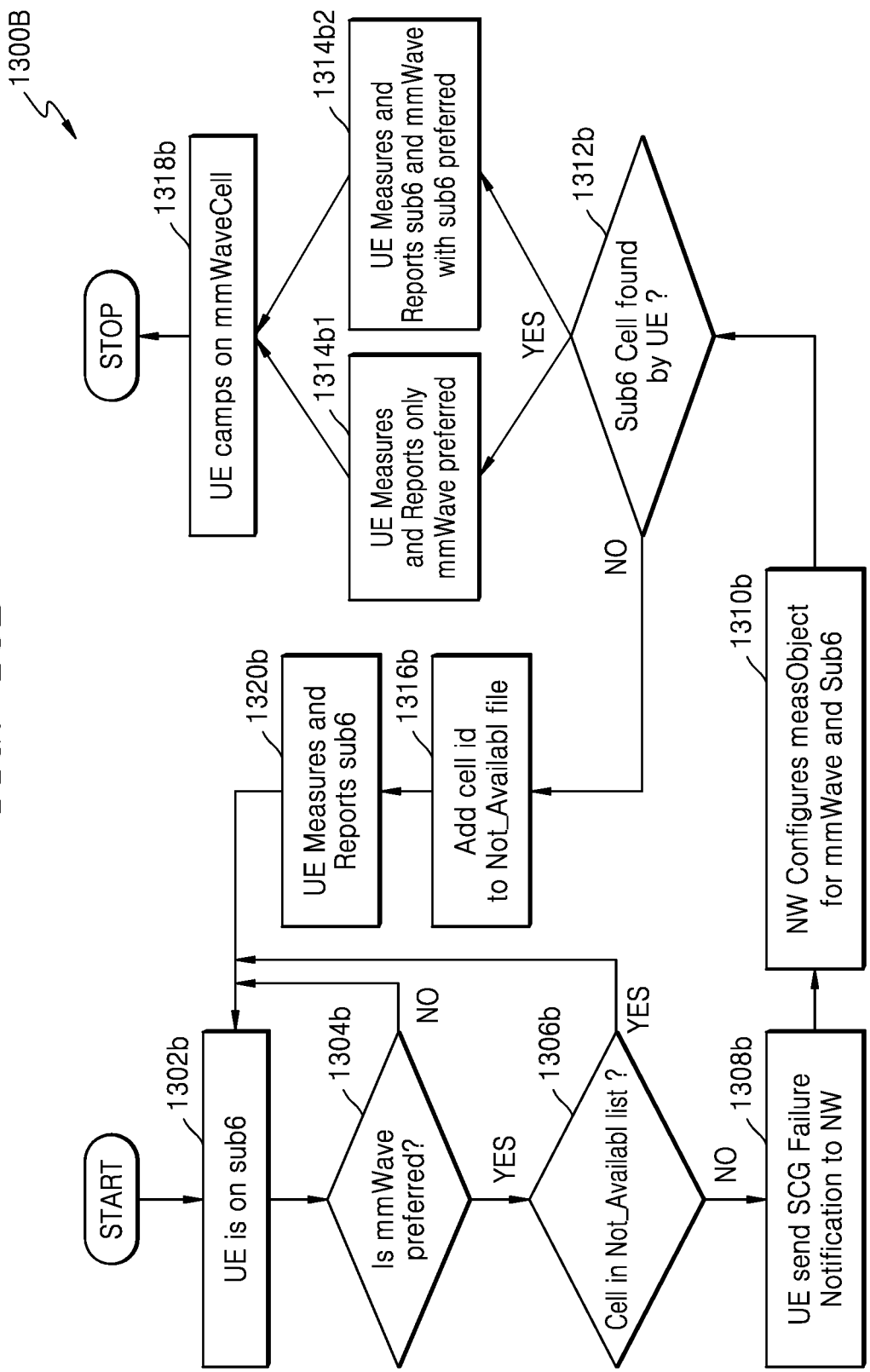

FIGS. 13*a* and 13*b* are flow diagrams 1300A and 1300B illustrating the method of prioritizing the mmWave cell and the sub6 cell in the ENDC connected mode of the UE (100), according to an example embodiment.

It is to be noted that the existing ENDC power saving optimizations does not take into consideration, the difference between Sub6 and mmWave frequency operations and associated power consumption characteristics. Using separate handling for Sub6 and mmWave in ENDC mode of operation is more beneficial compared to already available solutions as claimed in the current disclosure.

The current embodiment discloses defining a new Information Element (IE) in the measurement report by the UE (100), to indicate priority for Sub6 or mmWave cell. In the present embodiment, if the UE (100) is on the mmWave cell and the current cell ID (ECGI/NCGI) is not in Sub6_Not_Available list, then UE shall send SCG Failure notification to the network. The network configures measurement objects from the mmWave cell and the sub6 cell. The UE (100) measures only the sub6 cells and inform that only sub6 are preferred or the UE (100) sends sub6 and mmWave along with the priority for sub6.

The flow 1300A, illustrates the method of prioritizing the sub6 cell over the mmWave cell. At operation 1302*a*, the UE (100) is determined to be on the mmWave cell. At operation 1304*a*, the UE (100) determines whether the sub6 cell is preferred. The UE (100) determines which cell is preferred based on the KPIs and the KPI criteria as discussed previously in the specification. In an embodiment, the flow 1300A proceeds to operation 1306*a* in response to determining that the sub6 cell is preferred or else goes back to operation 1302*a*. At operation 1306*a*, the UE (100) checks whether the current sub6 cell is present in the sub6_Not_Available list. The flow proceeds to operation 1308*a* in response to determining that the present cell is not therein the sub6_Not_Available list or else to operation 1302*a*. At operation 1308*a*, the UE (100) sends the SCG failure notification to the network. At operation 1310*a*, the network configures the measurement objects for the mmWave and the sub6 cell. At operation 1312*a*, the UE (100) determines whether the sub6 cell is found. The flow proceeds to operations 1314*a*1 and 1314*a*2 in response to determining that the sub6 cell is found by the UE (100) or else to operation 1316*a* in response to determining that the sub6 cell is not found by the UE (100). At operation 1314*a*1, the UE (100) measures and reports the sub6 cells and camps on the sub6 cell at operation 1318*a*, whereas at operation 1314*a*2, the UE (100) measures and reports the sub6 and the mmWave cells with an indication that the sub6 cell is preferred.

At operation 1316*a*, the UE (100) adds the cell ID of the cell which was not found by the UE (100) to the sub6_Not_Available list. At, operation 1320a, the UE (100) measures and reports the mmWave cell.

The flow 1300B, illustrates the method of prioritizing the mmWave cell over the sub6 cell. At operation 1302b, the UE (100) is determined to be on the sub6 cell. At operation 1304b, the UE (100) determines whether the mmWave cell is preferred. The UE (100) determines which cell is preferred based on the KPIs and the KPI criteria as discussed previously in the specification. In an embodiment, the flow 1300B proceeds to operation 1306b in response to determining that the mmWave cell is preferred or else goes back to operation 1302b. At operation 1306b, the UE (100) checks whether the current mmWave cell is present in the mmWave_Not_Available list. The flow proceeds to operation 1308b in response to determining that the present cell is not therein the mmWave_Not_Available list or else to operation 1302b. At operation 1308b, the UE (100) sends the SCG failure notification to the network. At operation 1310b, the network configures the measurement objects for the mmWave and the sub6 cell. At operation 1312b, the UE (100) determines whether the mmWave cell is found. The flow proceeds to operations 1314b1 and 1314b2 in response to determining that the mmWave cell is found by the UE (100) or else to operation 1316b in response to determining that the mmWave cell is not found by the UE (100). At operation 1314b1, the UE (100) measures and reports the mmWave cells and camps on the mmWave cell at operation 1318b, whereas at operation 1314b2, the UE (100) measures and reports the sub6 and the mmWave with an indication that the mmWave cell is preferred.

In an embodiment, at operation 1316b, the UE (100) adds the cell ID of the cell which was not found by the UE (100) to the mmWave_Not_Available list. At operation 1320b, the UE (100) measures and reports the sub6 cell.

Figure 14:
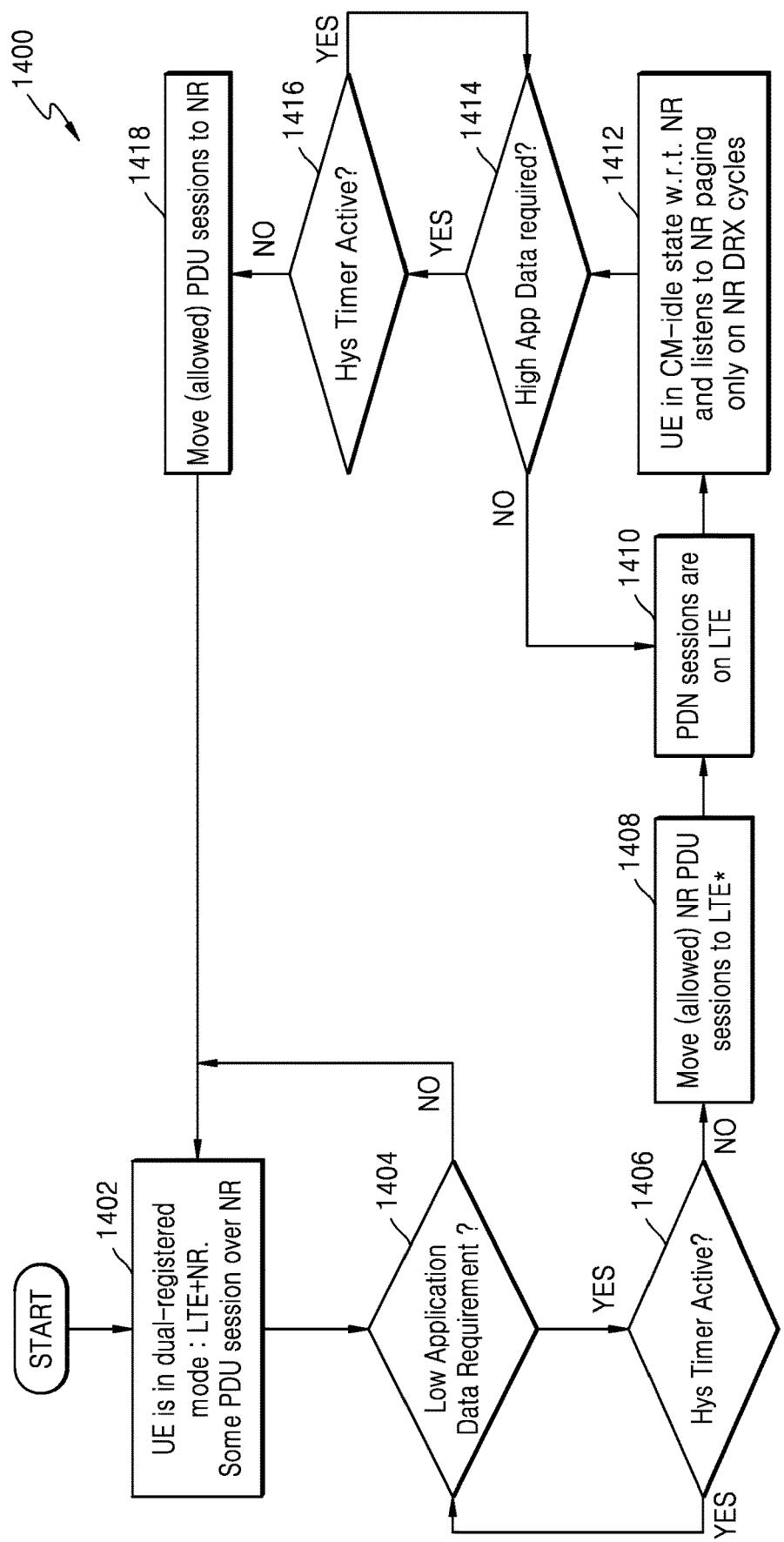
FIG. 14 is a flow diagram, illustrating the method for New Radio (NR) Discontinuous reception (DRX) cycle optimization in the 5G SA mode and when the UE is in a dual registration mode, according to an example embodiment.

FIG. 14 is a flow diagram, illustrating the method for New Radio (NR) Discontinuous reception (DRX) cycle optimization in 5G SA mode and when the UE (100) is in dual registration mode, according to an embodiment as disclosed herein.

In an embodiment, the UE (100) is registered to both the 5GC and the EPC using the dual registration mode and no PDU session is established on the NR. Further, the Mobile Terminal (MT) traffic is not expected on the NR. The UE (100) listens for NR DRX cycles such as 2×, 3× and the like, thus reducing power consumption.

In another embodiment, the PDU session is established on the NR, but low data rate (data rate<X mbps) is observed. In such case the PDU session is initially on the NR. However, when low data is required by application running in the NR PDU, the applications PDNs are transferred on the LTE. Similarly, when high data activity is required, the UE (100) moves the LTE PDNs to the NR PDU sessions. Since the UE (100) is already registered on NR, so transferring time for PDN is less.

Flow 1400 explains the above process in detail. At operation 1402, the UE (100) is in dual-registered mode LTE+NR, where some PDU session is over at the NR. At operation 1404, the UE (100) checks whether low application data requirement is there. The flow 1400 proceeds to operation 1406 in response to determining that the low application data requirement is there or else the flow goes back to operation 1402. At operation 1406, the UE (100) determines whether the hysteresis timer is active. The flow proceeds to operation 1408 in response to determining that the hysteresis timer is expired or else to operation 1404. At operation 1408, the UE (100) moves the NR PDU sessions to the LTE. At operation 1410, the PDN sessions are moved to LTE. At operation 1412, the UE (100) is in CM-idle mode with respect to the NR and listens to NR paging only on NR DRX cycle like 2×, 3× etc. At operation 1414, the UE (100) checks if the application on the UE (100) have high data requirements. The flow proceeds to operation 1416 if the application on the UE (100) have high data requirements or else goes back operation 1410. At operation 1416, the UE (100) check the hysteresis timer is expired. If the timer is expired then at operation 1418, the PDU sessions are moved to the NR.

Figure 15:
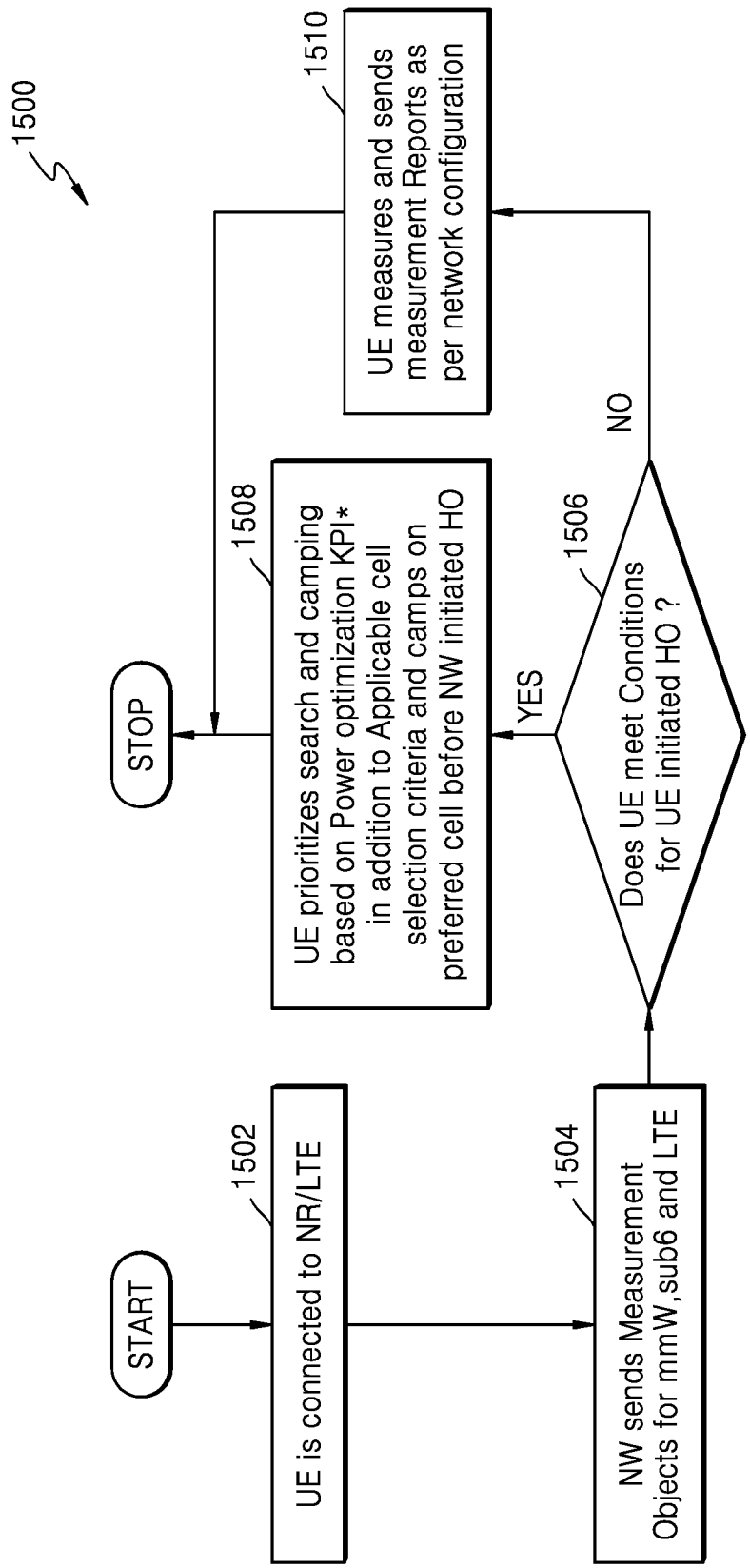
FIG. 15, is a flow diagram, illustrating an example method of initiating Hand Overs (Hos) by the UE based on KPIs and a KPI criteria.

FIG. 15, is a flow diagram, illustrating a method of initiating hand overs (HO) by the UE (100) based on the KPIs and the KPI criteria.

In existing methods, the UE (100) searches, selects and moves to best cell for the UE initiated HO when a link is lost before a HO command. This selection does not take into consideration the UE's (100) power saving optimizations which differentiates between the mmWave cell and sub6 cell. Using separate handling for Sub6 and mmWave is more beneficial compared to already available solutions. The embodiment solves the problem as mentioned below. The UE (100) is registered on the NR/LTE (LTE, ENDC, 5G SA Single registration mode, 5G SA Dual Registration mode). The network sends measurement objects for the mmWave, the sub6 and the LTE.

If the UE (100) is in weak signal conditions and conditions for the UE initiated HO is met (When RLF is imminent before Network triggered HO reaches network) then the UE (100) searches and selects the best available cell: (When RLF is imminent before Network triggered HO reaches network) based on power optimization KPI as discussed above in addition to the current cell selection criteria. Further, the UE (100) camps on the selected cell before the network initiated HO.

The flow 1500 is explained in detail below. At operation 1502, the UE (100) is connected, directly or indirectly, to the NR and the LTE. At operation 1504, the network sends the measurement objects for the mmWave, the sub6 and the LTE. At operation 1506, the UE (100) determines whether the UE (100) meets condition for UE (100) initiated HO. The flow proceeds to operation 1508 in response to determining that the UE (100) meets conditions for UE initiated HO. The flow proceeds to operation 1510 in response to determining that the UE (100) do not meet conditions for UE initiated HO. At operation 1508, the UE (100) prioritises search and camping based on power optimization based on the KPIs in addition to applicable cell selection criteria, and camps on the preferred before the network initiated HO. At operation 1510, the UE (100) measures and sends measurement reports as per network configuration.

Figure 16:
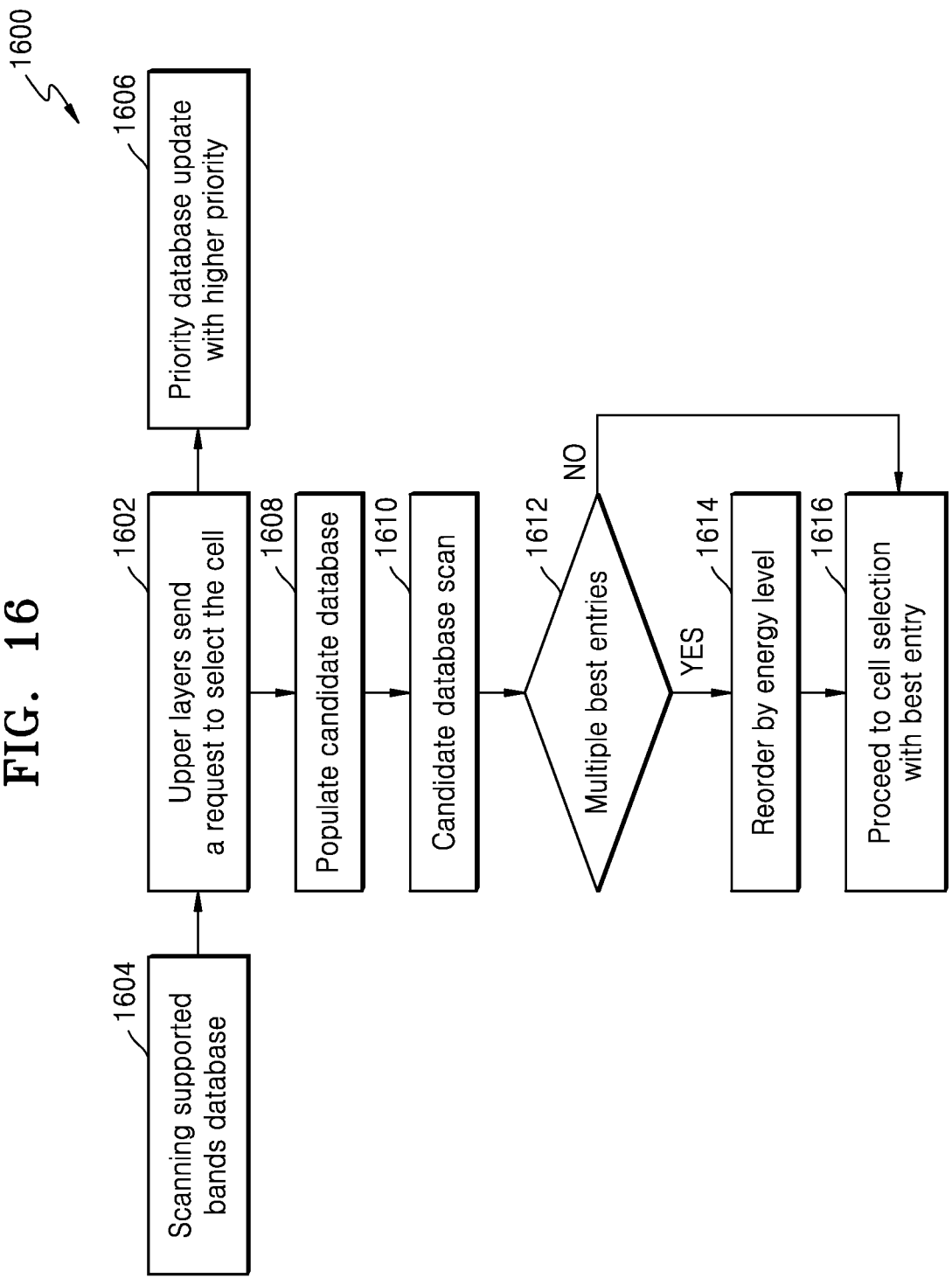
FIG. 16 is a flow diagram, illustrating a method of optimal cell selection for camping the UE based on a service request at the UE, according to an example embodiment.

FIG. 16 is a flow diagram, illustrating a method of optimal cell selection for camping the UE (100) based on a service request at the UE (100), according to an embodiment as disclosed herein.

It is to be noted that existing cell selection procedure includes choosing the suitable cell based on scan and proceeding to select the chosen cell. Whereas the present embodiment, discloses sending request by higher layers for cell selection when the UE (100) is powered on. Further, the UE (100) scans a list of frequency bands supported by the UE (100) and selects the candidate cell for scanning. The UE (100) processes the supported frequency bands and prioritizes them based on a coverage, a link budget capability of the band and the frequency. For example, the sub6 band and the FR1 band cells have higher link budget as compared to the mmWave cells and the FR2 cells. A priority database is populated (updated) with the cells chosen from the supported bands. A scan is triggered for valid frequency check from best entries of a priority Data Base (DB) and populated to a candidate DB. The best entry of the candidate DB is selected. If multiple cells are available with similar link budget capability, then the cell is chosen based on an energy level. Thus, the proposed method avoids frequent mobility and loss of service by providing optimal cell selection.

Flow 1600 illustrates the method in detail. At operation 1602, the upper layers send a request to select the cell for the UE (100). Upon receiving the request, the UE (100) scans the supported band database at operation 1604. Further at operation 1606, the UE (100) priorities cells from the band supported database based on the coverage, the link budget capability of the band and the frequency and populates (updates) the priority database. Further, at operation 1608, the UE (100) triggers a scan for valid frequency check from best entries of the priority DB and populates to the candidate DB. At operation 1610, the UE (100) performs the scan on the candidate database for choosing the best entry. Further, the UE (100) checks if multiple best entries are available at operation 1612. The UE (100) then reorders the multiple best entries based on their cell's energy level measured by the UE (100), if multiple best entries are available at operation 1614. Whereas if only single best entry is available, then the UE (100) proceeds with the single best entry for cell selection at operation 1616.

Figure 17:
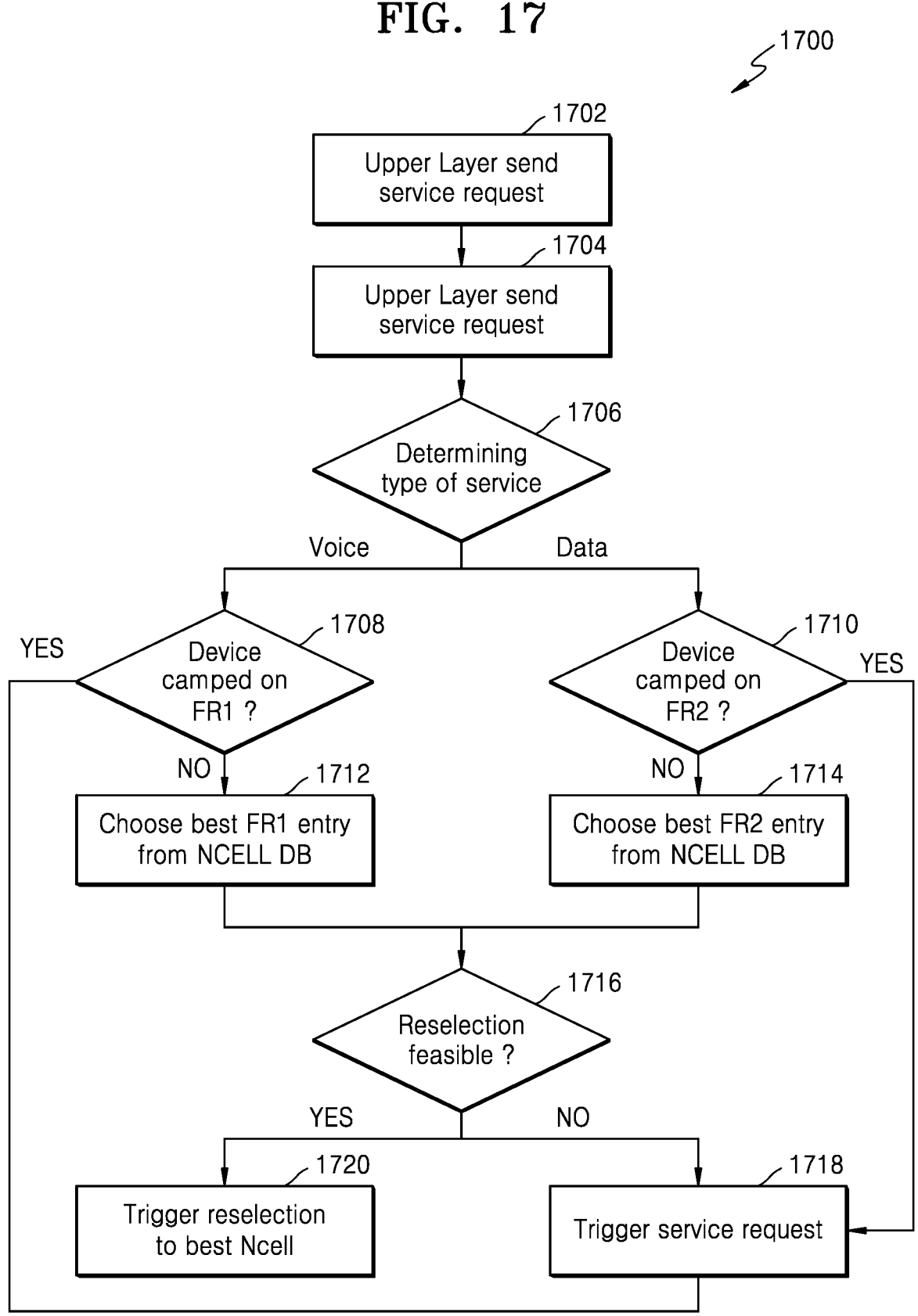
FIG. 17 is a flow diagram, illustrating a method of cell reselection based on a type of service, according to an example embodiment.

FIG. 17 is a flow diagram, illustrating a method of the cell reselection based on the type of service, according to an embodiment as disclosed herein.

In existing solutions, the cell reselection is autonomously done based on serving cell and neighbor cell signal levels. Whereas in the proposed solution, the cell reselection is performed based on the service at the UE (100) when the UE (100) is in the idle mode. The flow 1700 explains the cell reselection based on the service requested at the UE (100).

At operation 1702, the UE (100) is determined to be in the idle mode and where the most recent cell on which the UE (100) was camped while in connected mode is either mmWave cell or the sub6 cell. At operation 1704, the UE (100) receives the service request from higher layers. At operation 1706, the UE (100) determines the type of the service request. In an embodiment, the flow proceeds to operation 1708 in response to determining that the service request is for a voice call. In another embodiment, the flow proceeds to operation 1710 in response to determining that the service request is for a data call. At operation 1708, the flow determines whether the UE (100) is camped on the FR1 frequency cell and triggers the service request at operation 1718 in response to determining that the UE (100) is camped on the FR1 frequency cell. Whereas if the UE (100) is not camped on the FR1 frequency cell, the UE (100) chooses the best entry from the neighboring cell database at operation 1712 and proceeds to operation 1716. Further at operation 1710, the UE (100) determines whether the UE (100) is camped on the FR2 frequency cell and triggers the service request at operation 1718 in response to determining that the UE (100) is camped on the FR2 frequency cell. Whereas if the UE (100) is not camped on the FR1 frequency cell, the UE (100) chooses the best entry from the neighboring cell database at operation 1714 and proceeds to operation 1716. At operation 1716, the UE (100) evaluates the neighboring cell and the serving cell conditions and decides if a reselection before sending service request is feasible. The flow proceeds to 1718 in response to determining that the reselection is not feasible or else to 1720. AT 1720, the UE (100) triggers reselection to the best entry.

Figure 18:
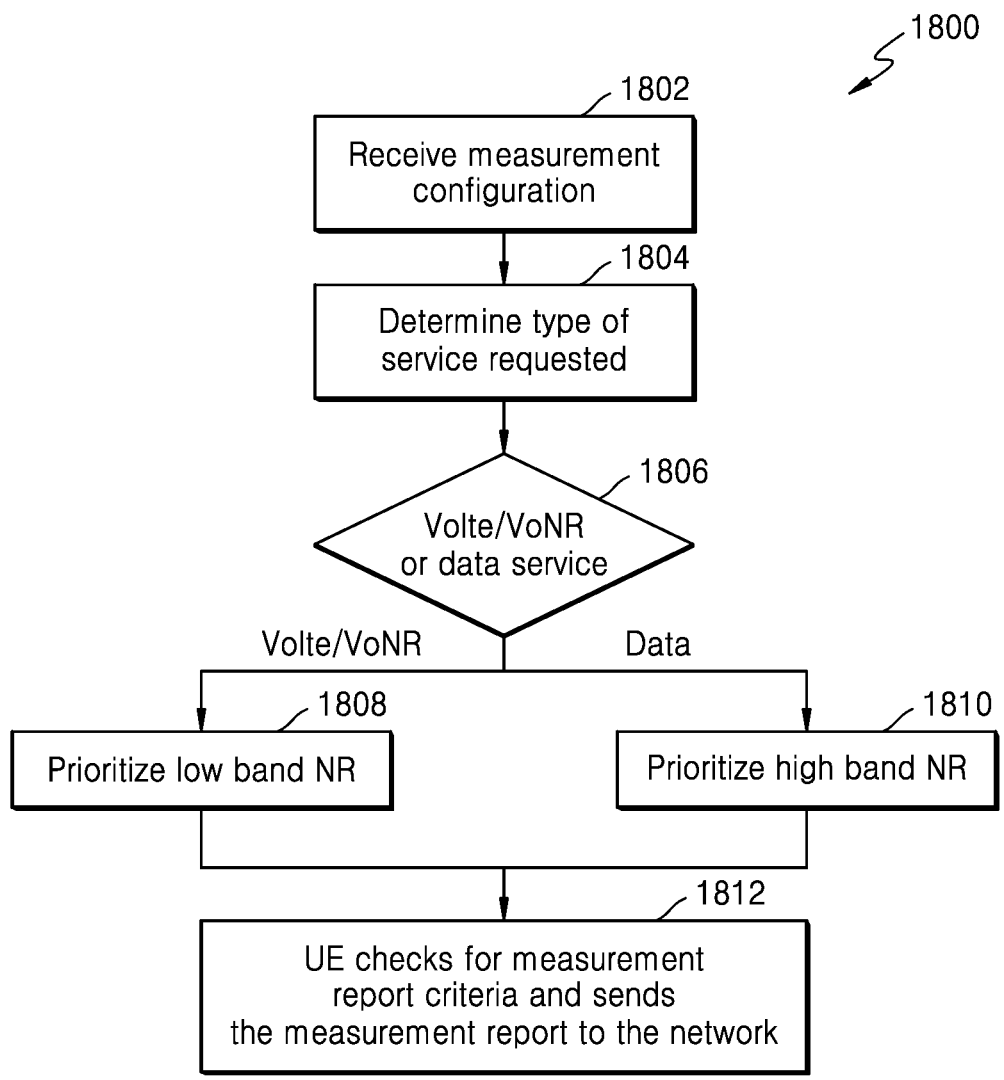
FIG. 18, is a flow diagram, illustrating a method of handovers by the UE, according to an example embodiment.

FIG. 18, is a flow diagram, illustrating a method of handovers by the UE (100), according to an embodiment as disclosed herein.

At operation 1802, the UE (100) receives measurement configuration from the network. At operation 1804, the UE (100) determines the type of service requested at the UE (100) by the upper layers. At operation 1806, the UE (100) determines whether the service requested at the UE (100) is the VoIte/VoNR or the data service. The flow proceeds to operation 1808 in response to determining that the service is Volte/VoNR. In another embodiment, the flow proceeds to operation 1810 in response to determining that the service is data service. At operation 1808, the UE (100) priorities low band NR from the measurement objects and proceeds to operation 1812. At operation 1810, the UE (100) priorities high band NR from the measurement objects and proceeds to operation 1812. At operation 1812, the UE (100) checks for measurement report criteria and sends the measurement report to the network.

Thus, as described above, based on the service request the UE (100) may choose cells from the low band or the high band. Thus, the advantage of the embodiment is prioritizing the mmW/FR2 cell for data oriented services due to high data capacity of the cell and prioritizing the Sub6/FR1 cell for voice oriented services due to better cell capacity, coverage and robustness.

Figure 19:
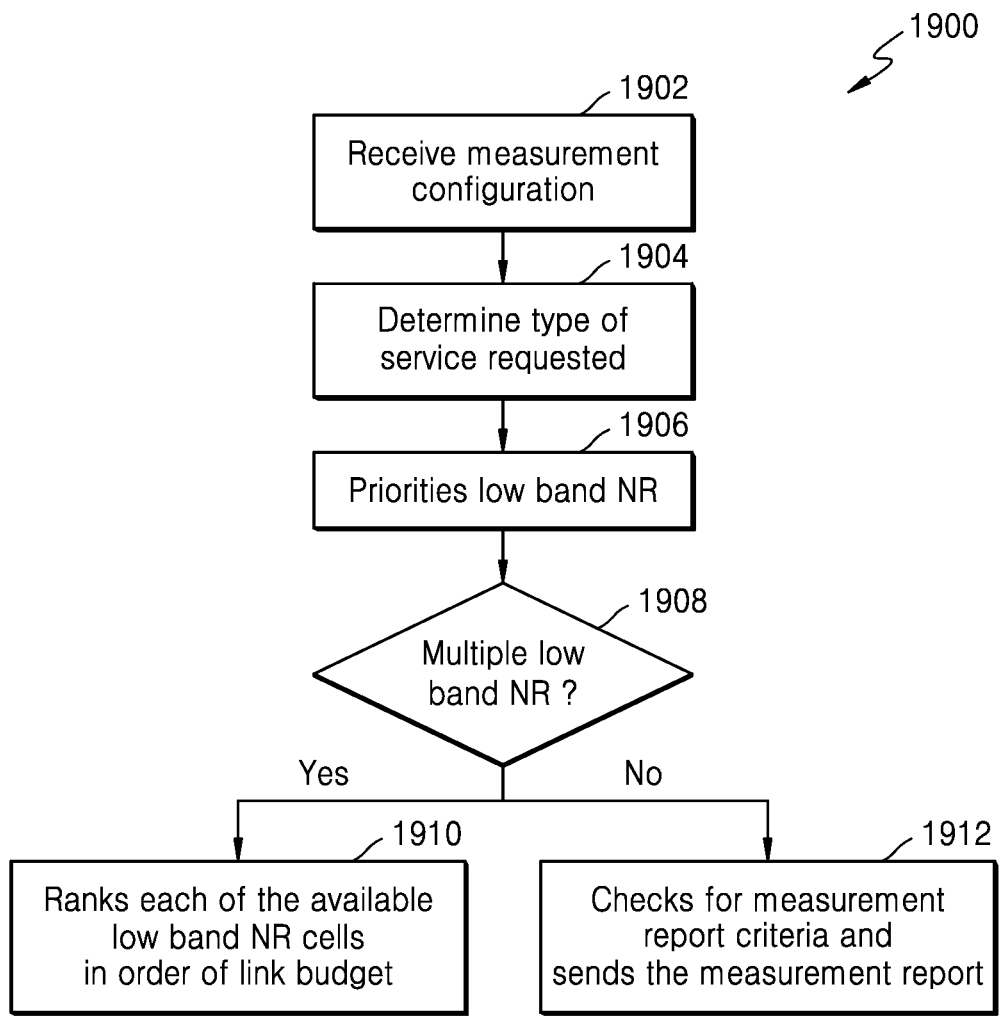
FIG. 19, is a flow diagram, illustrating a method of handovers by the UE, according to an example embodiment.

FIG. 19, is a flow diagram, illustrating a method of handovers by the UE (100), according to an embodiment as disclosed herein.

At operation 1902, the UE (100) receives measurement configuration from the network. At operation 1904, the UE (100) determines that the Volte/VoNR service is requested at the UE (100). At operation 1906, the UE (100) priorities low band NR from the measurement objects and proceeds to 1908. At operation 1908, the UE (100) determines whether multiple low band NR are available. In an embodiment, the flow proceeds to operation 1910 in response to determining that multiple low band NR are available or else to operation 1912. At operation 1910, the UE (100) ranks each of the available low band NR cells in order of the link budget, where the highest link budget gets highest priority and proceeds to operation 1912. At operation 1912, the UE (100) checks for measurement report criteria and sends the measurement report to the network.

Thus as seen above, based on the service request the UE (100) may choose cells from the low band or the high band. "Based on" as used herein covers based at least on.

Figure 20:
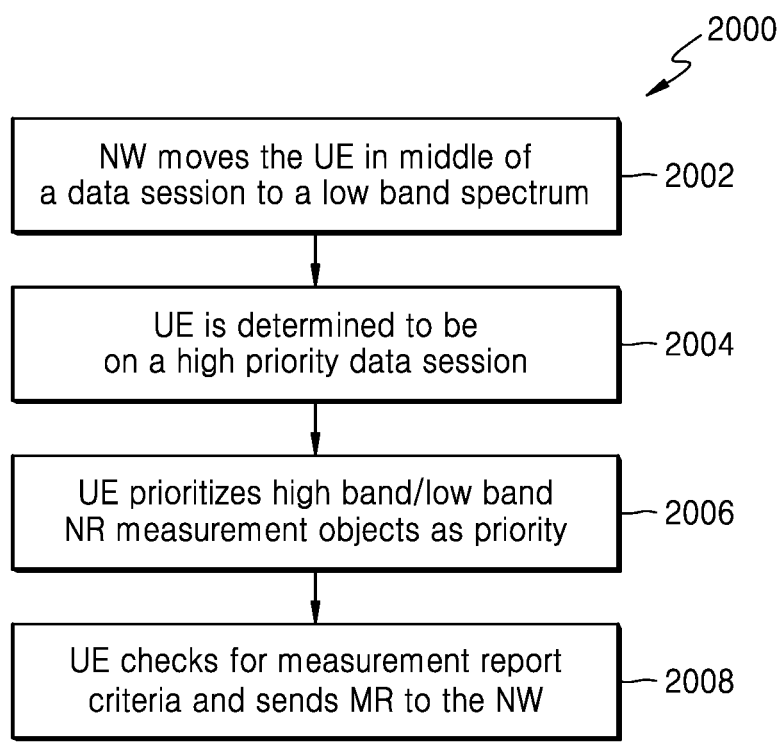
FIG. 20, is a flow diagram, illustrating a method of handovers by the UE, according to an example embodiment.

FIG. 20, is a flow diagram, illustrating a method of handovers by the UE (100), according to an embodiment as disclosed herein.

At operation 2002, the UE (100) is moved to a low band spectrum due to some specific reasons, such as congestion control.

In an embodiment, the UE (100) initially is on high band mmWave SA cell and the network redirects the UE (100) to the sub6 cell due to congestion control by blind redirection, when the At operation 2004, the UE (100), determines that a high speed data session is in progress and if the UE (100) is moved to the sub6 cell then the data speed is reduced, which in turn gives a weaker Quality of Experience (QoE) to the user.

At operation 2006, the UE (100) prioritizes the MmWave cells (high band) or the Sub6 (mid-band) cells in the configured objects to get mobility to that cell for better data speed, when the network moves the UE (100) the Sub6 cell.

At operation 2008, the UE (100) checks for the measurement report criteria for each of the prioritized measurement objects and send the measurement report (MR) to the network.

Each embodiment herein may be used in combination with any other embodiment(s) described herein.

FIG. 21 is a flow diagram, illustrating a method of handovers by the network, according to an embodiment as disclosed herein.

At operation 2102, the network checks the active PDN type of the UE (100) and calculates the data rate and or Quality of Service (QoS) requirements needed by the UE (100). At operation 2104, the network determines whether the measurement objects configuration is required. The flow proceeds to operation 2106 in response to determining that the measurement objects configuration is required or else goes back to operation 2102. At operation 2106, the network checks the type of service based on data from the PDN. The flow proceeds to operation 2108 in response to determining that the type of service is voice. In another embodiment, the flow proceeds to operation 2110 in response to determining that the type of service is data. At operation 2108, the network priorities the measurement objects of low band NR or mid band NR and the flow proceeds to operation 2112. At operation 2110, the network priorities the measurement objects of high band NR. At operation 2112 the network configures the prioritized measurement objects to the UE (100).

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A method for cell selection performed by a User Equipment (UE) in a wireless network, the method comprising:
   identifying a trigger for initiation of a service performed in the UE connected to a first cell;
   checking an availability of a frequency band determined based on the service in the first cell;
   scanning for availability of the frequency band in a second cell based on the frequency band not being available in the first cell; and
   connecting the UE to the second cell including the frequency band for the service,
   wherein the scanning for availability of the frequency band comprises:
   scanning a list of supported bands by the UE based on a type of the service;
   prioritizing a plurality of cells from the list of supported bands based on a coverage, a link budget capability, and a frequency of the supported bands;
   determining a plurality of candidate cells from the plurality of prioritized cells; and
   selecting a cell from the plurality of candidate cells according to a selection criterion.

2. The method of claim 1 wherein the frequency band includes a high, medium and low frequency band, and wherein the high frequency band is a millimeterWave (mmWave) band, the medium frequency band is a sub6 band and the low frequency band is a Long Term Evolution (LTE) band.

3. The method of claim 2, wherein the connecting of the UE to the second cell comprises:
   connecting on the low frequency band based on the service being a voice service; and
   connecting on at least one of a high frequency band or a medium frequency band based on the service being a data service.

4. The method of claim 1, wherein the scanning for availability of the frequency band further comprises:
   based on the service required being a voice service, determining that the UE is camped on a Frequency Range 1 (FR1) or a sub6 cell and triggering the request for cell selection, or determining that the UE is camped on a Frequency Range 2 (FR2) or a mm Wave cell and selecting a best FR1 cell or a best sub6 cell from a Neighboring cell (Ncell) database;
   based on the service required being a data service, determining that the UE is camped on a Frequency Range 2 (FR2) or a mmWave cell and triggering the request for cell selection, or determining that the UE is camped on a FR1 or a sub6 cell and selecting a best FR2 cell or a best mmWave cell from the Ncell database;
   determining whether the cell reselection is required based on a serving cell and a neighboring cell condition;
   based on the cell reselection being required, triggering the cell reselection to a best Ncell from the Ncell database, or triggering a request for cell reselection to a cell on which the UE is currently camped.

5. A method for cell selection for a User Equipment (UE) in a wireless network, the method comprising:
   determining, by the UE, a plurality of current Key Performance Indicators (KPIs) associated with the UE, wherein the UE is connected to a first cell,
   identifying, by the UE, a second cell in a vicinity of the first cell, wherein the second cell is one or more of: an LTE cell, a sub6 cell, or an mmWave cell;
   determining, by the UE, whether at least one KPI from the plurality of KPIs meets at least one KPI criterion;
   performing, by the UE, prioritization and selection of a cell among the mmWave cell, the sub6 cell, and the LTE cell based on whether the at least one KPI from the plurality of KPIs meets the at least one KPI criterion,
   wherein the performing of the prioritization and selection comprises:
   prioritizing a plurality of cells corresponding to the at least one KPI that meets the at least one KPI criterion based on a coverage, a link budget capability, and a frequency of supported bands; and
   selecting a cell from the plurality of prioritized cells according to a selection criterion.

6. The method of claim 5, wherein the performing prioritization and selection comprises:
   performing one of:
   prioritizing the sub6 cell over the mmWave cell and selecting the sub6cell based on at least one first KPI from the plurality of KPIs meeting at least one first KPI criterion;
   prioritizing the LTE cell over a sub6 cell and selecting the LTE cell based on at least one second KPI from the plurality of KPIs meeting at least one second KPI criterion;

prioritizing the LTE cell over the mmWave cell and selecting the LTE cell based on at least one third KPI from the plurality of KPIs meeting at least one third KPI criterion; or prioritizing the mmWave cell over the sub6 cell and selecting the mmWave cell based on the at least one KPI from the plurality of KPIs not meeting the at least one KPI criterion; and sending a request to connect to at least one of the prioritized LTE cell, the prioritized sub6 cell, or the prioritized mm Wave cell.

7. The method of claim 5, wherein the plurality of KPIs comprises a data volume at the UE, a transmitter power at the UE, a battery level of the UE, network connection of the UE, an application data usage at the UE, a data stalling condition at the UE, and a service requested at the UE.

8. The method of claim 5, wherein the performing of the selection comprises:

determining that the UE is connected to the first cell in Stand Alone (SA) connected mode, wherein the first cell is a mmWave cell;

configuring measurement objects for a neighboring sub6 cell and the mmWave cell;

determining whether the neighboring sub6 cell is preferred based on the at least one KPI meeting the at least one KPI criterion; and performing one of:

measuring and reporting only the neighboring sub6 cells having a desired Reference Signal Received Power (RSRP) that is equal to or exceeds a threshold for camping the UE based on the neighboring sub6cell being preferred and available; or measuring and reporting both the neighboring sub6 cell and the mmWave cell to a network for the UE to camp on based on the neighboring sub6cell not being preferred or the neighboring sub6 cell not being available.

9. The method of claim 8, wherein the performing of the selection of the neighboring sub6 cell for camping the UE in a case that the neighboring sub6cell is preferred comprises:

scanning sub6 frequencies for searching the neighboring sub6 cell;

determining whether the neighboring sub6cell with the desired RSRP is found in the scan;

measuring and reporting the neighboring sub6 cell and the mmWave cell to the network for camping the UE based on the neighboring sub6cell with the desired RSRP not being found in the scan;

measuring and reporting the neighboring sub6 cell found in the scan to the network for camping of the UE based on the neighboring sub6 cell with the desired RSRP being found in the scan.

10. The method of claim 5, wherein the performing of the selection comprises:

determining that the UE is connected to the first cell in Stand Alone (SA) connected mode, wherein the first cell is a sub6 cell;

configuring measurement objects for the sub6 cell and a neighboring mmWave cell;

determining whether the neighboring mmWave cell is preferred based on the at least one KPI meeting the at least one KPI criterion; and performing one of:

measuring and reporting only the neighboring mmWave cell having a desired Reference Signal Received Power (RSRP) that is equal to or exceeds a threshold for camping the UE in case that the neighboring mmWave cell is preferred and is available; or measuring and reporting both the sub6 cell and the neighboring mmWave cell to a network for camping the UE based on the neighboring mmWave cell not being preferred or the neighboring mmWave cell not being available.

11. The method of claim 10, wherein the performing of the selection of the neighboring mmWave cell for camping the UE when the neighboring mmWave is preferred comprises:

scanning mmWave frequencies for searching the neighboring mmWave cell;

determining whether the neighboring mmWave cell with the desired RSRP is found in the scan;

measuring and reporting the neighboring mmWave cell and the sub6 cell to the network for camping the UE based on the neighboring mmWave cell with the desired RSRP not being found in the scan; and measuring and reporting the neighboring mmWave cell found in the scan to the network for camping the UE based on the neighboring mm Wave cell with the desired RSRP being found in the scan.

12. The method of claim 5, further comprises:

determining that the UE is in 5G Stand Alone (SA) connected mode;

determining that data stalling occurs and a hysteresis timer is active;

disabling the 5G SA mode in the UE for a predefined time;

checking whether the predefined time is expired; and performing enabling the 5G SA mode in the UE based on the predefined time being expired; and retaining the disabled 5G SA mode in the UE based on the predefined time not being expired.

13. The method of claim 5, further comprises:

determining that the UE is in 5G SA connected mode;

determining that data stalling occurs and a hysteresis timer is active;

moving the UE to an LTE mode and restricting measurements of a 5G SA band in an idle mode in the UE for a predefined time;

checking whether the predefined time is expired; and performing enabling measurement of the 5G SA band in the idle mode in the UE based on the predefined time being expired; and retaining restriction on measurements of the 5G SA band in the idle mode in the UE based on the predefined time not being expired.

14. A User Equipment (UE) for cell selection, the UE comprising:

at least one processor comprising processing circuitry;

a communicator, comprising communication circuitry, coupled to the at least one processor; and a memory storing at least one command which, when executed individually and/or collectively by the at least one processor, controls the UE to:

determine a plurality of Key Performance Indicators (KPIs) associated with the UE, while the UE is connected to a first cell;

determine whether at least one KPI from the plurality of KPIs meets at least one KPI criterion; and perform prioritization and selection of a cell among an mmWave cell, a sub6 cell, and an LTE cell based on whether the at least one KPI from the plurality of KPIs meets the at least one KPI criterion, wherein the at least one processor is further configured to control the UE to:
prioritize a plurality of cells corresponding to the at least one KPI that meets the at least one KPI criterion based on a coverage, a link budget capability, and a frequency of supported bands; and
select a cell from the plurality of prioritized cells according to a selection criterion.

15. The UE of claim 14, wherein the at least one processor is further configured to control the UE to:
perform one of:
prioritizing the sub6 cell over the mmWave cell and selecting the sub6 cell based on at least one first KPI from the plurality of KPIs meeting at least one first KPI criterion;
prioritizing the LTE cell over the sub6 cell and select the LTE cell based on at least one second KPI from the plurality of KPIs meeting at least one second KPI criterion;
prioritizing the LTE cell over the mmWave cell and select the LTE cell based on at least one third KPI from the plurality of KPIs meeting at least one third KPI criterion; or
prioritizing the mmWave cell over the sub6 cell and selecting the mmWave cell based on the at least one KPI from the plurality of KPIs not meeting the at least one KPI criterion; and
send a request to connect to at least one of the prioritized LTE cell, the prioritized sub6 cell, or the prioritized mmWave cell.

16. The UE of claim 14, wherein the plurality of KPIs comprises a data volume at the UE, a transmitter power at the UE, a battery level of the UE, network connection of the UE, an application data usage at the UE, a data stalling condition at the UE and a service requested at the UE.

17. The UE of claim 14, wherein the at least one processor is further configured to control the UE to:
determine that the UE is connected to the first a cell in Stand Alone (SA) connected mode, wherein the first cell is a mmWave cell;
configure measurement objects for a neighboring sub6 cell and the mmWave cell;
determine whether the neighboring sub6 cell is preferred based on the at least one KPI meeting the at least one KPI criterion; and
perform one of:
measure and report only the neighboring sub6 cells having a desired Reference Signal Received Power (RSRP) that is equal to or exceeds a threshold for camping the UE based on the neighboring sub6cell being preferred and available; or
measure and report both the neighboring sub6 cell and the mmWave cell to a network for the UE to camp on based on the neighboring sub6cell not being preferred or the neighboring sub6 cell not being available.

18. The UE of claim 17, wherein the at least one processor is further configured to control the UE to:
scan sub6 frequencies for searching the neighboring sub6 cell;
determine whether the neighboring sub6cell with the desired RSRP is found in the scan;
perform measure and report the neighboring sub6 cell and the mmWave cell to the network for camping the UE based on the neighboring sub6cell with the desired RSRP not being found in the scan;
measure and report the neighboring sub6 cell found in the scan to the network for camping the UE based on the neighboring sub6 cell with the desired RSRP being found in the scan.

19. The UE of claim 14, wherein the at least one processor is further configured to control the UE to:
determine that the UE is connected to the first cell in Stand Alone (SA) connected mode, wherein the first cell is a sub6 cell;
configure measurement objects for the sub6 cell and a neighboring mmWave cell;
determine whether the neighboring mmWave cell is preferred based on the at least one KPI meeting the at least one KPI criterion; and
perform one of:
measure and report only the neighboring mmWave cell having a desired Reference Signal Received Power (RSRP) that is equal to or exceeds a threshold for camping the UE in case that the neighboring mmWave cell is preferred and is available; and
measure and report both the sub6 cell and the neighboring mmWave cell to a network for camping the UE based on the neighboring mmWave cell not being preferred or the neighboring mmWave cell not being available.

* * * * *